United States Patent
Xu et al.

(10) Patent No.: US 10,853,079 B2
(45) Date of Patent: Dec. 1, 2020

(54) DEPENDENCY-BASED STREAMLINED PROCESSING

(71) Applicant: Side Effects Software Inc., Toronto (CA)

(72) Inventors: Ken Xu, Scarborough (CA); Taylor James Petrick, Niagara-on-the-Lake (CA)

(73) Assignee: Side Effects Software Inc., Toronto (CA)

(*) Notice: Subject to any disclaimer, the term of this patent is extended or adjusted under 35 U.S.C. 154(b) by 0 days.

(21) Appl. No.: 16/575,774

(22) Filed: Sep. 19, 2019

(65) Prior Publication Data

US 2020/0097295 A1    Mar. 26, 2020

Related U.S. Application Data

(60) Provisional application No. 62/736,487, filed on Sep. 26, 2018.

(51) Int. Cl.
*G06F 9/38*    (2018.01)
*G06F 16/9035*    (2019.01)
(Continued)

(52) U.S. Cl.
CPC .......... *G06F 9/3838* (2013.01); *G06F 9/3885* (2013.01); *G06F 9/5061* (2013.01);
(Continued)

(58) Field of Classification Search
CPC .. G06F 9/3838; G06F 9/3885; G06F 16/9035; G06F 16/9024; G06F 16/9027;
(Continued)

(56) References Cited

U.S. PATENT DOCUMENTS 6,266,053 B1    7/2001    French et al.
6,707,452 B1    3/2004    Veach
(Continued)

FOREIGN PATENT DOCUMENTS

CA    2795739 C    5/2017

OTHER PUBLICATIONS

Tariq Khader. Office Action. Canadian Application No. 3,018,676. dated May 27, 2019. 4 pages.

*Primary Examiner* — Benjamin C Wu
(74) *Attorney, Agent, or Firm* — Bereskin & Parr LLP/S.E.N.C.R.L., s.r.l.

(57) ABSTRACT

A method and computer program product for performing a plurality of processing operations. A plurality of processor nodes each include one or more operational instances. Each processor node includes criteria for generating its operational instances. The processor nodes are linked together in a directed acyclic processing graph in which dependent nodes use data from the operational instances of upstream nodes to perform a node-specific set of processing operations. Dependency relationships between the processor nodes are defined on an operational instance basis, where operational instances in dependent processor nodes identify data associated with, or generated by, specific upstream operational instances that is used to perform the node-specific set of operations for that dependent operational instance. The processing graph may also include connectors nodes defining instance-level dependency relationships between processor nodes.

37 Claims, 24 Drawing Sheets

(51) Int. Cl.
*G06F 16/901* (2019.01)
*G06F 9/50* (2006.01)

(52) U.S. Cl.
CPC ...... *G06F 16/9024* (2019.01); *G06F 16/9027* (2019.01); *G06F 16/9035* (2019.01)

(58) Field of Classification Search
CPC .... G06F 9/5061; G06F 9/54; G06F 2209/484; G06F 9/4881
See application file for complete search history.

(56) References Cited

U.S. PATENT DOCUMENTS

| | | | |
|---|---|---|---|
| 7,098,907 B2 | 8/2006 | Houston et al. | |
| 7,243,057 B2 | 7/2007 | Houston et al. | |
| 7,330,185 B2 | 2/2008 | Grassia et al. | |
| 7,427,986 B2 | 9/2008 | Pellacini et al. | |
| 7,532,212 B2 | 5/2009 | Grassia et al. | |
| 7,580,986 B2 | 8/2009 | Bugaj | |
| 7,589,719 B2 | 9/2009 | Owens et al. | |
| 7,683,904 B2 | 3/2010 | Bugaj et al. | |
| 7,714,869 B2 | 5/2010 | Grassia et al. | |
| 7,821,516 B2 | 10/2010 | Bugaj et al. | |
| 7,836,086 B2 | 11/2010 | Gregory et al. | |
| 7,836,087 B1 | 11/2010 | Gregory et al. | |
| 7,873,685 B2 | 1/2011 | Bugaj et al. | |
| 7,917,535 B1 | 3/2011 | Gregory et al. | |
| 8,181,168 B1* | 5/2012 | Lee | G06F 8/41 717/149 |
| 8,352,443 B1 | 1/2013 | Polson et al. | |
| 8,363,055 B1 | 1/2013 | Gregory et al. | |
| 8,436,867 B1 | 5/2013 | Duff et al. | |
| 8,466,919 B1 | 6/2013 | Duff et al. | |
| 8,624,898 B1 | 1/2014 | Bugaj et al. | |
| 8,698,809 B2 | 4/2014 | Hamedi et al. | |
| 8,730,245 B2 | 5/2014 | Lowe et al. | |
| 9,240,073 B2 | 1/2016 | Rao et al. | |
| 9,286,297 B1 | 3/2016 | Bugaj et al. | |
| 9,626,787 B2 | 4/2017 | McNerney et al. | |
| 9,886,625 B2 | 2/2018 | Wnuk et al. | |
| 2004/0243597 A1 | 12/2004 | Jensen et al. | |
| 2005/0165881 A1 | 7/2005 | Brooks et al. | |
| 2005/0248573 A1 | 11/2005 | Grassia et al. | |
| 2006/0010153 A1 | 1/2006 | Bugaj | |
| 2006/0095912 A1 | 5/2006 | Wood-Gaines et al. | |
| 2006/0218551 A1* | 9/2006 | Berstis | G06F 9/5038 718/102 |
| 2006/0233537 A1 | 10/2006 | Larsen et al. | |
| 2007/0080964 A1* | 4/2007 | Kainz | G06T 17/005 345/440 |
| 2007/0262988 A1 | 11/2007 | Christensen | |
| 2009/0063515 A1* | 3/2009 | Bar-Or | G06F 8/433 |
| 2011/0106843 A1 | 5/2011 | Pan et al. | |
| 2012/0272228 A1* | 10/2012 | Marndi | G06F 9/44536 717/170 |
| 2014/0379619 A1* | 12/2014 | Permeh | G06N 5/02 706/12 |
| 2015/0081855 A1 | 3/2015 | Zhang et al. | |
| 2015/0205582 A1* | 7/2015 | Iskander | G06F 8/70 717/105 |
| 2015/0262416 A1 | 9/2015 | Hecht | |
| 2016/0062776 A1 | 3/2016 | Stanfill et al. | |
| 2016/0078118 A1* | 3/2016 | Abla | G06F 17/10 707/736 |
| 2016/0156715 A1 | 6/2016 | Larouche et al. | |
| 2016/0291942 A1* | 10/2016 | Hutchison | G06F 8/34 |
| 2016/0307353 A1 | 10/2016 | Ligenza et al. | |
| 2017/0286526 A1* | 10/2017 | Bar-Or | G06F 8/60 |
| 2017/0322863 A1* | 11/2017 | Tran | G06F 16/289 |
| 2017/0323247 A1* | 11/2017 | Tran | G06F 16/24553 |
| 2018/0067941 A1* | 3/2018 | Chambers | G06F 16/48 |
| 2019/0340272 A1* | 11/2019 | Breiter | G06F 16/2272 |
| 2019/0341039 A1* | 11/2019 | Bharadwaj | G06F 40/216 |
| 2020/0012521 A1* | 1/2020 | Wu | G06F 9/54 |
| 2020/0057748 A1* | 2/2020 | Danilak | G06F 9/3826 |
| 2020/0183738 A1* | 6/2020 | Champigny | G06F 9/544 |

\* cited by examiner

DEPENDENCY-BASED STREAMLINED PROCESSING

CROSS-REFERENCE TO RELATED APPLICATION

This application claims the benefit of the U.S. Provisional Application No. 62/736,487, filed on Sep. 26, 2018, the entirety of which is incorporated herein by reference.

FIELD

The described embodiments relate to managing data processing operations, and in particular to systems and methods for managing related processing operations.

BACKGROUND

Many projects can be broken down into a series of tasks. In order to finish the project, each task has to be successfully completed. In some cases, a certain task may only be performed following the successful completion of one or more preceding other tasks. Many programming and electronic projects involve series of processing tasks that all must be completed to output a final product.

One example of an electronic project that can be broken down into a series of processing tasks is the development of a video game. Many modern video games involve large, immersive virtual environments. These virtual environments often involve a number of elements, such as terrain, flora, roads, buildings and so forth, that are arranged to provide the final environment. Artists and designers may contribute to the design of each of the elements individually as well as their relationships and placement to define the virtual environment. The development process is often iterative and can involve repeated changes and modifications to both individual and collective design elements. For instance, modifying the location of a road may affect the placement of buildings and flora adjacent to both the original road location and the modified road location.

Another example of an electronic project that can be broken down into a series of tasks is the development of a movie involving computer-generated imagery. Each frame in the movie may involve multiple elements, such as background animations, character costumes, character physics, environmental physics, and many others that together provide the final video frame. Again, the animation process is often iterative and may involve repeated changes and modifications to the individual and collective design elements. For instance, updating the design of a character's appearance or costume may result in changes to each frame in which that character appears.

Yet another example of an electronic project involving a series of tasks are simulations. Many design projects may involve simulating how a given design, such as the design of a vehicle, reacts to different environmental conditions. Changing the design of a component of the vehicle may result in changes throughout the simulation results. Once again, an iterative process may be used to modify and fine-tune the design of the vehicle to respond suitably to the environmental conditions being tested. For instance, changing the height of a plane tail-wing may change how the plane reacts to varying wind conditions in crash simulations.

Many electronic design and development projects require substantial computational resources and computation time. For instance, performing the processing required to render one frame of a modern animated film may involve many hours of core computational time. Every time a frame needs to be re-rendered, additional time and computational expenses are encountered. Minimizing the computational resources required for an electronic project can provide significant savings, both in terms of the power consumed to perform the processing as well as the time required to complete the project.

SUMMARY

In a first broad aspect, there is provided a method of performing a plurality of processing operations where the method includes: defining a plurality of processor nodes including at least one root processor node and a plurality of dependent processor nodes, where each processor node defines a node-specific set of operations performable by that processor node, and each processor node defines node instance generation criteria for that processor node; linking the plurality of processor nodes to define a processing graph that includes the plurality of processor nodes, where the processing graph is defined as a directed acyclic graph in which data flows unidirectionally from upstream nodes to downstream nodes, each dependent processor node is a downstream node linked to at least one upstream processor node, and the at least one upstream processor node linked to each dependent processor node includes one of the root processor nodes; for each processor node, generating at least one operational instance using the node instance generation criteria for that processor node, where each operational instance identifies input data usable by that processor node to perform the node-specific set of operations, each operational instance is operable to generate at least one output data object by performing the node-specific set of operations using the input data identified by that operational instance, for each root processor node, the node instance generation criteria identify a node-specific set of input data usable by that processor node, and the at least one operational instance is generated from the node-specific set of input data, and for each dependent processor node, the node instance generation criteria define the operational instances as a function of the at least one output data object defined by the operational instances in the node immediately upstream in the processing graph; automatically generating, for each dependent processor node, instance dependency relationships, where each instance dependency relationship defines, for a particular operational instance in that dependent processor node, the operational instance in the node immediately upstream that defines the at least one output data object usable by that particular operational instance; and activating the plurality of nodes, where for each operational instance associated with each processor node, the processor node is operable to perform the node-specific set of operations using the input data identified by that operational instance when the input data identified by that operational instance is available, and for each downstream operational instance, the input data identified by that operational instance is available following the generation of the at least one upstream output data object by the operational instance in the processor node immediately upstream that is identified by the dependency relationship.

In some embodiments, the processing graph is defined to include a first upstream processor node and a first downstream processor node, where the first downstream processor node is immediately downstream of the first upstream processor node; the operational instances for the first upstream processor node are generated to include a plurality of upstream operational instances; the operational instances for the first downstream processor node are generated to include a plurality of downstream operational instances; and the instance dependency relationships for the first downstream node identify, for each downstream operational instance, one of the upstream operational instances in the plurality of upstream operational instances.

In some embodiments, for at least two of the downstream operational instances, the instance dependency relationship corresponding to each of the at least two downstream operational instances identifies the same upstream operational instance.

In some embodiments, the first downstream processor node performs the corresponding node-specific set of operations on at least one of the downstream operational instances prior to the first upstream node completing the node-specific set of operations for each of the upstream operational instances.

In some embodiments, the input data identified by each downstream operational instance is available immediately upon generation of the at least one upstream output data object by the corresponding upstream operational instance in the first upstream processor node.

In some embodiments, for at least one dependent processor node, generating the at least one operational instance comprising dynamically generating the at least one operational instance as the output data objects are generated by the operational instances in the processor node immediately upstream.

In some embodiments, the method can include modifying at least one operational instance in a particular upstream nodes; and updating the operational instances in the set of dependent processor nodes downstream from the particular upstream node using the instance dependency relationships.

In some embodiments, updating the operational instances in the set of dependent processor nodes includes: identifying the dependent operational instances in the in the set of dependent processor nodes that depend from the at least one modified operational instance using the instance dependency relationships for each of the dependent processor nodes downstream; removing the dependent operational instances; and generating new dependent operational instances in the set of dependent processor nodes using the node generation criteria and the at least one modified operational instance.

In some embodiments, the set of dependent processor nodes includes a plurality of processor nodes.

In some embodiments, at least one of the operational instances in the set of dependent processor nodes is unchanged when updating the operational instances in the set of dependent processor nodes.

In some embodiments, the processing graph is defined to include a plurality of processing sub-trees, where each processing sub-tree includes at least one processor node, the at least one processor node including a single root processor node and any downstream nodes dependent on the single root processor node.

In some embodiments, the plurality of processing sub-trees includes a first processing sub-tree that includes at least a first sub-tree processor node having a plurality of first sub-tree operational instances and a second processing sub-tree that includes at least a second sub-tree processor node having a plurality of second sub-tree operational instances; and the method includes: defining a mapping node that includes a set of mapping criteria; linking the mapping node to the first sub-tree processor node and to the second sub-tree processor node; and automatically generating an instance mapping between the first sub-tree operational instances and the second sub-tree operational instances using the mapping criteria.

In some embodiments, the method includes modifying one of the first sub-tree operational instances in a particular first sub-tree processor node; removing any downstream first sub-tree operational instances that depend from the modified first sub-tree operational instance in the particular first sub-tree processor node; identifying at least one second sub-tree operational instance corresponding to the modified first sub-tree operational instance using the instance mapping; marking each of the identified at least one second sub-tree operational instances, and any operational instances downstream of the identified at least one second sub-tree operational instances, as potentially modified; and in response to a request to activate a sub-tree processor node that is in the second processing sub-tree or is downstream from the second processing sub-tree: re-generating the first sub-tree operational instances corresponding to the modified at least one first sub-tree operational instance; re-generating the instance mapping using the mapping criteria; updating a status of the second sub-tree operational instances using the re-generated instance mapping to identify any additional sub-tree processor nodes in the second processing sub-tree and downstream from the second processing sub-tree that are potentially modified; and marking the identified additional sub-tree processor nodes as potentially modified.

In some embodiments, the method can include re-computing only the sub-tree operational instances marked as potentially modified in response to a subsequent request to activate the plurality of nodes.

In some embodiments, the processing graph is defined to include a first processing section that includes at least a first section processor node having a plurality of first section operational instances and a second processing section that includes at least a second section processor node having a plurality of second section operational instances and the method includes: defining a partition node that includes a set of partitioning criteria, the partitioning criteria defining a plurality of partition instances for the partition node; linking the partition node to the first section processor node and to the second section processor node, where the partition node is immediately downstream from the first section processor node and immediately upstream from the second section processor node; and allocating each first section operational instances to one of the partitions using the partitioning criteria.

In some embodiments, the method includes modifying one of the first section operational instances in a particular first section processor node; removing any downstream first section operational instances that depend from the modified first section operational instance in the particular first section processor node; and marking each partition instance corresponding to the modified first section operational instances as potentially modified.

In some embodiments, the method includes: defining a partition node modification perpetuation setting; and updating the second section operational instances downstream from each marked partition instance by one of: removing the second section operational instances downstream from the marked partition instance; and marking the second section operational instances downstream from the marked partition instance as potentially modified; where the updating of the second section operational instances is controlled by the partition node modification setting.

In some embodiments, the method includes: determining that a particular marked partition instance has been modified; and only updating the second section operational instances downstream from the particular marked partition instance in response to determining that the particular marked partition instance has been modified.

In accordance with a broad aspect, there is provided a method of generating a multi-component output work product, the method including: defining initial components of a plurality of input objects; defining a plurality of processor nodes including at least one root processor node and a plurality of dependent processor nodes, where each processor node defines a node-specific set of operations performable by that processor node, and each processor node defines node instance generation criteria for that processor node, linking the plurality of processor nodes to define a processing graph that includes the plurality of processor nodes, where the processing graph is defined as a directed acyclic graph in which data flows unidirectionally from upstream nodes to downstream nodes, each dependent processor node is a downstream node linked to at least one upstream processor node, and the at least one upstream processor node linked to each dependent processor node includes one of the root processor nodes; for each processor node, generating at least one operational instance using the node instance generation criteria for that processor node, where each operational instance identifies input data usable by that processor node to perform the node-specific set of operations, each operational instance is operable to generate at least one output data object by performing the node-specific set of operations using the input data identified by that operational instance; for each root processor node, the node instance generation criteria identify a node-specific set of input data usable by that processor node, and the at least one operational instance is generated from the node-specific set of input data, where for at least one root processor node the node-specific set of input data usable by that root processor node includes at least some of the initial components of the input objects; and for each dependent processor node, the node instance generation criteria define the operational instances as a function of the at least one output data object defined by the operational instances in the node immediately upstream in the processing graph; automatically generating, for each dependent processor node, instance dependency relationships, where each instance dependency relationship defines, for a particular operational instance in that dependent processor node, the operational instance in the node immediately upstream that defines the at least one output data object usable by that particular operational instance; activating the plurality of nodes, where for each operational instance associated with each processor node, the processor node is operable to perform the node-specific set of operations using the input data identified by that operational instance when the input data identified by that operational instance is available, and for each downstream operational instance, the input data identified by that operational instance is available following the generation of the at least one upstream output data object by the operational instance in the processor node immediately upstream that is identified by the dependency relationship; and generating the multi-component output work product by combining at least some of the output data objects generated by the plurality of processor nodes.

In accordance with a broad aspect there is provided a non-transitory computer-readable medium comprising computer executable instructions stored thereon, the instructions executable by at least one processor to configure the at least one processor to perform a method of performing a plurality of processing operations as shown and described herein.

In accordance with a broad aspect there is provided a non-transitory computer-readable medium comprising computer executable instructions stored thereon, the instructions executable by at least one processor to configure the at least one processor to perform a method of generating a multi-component output work product as shown and described herein.

BRIEF DESCRIPTION OF THE DRAWINGS

A preferred embodiment of the present invention will now be described in detail with reference to the drawings, in which.

Figure 1:
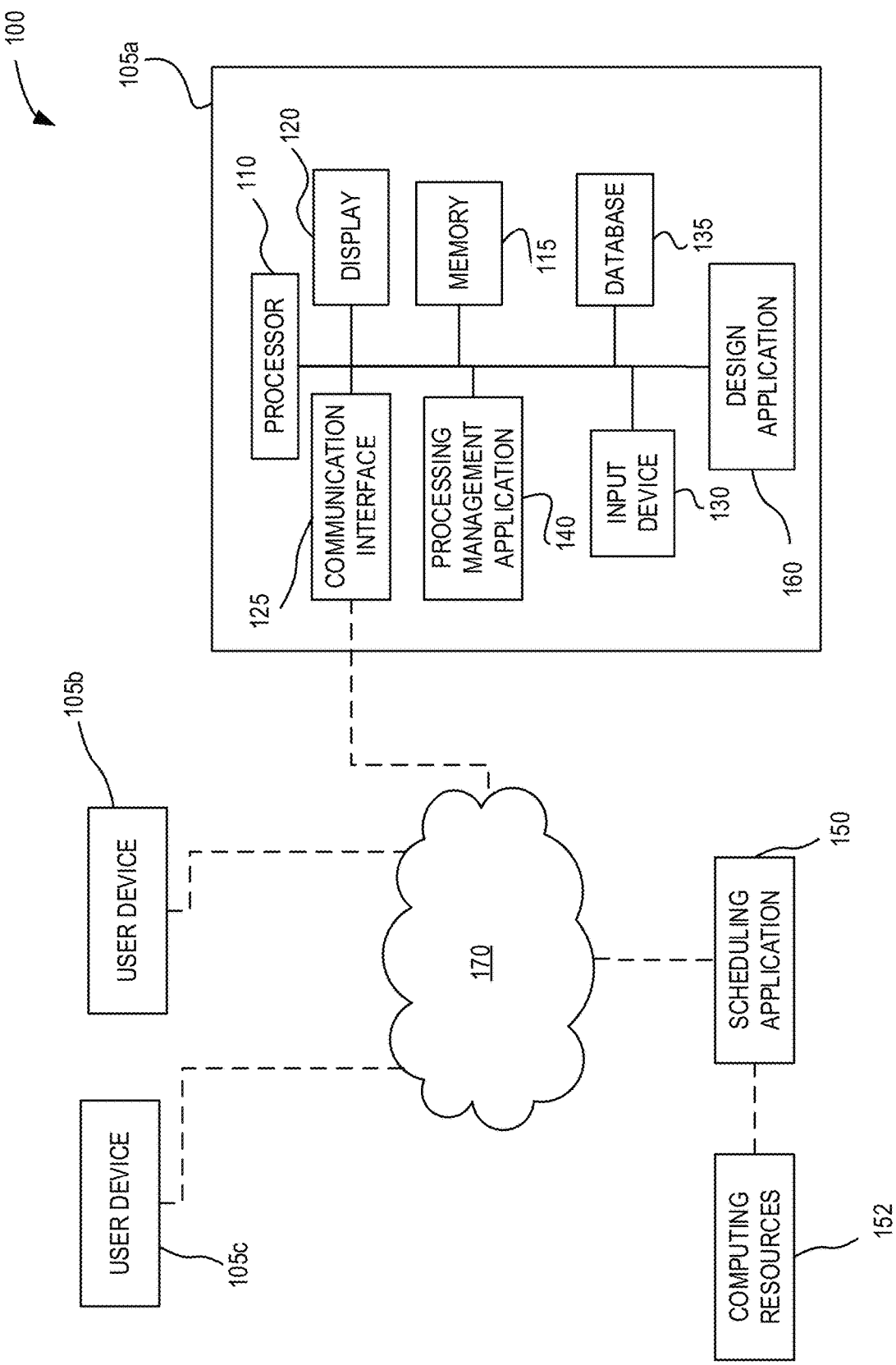
FIG. 1 is a block diagram of an electronic project development system in accordance with an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXEMPLARY EMBODIMENTS

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device.

It should also be noted that there may be some elements that are used to implement at least part of one of the embodiments described herein that may be implemented via software that is written in a high-level computer programming language such as object oriented programming. Accordingly, the program code may be written in C, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

Developing and implementing electronic projects such as video games, movies, simulations and the like often involve a large number of processing tasks. Each task may involve a specific processing operation or set of operations required to complete that task. Some tasks may need to be performed multiple times in order to generate the output data necessary to complete a project.

Many project tasks may be interrelated. For instance, some tasks may use the output from preceding tasks as an input to the set of operations performed for that task. The processing operations defined by upstream tasks may need to be completed before the processing operations defined by one or more downstream tasks can be performed, since those downstream processing operations may rely on the data generated by the upstream processing operations. In some cases, this can lead to delays and bottlenecks where downstream processing operations are prevented from proceeding because of the time required to complete upstream processing operations.

Electronic projects are often iterative in nature. Changes may be made to various aspects of the project, such as individual processing tasks or the characteristics of input objects on an ongoing basis. Accordingly, it may be necessary to repeat the processing operations affected by the changes, in some cases multiple times over. In large, computationally expensive projects, such as the development of video games or animated movies, the time and expense associated with re-computing processing operations may significantly impact the overall project budget and timeline.

Embodiments described herein may provide systems, methods and computer program products that may facilitate the design, development and implementation of electronic projects. The systems, methods and computer program products described herein may enable a plurality of processing steps related to a project to be performed. The embodiments described herein may provide a development architecture or framework that facilitates the efficient execution of processing operations corresponding to multiple different tasks associated with a project.

In embodiments described herein, a plurality of processor nodes can be defined. Each processor node can define a node-specific set of operations performable by that processor node. The node-specific set of operations performed by a given processor node may involve a single processing operation or a series of processing operations.

In general, each processor node can be configured to receive data as input, perform the node-specific set of operations using the input data, and generate output data from the performance of the node-specific set of operations. In this way, a processor node may be analogized to a function that receives an input (typically an input file or data associated with an input file) and performs operations using the received input to generate new or different data (e.g. an output file).

In some cases, the node-specific set of operations defined by a processor node may include performing an operation or set of operations on the same input data (e.g. an input file or parameter) multiple times while modifying one or more parameters. The processor node can then define the node-specific operations to include the set of operations and the operational variables that are used to perform the set of operations on an input file or parameter.

Each processor node can include one or more operational instances. An operational instance can identify an instance in which the processing operations defined by the processor node are performed. Each operational instance may correspond to a different set of output data (e.g. a different output file or a different downstream operational instance) generated as the result of that instance of the set of processing operations being performed.

In some cases, each operational instance may use different input data. In other cases, some of the operational instances may use the same input data but with different operational variables (e.g. with a changed operational variable).

In many cases, a processor node may include a plurality of operational instances (also referred to as operational node instances or operational instances of a node). In some cases, operational instances within a processor node can be processed independently of the other operational instances. That is, the processor node can be defined so that the individual operational instances are processed without a pre-defined order.

In other cases, operational instances within a processor node may depend on other operational instances within the same processor node. For example, operational instances within a processor node may be defined with sequential dependencies. Sequential dependencies may define an order in which some, or all, of the operational instances are to perform the node-specific set of operations.

In some cases, internal node dependencies (i.e. dependencies between operational instances within a single node) can be defined on an individual instance basis (e.g. the internal dependency for each operational instance is defined separately). In other cases, for instance with sequential dependencies, internal node dependencies can be defined as an operational node instance dependency batch or group. The processor node may then define a batch operational instance that includes a sequence of operational instances within that processor node. The batch operational instance can be defined to perform the set of operations for those operational instances in accordance with the sequential dependencies defined for those operational instances without requiring individual dependencies to be defined between the operational instances in that batch.

Each processor node can include node instance generation criteria. The node instance generation criteria can define how operational instances are generated for the processor node (and correspondingly how many operational instances are generated).

The plurality of processor nodes can include root processor nodes. Root processor nodes can be defined as processor nodes in which the operational instances do not depend from an immediately upstream operational instances (i.e. they are not generated based on operational instances or data from an immediately upstream node). Root processor nodes can identify input data from sources external to the processing graph. Thus, for each root processor node, the node instance generation criteria may identify a node-specific set of input data (e.g. data files or data from an identified data file) usable to perform the set of processing operations defined by that root processor node.

For dependent processor nodes, the node instance generation criteria may depend on the result of processing operations performed by upstream nodes. The node instance generation criteria can specify that the operational instances are generated as a function of the output data generated by the operational instances in the node immediately upstream in the processing graph. In some cases, the node instance generation criteria may specify that the operational instances are generated as a function of the operational instances themselves in the node immediately upstream (e.g. a downstream operational instance could be generated for each upstream operational instance in the node immediately upstream).

In some cases, the node instance generation criteria may define a one-to-one relationship between operational instances in the downstream processor node and the node immediately upstream. In other cases, the node instance generation criteria may define a many-to-one relationship between operational instances in the downstream processor node and the node immediately upstream (i.e. multiple downstream instances may be generated as a result of a single upstream instance). In general, however, the node instance generation criteria for a dependent processor node specify one operational instance in the immediately upstream node that is used to generate each operational instance in that dependent processor node. The plurality of processor nodes can be linked together to define a processing graph. The processing graph may also be referred to herein as a project development graph or a procedural dependency graph. The processing graph can be used to perform the combination of processing tasks required for a given electronic project.

The processing graph can be arranged as a directed acyclic graph in which data flows unidirectionally from upstream nodes to downstream nodes. Each processor node can be linked to one or more other nodes in the processing graph.

The processing graph may define an order to the operations performed by the plurality of processor nodes. The links between a processor node and nodes that are upstream or downstream therefrom can define the dependency relationships between those nodes. The dependency relationships can define the order or sequence in which processing operations are permitted to be performed.

The links between upstream and downstream nodes can define the order in which operations are performed as between the two processor nodes. However, in the embodiments described herein the relationships between processor nodes can be defined on a more granular basis. In embodiments described herein, the links between the processor nodes in the processing graph can be used to define dependency relationships between individual operational instances in the linked processor nodes. This may allow processor operations to be performed more efficiently.

A plurality of instance dependency relationships can be defined for each downstream processor node. Each instance dependency relationship can define, for one particular operational instance in that processor node, the operational instance in the immediately upstream node upon which that particular operational instance depends. In other words, each instance of the processing operations performed by a given downstream processor node can have a dependency relationship identifying an upstream operational instance that must complete its processing operations before the downstream operational instance can perform its set of processing operations.

In some cases, a downstream operational instance may only be generated once (i.e. after or following) an upstream operational instance completes its processing operations. For example, where the node instance generation criteria for a downstream processor node specify that the operational instances for that downstream processor node are generated based on output data from operational instances in the immediately upstream processor node, the operational instances in that downstream processor node may only be generated once that output data has been generated (i.e. once an operational instance in the immediately upstream processor node has completed its set of processing operations to generate that output data).

The processing graph can also be defined to include connector nodes. Connector nodes may be positioned between two or more processor nodes. Connector nodes can be used to define the dependency relationships between different processor nodes, for instance where the dependency relationships may be more complex or require some analysis of the operational instances in both processor nodes. As with direct dependency relationships between processor nodes, the dependency relationships defined by connector nodes relate operational instances within the different processor nodes directly.

Connector nodes may also be used to filter or group output data from upstream operational instances. In some cases, the filtered or grouped data may be used to generate operational instances in processor nodes that are downstream from the connector node. Connector nodes may also be used to control processing flow, for instance, by requiring all upstream operational instances, or a subset of upstream operational instances, to complete processing before one or more downstream operational instances are permitted to perform their processing operations.

In some examples, a processing graph may be defined to include a plurality of sub-trees. Each processing sub-tree may include a root processor node and any downstream nodes dependent on that root processor node. In some cases, a processing sub-tree may include only the root processor node. In other cases, a processing sub-tree may include a root processor node and one or more downstream dependent nodes. In some cases, a processing sub-tree may include a connector node in the nodes that depend from the root processor node, such as a partitioner node. In other cases, a processing sub-tree may only include a root processor node and downstream dependent processor nodes.

A processing sub-tree can include one or more processing sections. A processing section generally consists of a consecutive sequence of linked processor nodes.

A connector node, such as a partition node or mapper node, may be used to provide dependency relationships between processor nodes in different sections. Some connector nodes, such as mapper nodes, may also connect processor nodes from different sub-trees that depend from different root processor nodes.

The instance dependency relationships generated for the processing graph can define how data is transmitted through the graph. The instance dependency relationships can also identify the specific instances of a first set of processing operations that depend on the outcome or result of a specific instance of a second set of processing operations being performed.

Identifying specific instances of processing operations that are related may provide a number of benefits. For example, by tying the execution of processing operations to the specific upstream instances of operations that need to be performed, downstream processing operations can proceed at the same time as, i.e. contemporaneously or simultaneously with, upstream operations that do not affect the downstream processing operations (i.e. that do not produce data needed by those downstream processing operations). This may reduce the impact of upstream processor nodes that have long processing times, by permitting some downstream processor nodes to begin processing operations before the slower processor node has completed all its processing instances.

Defining the dependency relationships between individual operational instances of processing operations may also facilitate changes and updates to electronic projects. For example, when an operational instance of an upstream node is modified, rather than re-computing all of the downstream processing operations, the dependency relationships can be used to identify the particular downstream operational instances affected by the change. The system may then only re-compute downstream operational instances that were affected, which may significantly reduce the number of processing operations that need to be performed.

When a user is considering a modification to one or more aspects of the project, the dependency relationships can identify the downstream operational instances that may potentially be affected by the change. This may provide the user with additional information to consider and evaluate whether the potential time and computational cost is appropriate for the change being considered.

Referring now to FIG. 1, there is provided is a block diagram of an electronic project development system 100 in accordance with an example embodiment.

System 100 generally comprises a plurality of computers connected via a data communication network 170, which itself may be connected to the Internet. In general, however, the project development system 100 includes a plurality of user devices 105a-105c that can be connected by the data communication network 170. The user devices 105 may include a plurality of local user devices 105, and may also include a network of remotely connected user devices.

Typically, the connection between the user devices 105 and the Internet may be made via a firewall server (not shown). In some cases, there may be multiple links or firewalls, or both, between the user devices 105 and the Internet. Some organizations may operate multiple networks or virtual networks, which can be internetworked or isolated. These have been omitted for ease of illustration, however it will be understood that the teachings herein can be applied to such systems. The data communication network 170 may be constructed from one or more computer network technologies, such as IEEE 802.3 (Ethernet), IEEE 802.11 and similar technologies. Computers and computing devices, such as user device 105, may be connected to the data communication network 170 or a portion thereof via suitable network interfaces.

The user computing device 105, which may be a desktop or laptop computer, can connect to the data communication network 170 via a wired Ethernet connection or a wireless connection. In some cases, the user computing device 105 may also include a mobile device such as a smartphone or tablet. In some cases, the user computing devices 105 may be directly linked, for instance using communication interfaces such as a Universal Serial Bus, Bluetooth™ or Ethernet connection.

As illustrated by user device 105a, each user device 105 can include a processor 110, a memory 115, a display 120, a communication interface 125, an input device 130, and a database 135. Although shown as separate elements, it will be understood that database 135 may be stored in memory 115.

Processor 110 is a computer processor, such as a general purpose microprocessor. In some other cases, processor 110 may be a field programmable gate array, application specific integrated circuit, microcontroller, or other suitable computer processor.

Processor 110 is also coupled to display 120, which is a suitable display for outputting information and data as needed by various computer programs. In particular, display 120 may display a graphical user interface (GUI). User device 105 may execute an operating system, such as Microsoft Windows™' GNU/Linux, or other suitable operating system.

Communication interface 125 is one or more data network interface, such as an IEEE 802.3 or IEEE 802.11 interface, for communication over a network.

Processor 110 is coupled, via a computer data bus, to memory 115. Memory 115 may include both volatile and non-volatile memory. Non-volatile memory stores computer programs consisting of computer-executable instructions, which may be loaded into volatile memory for execution by processor 110 as needed. It will be understood by those of skill in the art that references herein to user device 105 as carrying out a function or acting in a particular way imply that processor 110 is executing instructions (e.g., a software program) stored in memory 115 and possibly transmitting or receiving inputs and outputs via one or more interface. Memory 115 may also store data input to, or output from, processor 110 in the course of executing the computer-executable instructions. As noted above, memory 115 may also store database 135.

In some example embodiments, database 135 is a relational database. In other embodiments, database 135 may be a non-relational database, such as a key-value database, NoSQL database, or the like.

It should also be understood that some of the elements of the user device 105, such as some or all of the memory 115 and/or processor 110 may be implemented using a combination of hardware and software resources, for instances using virtual machines and/or containers.

Input device 140 may include one or more input devices such as a keyboard, mouse, trackpad and various other input devices. The user device 105 can also include various output devices, in addition to display 120, such as speakers and/or tactile feedback sensors.

Each of the computers and computing devices may at times connect to external computers or servers via the Internet. For example, user devices 105 may connect to a software update server to obtain the latest version of a software application or firmware.

As used herein, the term "software application" or "application" refers to computer-executable instructions, particularly computer-executable instructions stored in a non-transitory medium, such as a non-volatile memory, and executed by a computer processor. The computer processor, when executing the instructions, may receive inputs and transmit outputs to any of a variety of input or output devices to which it is coupled.

The software application may be associated with an application identifier that uniquely identifies that software application. In some cases, the application identifier may also identify the version and build of the software application. Within an organization, a software application may be recognized by a name by both the people who use it, and those that supply or maintain it. Mobile applications or "apps" generally refers to software applications for installation and use on mobile devices such as smartphones and tablets or other "smart" devices.

A software application can be, for example, a monolithic software application, built in-house by the organization and possibly running on custom hardware; a set of interconnected modular subsystems running on similar or diverse hardware; a software-as-a-service application operated remotely by a third party; third party software running on outsourced infrastructure, etc.

For instance, the memory 115 on user device 105 may store a software application referred to herein as a processing management application 140. Although shown separately from memory 115, it will be understood that the processing management application 140 may be stored in memory 115. In some cases, the processing management application 140 may be a cloud-based application, rather than stored directly on user device 105. The processing management application 140 may be configured to manage the performance of a plurality of processing operations for user device 105.

In general, the processing management application 140 can allow dependent components, or nodes, within an electronic project to be identified. The processing management application 140 can be used to define a processing graph that includes a plurality of processing nodes for the project.

Modifications to the processing nodes, or data associated therewith, may then be tracked through the dependents components. The processing management application 140 may enable the regeneration/re-computation performed by modified nodes, and their downstream dependent nodes, to be limited in scope by tracking the perpetuation of changes.

The processing management application 140 may identify relationships between individual instances of the processing nodes. By tracking the dependencies between the individual instances within the nodes of the processing graph, the processing management application 140 can identify only those instances that may be modified or 'dirtied' and then perform limited re-computations as required.

In some embodiments, the processing management application 140 may also provide an interface between the plurality of user devices 105a-105c. This may control the perpetuation of processing operations and changes across the user devices 105, for instance where multiple users are developing a project collaboratively. For example, user devices 105 may be used by multiple artists or designers on a concurrent basis who each contribute to the design of a particular aspect of the electronic project.

The memory 115 on user device 105 may also store one or more project design applications 160. A design application 160 may allow a user to modify various characteristics of the project, such as input data files or objects. A user may also interact with the design application 160 to configure a processor node that may be implemented in the processing management application 140. In some cases, the user may configure processor nodes through the processing management application 140 as well.

The processing management application 140 may provide a user interface that allows a user to define a processing graph. A user may interact with the processing management application 140 to define a plurality of nodes within the processing graph. For instance, the user may identify a plurality of processor nodes to include in the processing graph. The user may then arrange the processor nodes in a directed acyclic graph, and identify nodes that are linked to one another.

Each processor node can include node instance generation criteria. A user may define the node instance generation criteria for a dependent processor node as a function of output data received from another node.

A user can then link that processor node to upstream processor node configured to generate appropriate output data. The processing management application 140 may then automatically generate one or more operational instances for each processor node by applying the node generation criteria.

In some cases, a user may define the node instance generation criteria for a root processor node by identifying an external file or folder. The processing management application 140 may then import data from the file or folder, and generate node instances based on the data that is imported. The data generated for a root processor node may also be defined using the design application 160, in some cases through a plug-in or extension to the processing management application 140. In some cases, the input data defined for a root processor node may be defined as a parameter of that node (e.g. a hard-coded operation) performed by that root processor node.

The links between processor nodes can also be used to define node dependency relationships between the linked processor nodes. A user can define, for each dependent node, a set of dependency criteria identifying how instance dependency relationships can be generated. The set of dependency criteria can define how an operational instance in a downstream processor node depends on data from an upstream node. The processing management application 140 may then automatically generate instance dependency relationships for each of the operational instances in the dependent node.

In some cases, the dependency criteria and node instance generation criteria may overlap and may even be the same. The node instance generation criteria may specify how the dependency relationships are generated, since the operational instances may each be generated based on data from a specific upstream operational instance.

In some cases, the output data identified by node instance generation criteria in a downstream node may be an output data file generated by the immediately upstream node when the upstream node performs a set of operations. In other cases, the output data identified by the node instance generation criteria in a downstream node may simply be data that is intended to be used in the creation of a downstream operational instance. For example, the set of operations performed by a processor node may simply add data to existing operational instances, and the downstream node may then generate its operational instances as the modified versions of upstream operational instances without requiring external data files to be generated.

In some cases, the processing management application 140 and design application 160 may be at least partially integrated. For instance, the processing management application 140 may include an extension or API for the design application 160 that allows a user to access features of processing management application 140 within the user interface of design application 160. The processing management application 140 may then track and control the perpetuation of changes made in design application 160 through the processing graph defined within the processing management application 140.

In some embodiments, processing of modifications made within the design application 160 can be managed by processing management application 140. The processing management application 140 may control how processing operations are performed, and perpetuated, in response to changes made by a user in the design application 160.

As shown in FIG. 1, the user devices 105 can also interface with a scheduling application 150. Although shown as separate from user device 105, it should be understood that scheduling application 150 may also be stored in user device 105, e.g. in memory 115.

In some cases, the scheduler 150 may be omitted from system 100. In some other cases, the scheduler 150 and user device 105 may be integrated or co-located. For instance, processing management application 140 may include an application programming interface for scheduler 150 that integrates scheduler 150 into processing management application 140.

The scheduling application 150 may be used to facilitate resource utilization for the processing management application 140. For example, the user device 105 may include a plurality of processing cores. The system 100 may also include additional real or virtual processing components usable by the processing management application 140 to perform the underlying processing operations that are being managed. The scheduling application 150 can be used to allocate processing operations between computing resources 152 that are included in system 100, or connected to system 100 via network 170. The scheduling application 150 may allocate processing operations from all of the user devices 105 across computing resources 152 available to system 100.

The scheduling application 150 may be used to pool work items across the available resources 152 to optimize resource utilization. For example, the processing management application 140 may provide processor pooling through an integrated scheduler interface to scheduling application 150. Various examples of scheduling applications 150 may be used with the processing management application 140, such as the HQueue scheduler or Tractor scheduler for example. The processing management application 140 may define metadata associated with each node, and each operational instance, that facilitates the allocation of the processing operations corresponding to each operational instance to processing resources as determined by the scheduling application 150. This may further facilitate the parallelization of processing by the scheduling application 150.

Figure 2A:
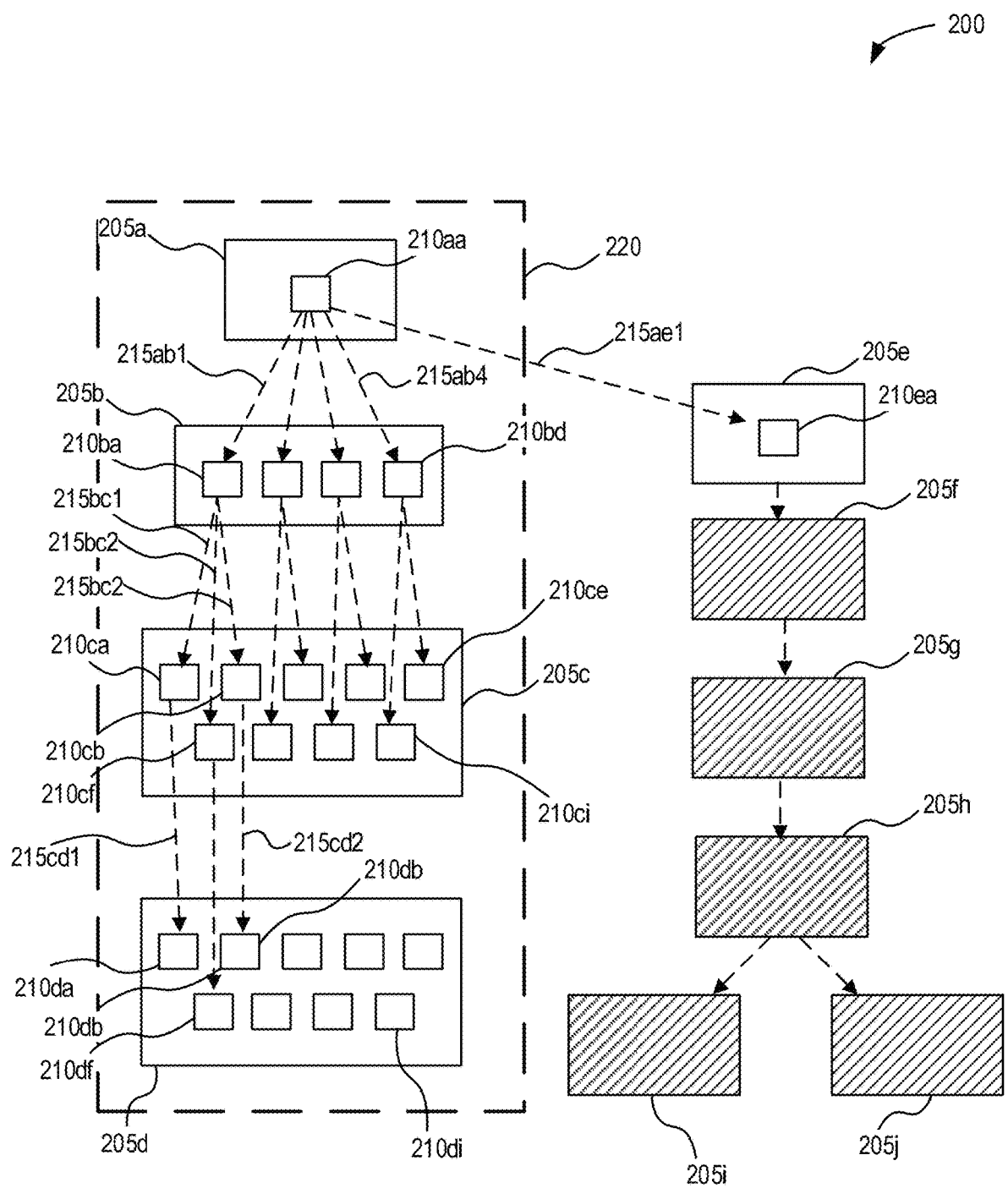
FIG. 2A is a block diagram of a project development graph that may be used with the system of FIG. 1 in accordance with an example embodiment.
Figure 2B:
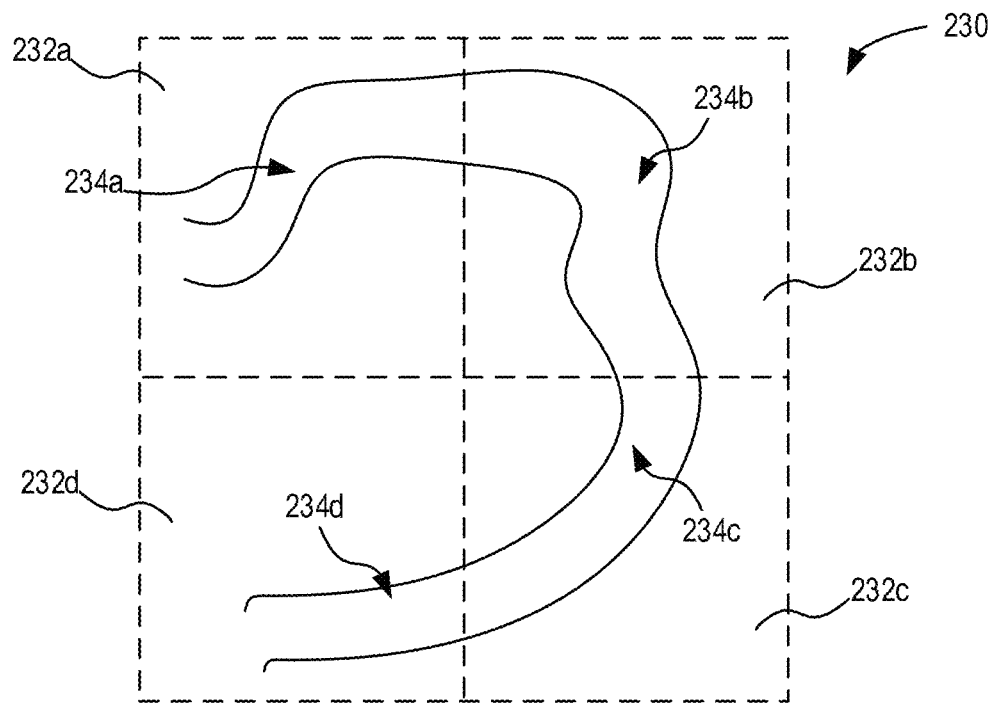
FIGS. 2B-2D are diagrams illustrating simplified examples of work products that may be generated using the electronic project development system of FIG. 1 in accordance with an embodiment.

Referring now to FIG. 2A, shown therein is a block diagram of an example project development graph or processing graph 200 in accordance with an embodiment. In describing FIG. 2A, reference will be made contemporaneously to FIGS. 2B-2D. The block diagram of processing graph 200 shown in FIG. 2A is a simplified example of a user interface that may be displayed to a user by the processing management application 140.

The processing graph 200 includes a plurality of nodes 205a-205j. In the example shown in FIG. 2A, each of the nodes 205a-205j is a processor node. Each node 205 includes one or more operational instance 210. The processing graph 200 also includes a plurality of links between the nodes 205. The nodes 205 are linked to arrange the processing graph 200 into a directed acyclic graph. The links between the nodes 205 can be used to define dependency relationships between the operational instances 210.

In the example shown in FIG. 2A, and in subsequent examples of processing graphs shown and described herein, each processor node is identified using by a reference numeral x05, such as 205, 405, 505, 705, 905 etc. The individual processor nodes within a given processing graph can be distinguished by a suffix character a, b, c and so forth.

In the example shown in FIG. 2A, and in subsequent examples of processing graphs shown and described herein, each operational instance is identified using by a reference numeral x10, such as 210, 410, 510, 710, 910 etc. along with a first suffix character a, b, c etc. that corresponds to the suffix character of the node within which that operational instance is located. Each operational instance also then includes a second suffix character a, b, c etc. to identify that operational instance within the specific node, where the second suffix character increments from left to right and then from top to bottom.

In the example shown in FIG. 2A, and in subsequent examples of processing graphs shown and described herein, each dependency relationship is identified using by a reference numeral x15, such as 215, 415, 515, 715, 915 etc. along with a first suffix character a, b, c etc. that corresponds to the suffix character of the upstream node and a second suffix character a, b, c etc. that corresponds to the suffix character of the downstream node. Additionally, the reference identifier for each dependency relationship also includes a third suffix number 1, 2, 3 etc. to distinguish the different instance dependency relationships between the nodes and the third suffix number is incremented from left to right and from top to bottom based on first, the operational instance in the upstream node involved in that dependency relationship and then the operational instance in the downstream node involved in that dependency relationship.

In some cases, the lead lines and reference characters for operational instances and/or dependency relationships may be omitted from the drawings for clarity and ease of understanding. However, those operational instances and/or dependency relationships may still be identified in the description using the above-described reference identifiers.

Each processor node 205 can be defined with a set of processing operations that are performable by that node 205. For instance, a processor node 205 may correspond to an executable file that defines a set of operations performable by that node. Examples of processor nodes 205 may include data import nodes, geometry creation nodes, rendering nodes, compiler nodes, simulation nodes and so forth.

The set of operations defined by a processor node 205 may be considered analogous to a function or formula. The processor node 205 can be configured to receive input data and perform the function defined by the set of operations to generate output data.

In some cases, the set of processing operations defined for a processor node 205 can include two or more variants of a processing operation set. The variants may be defined using operational variables for that processor node that can be changed for different operational instances. In other cases, the set of processing operations defined for a processor node 205 may include only a single variant of the processing operation set. Each operational instance 210 in a processor node 205 performs the set of processing operations defined for the processor node by performing a particular variant of the processing operation set.

In some cases, the processor node 205 may be configured to perform some or all of the variants of the processing operation set, e.g. based on the characteristics of the input data. For example, the processor node 205 may be configured to perform a set of operations that generates an outfit for a character in a video game. The set of operations for the processor node 205 may include variants of an outfit generation processing operation set for different kinds of characters (e.g. adult characters, teenage characters, child characters). The particular variant of the processing operation set performed by a given operational instance in the processor node 205 may be determined based on a character kind associated with the data (e.g. the upstream operational instance or external data file) upon which that operational instance depends.

In some cases, the processor node 205 may be configured to perform each variant of the processing operation set for each set of input data identified by that processor node (e.g. multiple simulations with changed environmental operational variables). The node instance generation criteria for the processor node 205 may then generate operational instances for each variant of the processing operation set that is required to be performed (e.g. for each state of the environmental operational variable). The processor node 205 can include a separate operational instance that depends on the same input data for each variant of the processing operation set.

Within a processing graph 200, the set of operations defined by an individual processor node 205 may need to be performed only once or they may need to be performed multiple times. This may vary depending on the input data being received by the processor node 205. Each separate time a given variant of the processing operation set within the set of operations is performed by the processor node 205 may be identified as an operational instance 210 of that node.

An operational instance 210 of a node 205 can identify data usable by that processor node 205 to perform the set of operations. The type of data identified by a particular operational instance 210 may vary depending on the set of operations defined by that processor node 205. For instance, an operational instance 210 may identify a file or file directory of data that can be imported by a processor node 205 configured to ingest data into the processing graph 200.

An operational instance 210 may also identify various types of geometry (e.g. points, edges, faces, primitives groups, curves etc.) that may be used by a processor node 205 to perform various types of operations such as generating an environmental feature such as terrain, a road, a building, water etc. Various other types of input data, e.g. images, complex objects (e.g. models of vehicles or characters), data from preceding frames, etc. may be identified by an operational instance.

For example, each operational instance 210 may identify a different set of parameters. The processor node 205 may define an executable file that can consume the parameters to generate and output an output file. In some cases, the parameters may be defined from a data file identified by the processor node. In other cases, the input data usable by an operational instance may be a modified form of the operational instance from the immediately upstream processor node, for example where the set of operations for the immediately upstream processor node involves modifying the operational instance (e.g. adding data to that operational instance).

Each operational instance 210 can identify data usable by the corresponding processor node 205. The processor node receives the identified data as an argument, and performs the set of operations defined by that processor node (e.g. a particular variant of the processing operation set) on the received data to generate an output file. For instance, the processor node can initialize a corresponding executable file or other function to operate on the identified data.

In some cases, the processor node 205 can include a separate operational instance 210 that identifies the same input data for each variant of the processing operation set.

In some cases, the processor node 205 may be configured to select, for each operational instance 210, a variant of the processing operation set (e.g. by adjusting an operational variable used in the processing operation). In some cases, the variant may be selected based on characteristics of the input data identified by that operational instance. In some cases, the variant may be selected randomly or partially randomly.

In some embodiments, the processor nodes 205 may be separated into different categories of processor nodes, namely root processor nodes and dependent processor nodes. Root processor nodes generally refers to processors nodes 205 that do not rely on data from upstream nodes as the input to operational node instances. For example, root processor nodes may identify data external to the processing graph in order to generate operational instances for that processor node. In other words, root processor nodes 205 always use data from somewhere other than an immediately upstream node in performing the set of operations. This may include data defined by the root processor node directly, such as parameters defined for the root processor node and/or a hard-coded set of operations to be performed by that processor node.

Dependent processor nodes are those that use data from upstream processor nodes in order to generate operational instances (i.e. the node instance generation criteria use data from an upstream node). These dependent processor nodes can use data generated by the operational instances in the immediately upstream node to perform the set of operations defined by that dependent processor node. In some cases, the dependent processor nodes may use parameter data from upstream nodes to perform the set of operations defined by that dependent processor node.

Processor node 205a is an example of a root processor node. In an example implementation, the node instance generation criteria for processor node 205a rely on a reference to external data, e.g. a file defining a set of points. The processor node 205a uses the data from the external source to perform the node-specific set of processing operations in operational instance 210aa.

Processor nodes 205b-205d are examples of dependent processor nodes. The node instance generation criteria for the processor nodes 205b-205d rely on data from the operational instances in the node immediately upstream (i.e. processor nodes 205a-205c respectively) in order to determine how many operational instances to generate. Similarly, those operational instances can use the data generated by the upstream operational instance upon which they depend when performing that instance of the set of processing operations defined by the corresponding processor node.

In every case, a dependent processor node will be positioned downstream from at least one other processor node. Similarly, the most upstream node in a processing graph 200 will always be a root processor node. However, it is not necessary that each root processor node be the most upstream node.

In some cases, a root processor node may be positioned downstream from another node. For example, a processing graph can be defined to include multiple processing sections. A processing section may be defined as a sequence of one or more consecutive processor nodes. Each processing section can include at least one processor node having one or more operational instances.

In some embodiments, separate processing sections may be joined using a connector node. In some such cases, a processor node downstream from a connector node may be a root processor node.

In some cases, the processing graph 200 can include multiple sub-trees, as shown in FIG. 2A. A processing sub-tree generally refers to a portion of a processing graph that begins with a root node and includes the nodes downstream from that root node within a single branch (i.e. within a single linear sequence of nodes). Each processing sub-tree includes at least one processor node, including at least one root node as the most upstream node, and may also include downstream nodes that depend from that most upstream root node. For instance, processor nodes 205a-205d can be considered a first processing sub-tree 220. Processor nodes 205a and nodes 205e-205i can be considered a second processing sub-tree, while processing nodes 205a, 205e-205h, and 205j can be considered a third processing sub-tree.

In the processing graph 200, each processing sub-tree has a single processing section. A processing section generally refers to an uninterrupted sequence of processor nodes. In other embodiments, a processing sub-tree may include multiple sections that can be joined using connector nodes (described in further detail below).

In the example of FIGS. 2A-2D the processor node 205a may be configured to define a curve using input data that includes a set of points, the processor node 205b can be configured to define a road using input data that defines a curve, the processor node 205c can be configured to generate and position a tree using input data that defines a road, and the processor node 205d can be configured to generate and position decorations using input data that defines a tree.

The processor node 205a may import a set of points. The set of points may correspond to a curve defined in a design application 160. The processor node 205b may be configured to generate a portion 232 of environment 230 that includes a road 234. The set of operations defined by the processor node 205b may be such that the curve, imported by processor node 205a, is transformed into a road 234 within the environment 230.

The processor node 205b may include node instance generation criteria that identify portions 232a-232d of the environment 230 within which each curve, imported by node 205a, is located (in the example shown, there is only one curve identified by operational instance 210aa). The processor node 205b may generate operational instances 210ba-210bd, with each operational instance 210bx corresponding to the portion of the curve within a particular portion 232a-232d of the environment 230.

The data output generated by processor node 205b can define the environment 230 with road 234 positioned within the various environment portions 232a-232d. Each individual operational instance 210ba-210bd can generate the road segment 234 for one of those environment portions 232a-232d. Each individual operational instance 210ba-210bd can perform the same set of operations (i.e. converting a curve to a road) using different input data received from processor node 205a (i.e. different segments of the curve).

In other cases, more or different numbers of operational instances 210bx may be generated based on the curve defined by processor node 205a. For example, if the curve were only within three portions 232 of the environment 230, then processor node 205b would only generate three operational instances. Alternatively, if the processor node 205a imported a set of points corresponding to multiple curves, processor node 205a might include multiple operational instances, each of which might spawn one or more operational instances in processor node 205b dependent on the portions 232a-232d within which each of those curves was positioned.

The dependency relationships 215 defined in the processing graph 200 can identify, for each downstream operational instance, the corresponding upstream operational instance upon which that downstream operational instance relies for data in order to perform the set of processing operations defined by the corresponding downstream processor node.

The dependency relationships 215 can be generated based on the node instance generation criteria defined by a dependent node. The node instance generation criteria can identify how new operational instances are generated in a dependent node based on data associated with an upstream node. That is, the node instance generation criteria can describe node-level dependency criteria. Using these node-level dependency criteria, the processing management application 140 can also identify the data used by a dependent operational instance, and the specific upstream operational instance from which that data may be provided. The processing management application 140 can then define a dependency relationship between those individual operational instances.

For example, the processor node 205b can define a set of operations configured to generate a road segment based on curves generated by processor node 205a using points imported by that processor node 205a. The node generation criteria in processor node 205b can specify that an operational instance is generated to define a segment of the road within a specific environmental region of environment 230.

In the example shown, the set of points imported by processor node 205a defines a single curve represented in operational instance 210aa. Each operational instance 210ba-210bd can depend from the same upstream operational instance 210aa. Each operational instance 210ba-210bd uses data (i.e. a portion of the curve) generated by that upstream operational instance 210aa as an input to its set of processing operations.

Figure 2C:
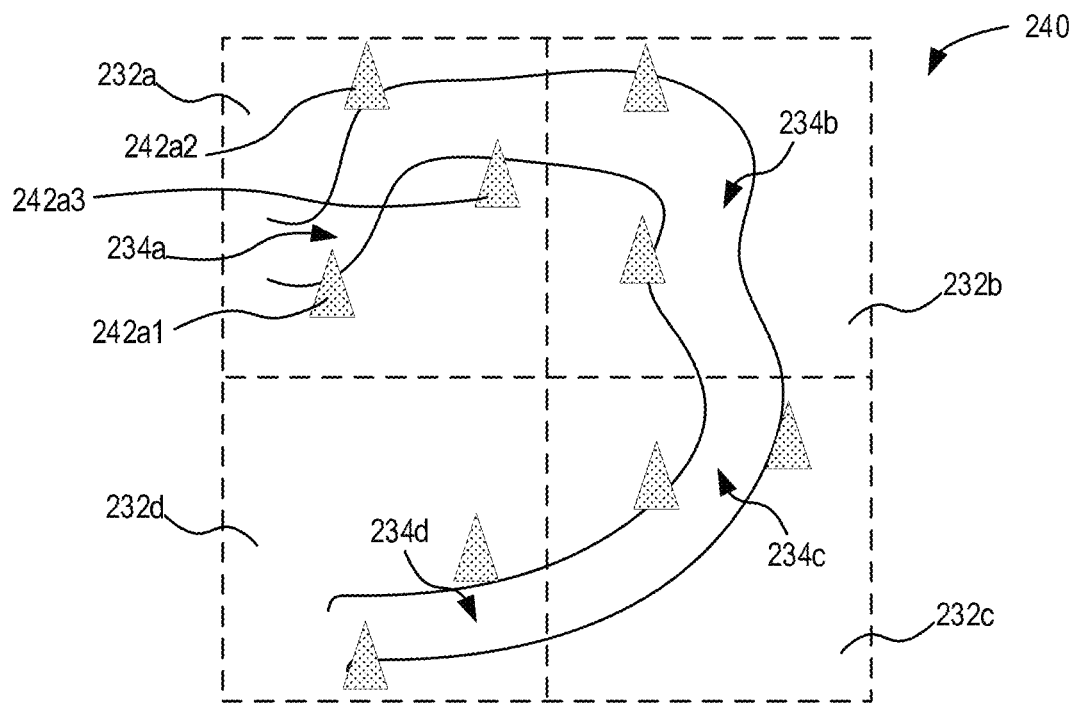
Figure 2D:
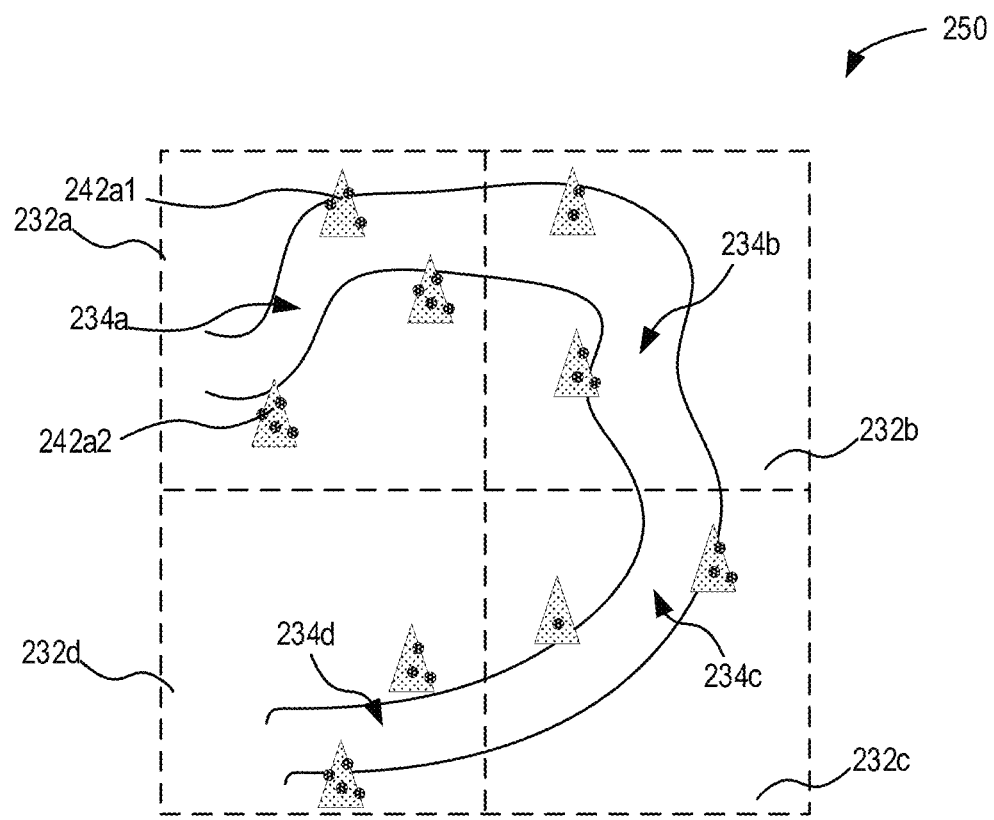

The third processor node 205c may define a set of operations used to generate trees for the environment. FIG. 2C illustrates an example of an environment 240 in which a plurality of trees 242 have been generated alongside segments of the road 234.

The node instance generation criteria defined for the processor node 205c can depend on the roads generated by the operational instances 210ba-210bd. For instance, the node instance generation criteria may specify that trees be generated at specified intervals along the road 234. The number of operational instances generated in processor node 205c may thus depend on the length of the road segments 234a-234d generated by the operational instances 210ba-210bd.

In processing graph 200, the processor node 205c generated nine operational instances 210ca-210ci based on the length of the road generated by the operational instances 210ba-210bd. Each operational instance 210ca-210ci has a dependency relationship 215bc1-215bc9 with one of the operational instances 210ba-210bd (i.e. that operational instance that generated the road segment adjacent to which a tree is to be positioned). Each operational instance 210ca-210ci may then generate one of the trees 242 based on the set of operations defined for processor node 205c, which can define variants adjusting the position along the length of the road 234 at which the tree is positioned.

The processor node 205d may define a set of operations usable to decorate the trees 242. In this case, the node instance generation criteria may specify that each tree 242 is to be decorated. The node instance generation criteria for processor node 205d can then generate an operational instance 210da-210di corresponding to each of the operational instances 210ca-210ci. Environment 250 illustrates how the operational instances 210da-210di can generate decorations for each of the trees 242.

In some cases, a processor node such as processor node 205d can be defined to include two or more variants of a processing operation set. For example, the variants may be generated based on adjustable or random operational variables. For instances, as shown in environment 250, the processor node 205d is defined to perform the operations required to decorate the trees 242 using variants of the same processing operation set by randomly modifying the number of decorations on each tree. The number of decorations on a tree may be considered an operational variable in this example.

In some cases, the node instance generation criteria for a processor node 205 may be more complex. For instance, processor node 205c may be configured to generate a first type of tree in environmental regions 232a and 232b and a second type of tree in environmental regions 232c and 232d or that trees be generated alternating between the first type of tree and the second type of tree. The node instance generation criteria for processor node 205d, in turn, may specify that only the first type of tree be decorated. Accordingly, operational instances of processor node 205d may be generated to correspond only to the operational instances in processor node 205c that generate trees of the first type. In other words, operational instances in processor node 205d are only generated for those trees generated in processor node 205c that are to be decorated according to the criteria defined in processor node 205d.

As another example, the processor node 205b may be configured to generate various types of roads, e.g. streets, boulevards, highways etc. The processor node 205c, in turn, may include variants configured to generate trees of different types and spacing based on the type of road generate at processor node 205b.

Since each operational instance 210ca-210ci has a dependency relationship 215bc1-215bc9 on a corresponding upstream operational instance 210ba-210bd, changes to the road 234 can be perpetuated directly to the decorated trees affected, via these dependency relationships. Changes to processor node 205a and/or 205b can be perpetuated through to processor nodes 205c and 205d using the dependency relationships 215ab1-215ab4, 215bc1-215bc9, and 215cd1-215cd9 as well as the node instance generation criteria of the dependent processor nodes 205b-205d.

Initially, a modification to the curve generated by processor node 205a can result in updating the operational instances 210ba-210bd. For instance, if the curve generated by operational instance 210aa changed so that the road segment 234a was shortened and road segment 234d were removed, the processor node 205b can update its operational instances to eliminate operational instance 210bd using its node instance generation criteria. The removal of operational instance 210bd can then be perpetuated to processor nodes 205c and 205d by removing operational instances 210ce, 210ci, 210de and 210di.

The processor node 205b can also identify operational instance 210ba as modified or dirtied. Additionally, the operational instances 210ca, 210cb, 210cf, 210da, 210db, and 210df linked to operational instance 210ba by a dependency relationship can be identified as potentially modified. In some cases, these potentially modified operational instances may be identified as requiring re-computation.

In some cases, the processor node 205b may determine that operational instances 210bb and 210bc are not modified prior to re-computing any operational instances. Accordingly, the processor node 205b may identify only operational instance 210ba as modified or dirtied.

The processing graph 200 may then re-compute only those operational instances that have been identified as modified. In some cases, operational instances that have been identified as potentially modified may only be re-computed once the immediately upstream operational instances have been computed and it has been determined that a modification has occurred. Examples of processes for modifying operational instances and perpetuating changes is described in further detail herein with reference to FIGS. 8 and 9.

The project management application 140 can also provide feedback in the processing graph 200. For instance, a user may select a particular operational instance such as operational instance 210ba. The project management application 140 may then visually identify all the downstream operational instances (i.e. operational instances 210ca, 210cb, 210cf, 210da, 210db, and 210df) that depend from operational instance 210ba. Additionally or alternatively, the project management application 140 can identify the dependency relationships that depend from operational instances 210ba.

This may provide a user with proactive feedback on the level of re-computation that may be required if a modification is made to operational instance 210ba. The user may then consider whether the impact of the modification is sufficient to warrant the additional computation time and cost required.

In some embodiments, the project management application 140 may also provide feedback on the processing performed by individual operational instances. For instance, the project management application 140 may mark individual operational instances using different colors and/or symbols to identify characteristics associated with those operational instances, such as the computation time required for that operational instance and/or the output file size. In some cases, the operational instances markings may be relative (e.g. red/yellow/green for long, medium, and short computation times). This may allow a user to identify problems with individual operational instances and may facilitate debugging.

In some cases, multiple operational instances may correspond to the same input data. For instance, a processor node may correspond to a simulator file that can perform a wedge of simulations (i.e. a plurality of variants of the simulation). A processing graph including the wedge simulation processor node may be configured to simulate a range of scenarios for a vehicle.

The simulator file may include one or more adjustable variables that are used to define variants of the simulations using data received from an upstream processor node. A plurality of operational instances in the simulator processor node may then perform the simulation on the same input data with changed variables between the operational instances. The simulator processor node can then provide a plurality of independent simulations based on a pre-defined range of scenarios.

For example, an initial processor node may correspond to a file identifying a source of points. The processor node can be configured to import the plurality of points to a plurality of operational instances, and the operational instances can serialize the point data to a data file.

A downstream processor node can be configured to generate a vehicle model, such as a spaceship for example, from a set of points defined in a data file. For example, the processor node may be an executable file from a design application such as Houdini. The processor node can invoke the Houdini spaceship generation HDA, and then use the set of points generated from the upstream operational instances to generate an output file defining a spaceship model.

A subsequent downstream processor node can be configured to perform a plurality of crash simulations for a vehicle. The downstream processor node can define a set of operations that simulate a vehicle crashing into a pre-defined object under varying environmental condition. For each vehicle defined by an upstream operational instance, the simulator processor node can perform a separate simulation for each pre-defined set of environmental conditions (i.e. for each variant). The simulator processor node may thus define a plurality of operational instances for each upstream operational instance that defines a vehicle.

In some cases, the systems and methods described herein may include nested processing graphs. The processing graph 200 may include one or more other processing graphs nested therein. In some cases, an individual processor node 205 in processing graph may actually invoke a separate processing graph that performs the set of operations defined by the processor node 205.

For instance, each operational instance 210ca-210ci of processor node 205c may invoke a separate processing graph to generate a tree. As a simple example, the tree generation processing graph may include a sequence of processor nodes that includes a root processor node that generates a tree trunk of a variable size, a downstream processor node that generates tree branches based on the size of the tree, and then a subsequent downstream processor node that generates leaves for the tree branches. Each time an operational instance 210ca-210ci is activated to generate a tree, the tree generation processing graph can be invoked and executed.

As another example, in a project development graph used to generate a virtual environment for a video game a first processing graph may include processor nodes that each define how buildings, terrain and roads interact with one another within an environment. The first processing graph may include a first processor node for terrain generation, a second processor node for road generation, and a third processor node for building generation. The third processor node may, in turn, refer to a separate processing graph that defines a sequence of processing operations that are used to generate individual buildings. This nested processing graph may then include separate processor nodes for generating a building base shape, generating windows, generating doors, and generating furniture within the building.

Figure 3:
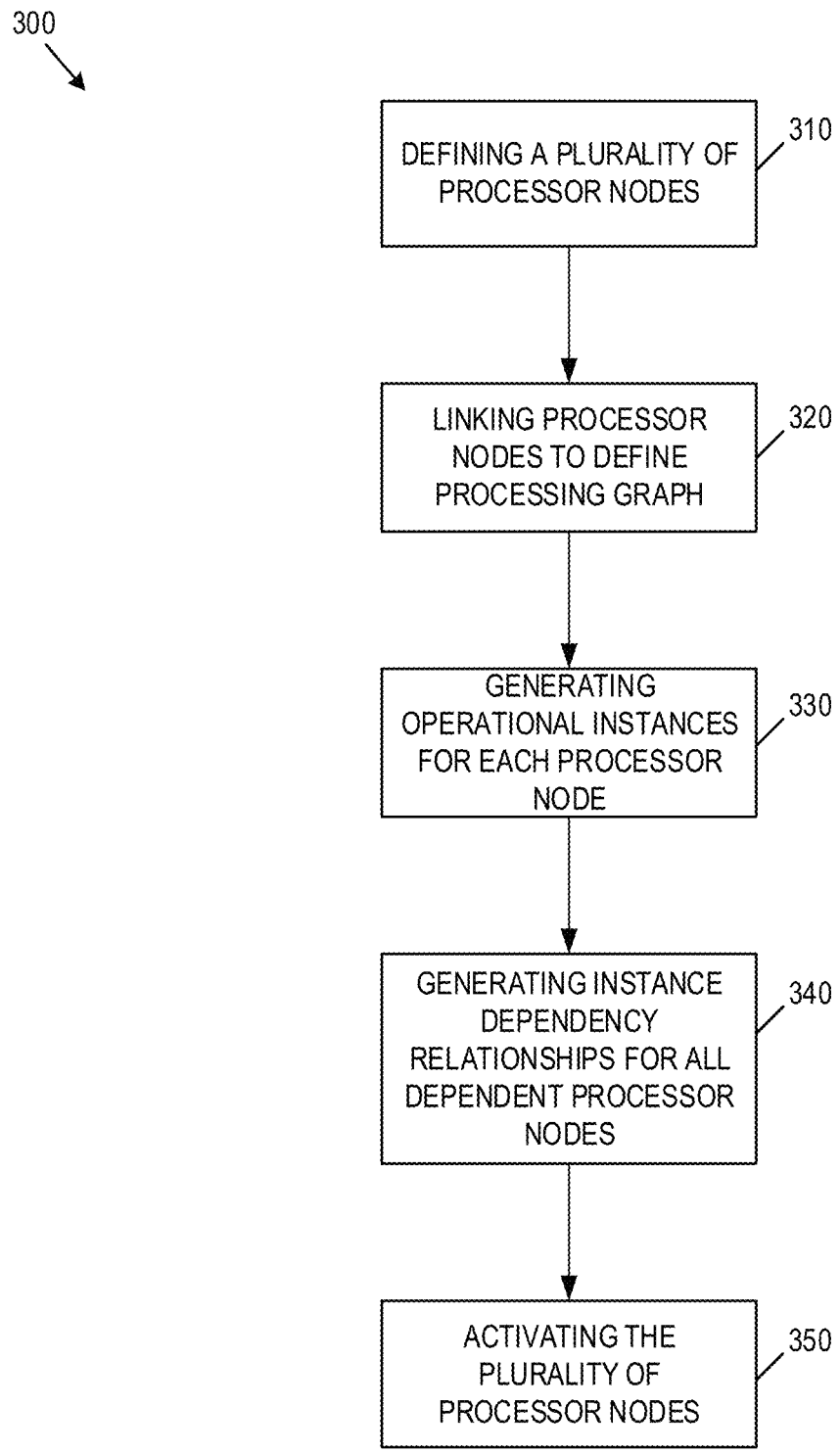
FIG. 3 is a flowchart illustrating a method of managing a plurality of processing operations in accordance with an example embodiment.

Referring now to FIG. 3, shown therein is a flowchart illustrating a method or process 300 of managing a plurality of processing operations in accordance with an embodiment. Method 300 may be carried out by various components of system 100, such as the processing management application 140 operating on computing device 105.

At 310, a plurality of processor nodes can be defined. Each processor can define a node-specific set of operations that can be performed by that processor node. The processor node can be configured to receive input data and perform the node-specific set of operations on the input data to generate output data.

Examples of node-specific sets of operations can include processing operations, such as generating a road from input data defining a curve, compiling input data into a compiled output file, rendering an image from input data, performing a simulation, generating waves physics from input data defining movement of a boat through water, generating water froth physics from input data defining waves physics etc.

The node-specific set of operations can include multiple variants of a processing operation set. The variants may be generated using adjustable operational variables for the processor node. In some cases, the processor node may specify that the processing operations be performed multiple times/instances with adjustments to the operational variables to generate variants of the same processing operation set. For instance, the node-specific set of operations defined by a processor node may involve simulating a crash of a vehicle model for a variety of different environmental conditions. The processor node may thus define multiple values of environmental operational variables to be used in different instances of performing the processing operations for that node.

Each processor node can also define node instance generation criteria. The node instance generation criteria can specify what data is to be used when performing the node-specific set of operations. The node instance generation criteria can also be used to define how may time the node-specific set of operations are performed by the processor node.

The plurality of processor nodes can include at least one root processor node. A root processor node can identify one or more data files or objects that are not provided by an immediately upstream processor node as the input data to be used in generating operational instances and performing the node-specific set of operations.

The plurality of processor nodes can also include one or more dependent processor nodes. Dependent processor nodes can identify data from other nodes to be used in performing the node-specific set of operations defined by that node.

In some cases, a user may deploy a node within the user interface of the processing management application 140 by dragging and dropping a node icon. A user may then identify the deployed node as a processor node. For example, the processing management application 140 can include a command field associated with the deployed node in which a user can identify an executable file. The executable file can define the set of operations performable by that processor node.

Various different types of files can be identified in processing management application 140 to define the operational instances for a processor node. The processor node may use the data in the identified file to generate operational instances.

For example, a root processor node may be defined to import a plurality of data points to the processing graph. That root processor node may identify a source of points file that includes the data to be imported to the processing graph. A user may then identify an executable file that is configured to convert a set of points to an environmental geometry (e.g. converting a set of curves into a road) as a dependent processor node. Other examples of executable files that may be used to define the set of operations for a processor node may include compilers (e.g. an executable operable to convert source code (0.0 files) to binary (.obj files)), renderers (e.g. an executable operable to creating image from data), simulation executables, and many other types of executable files that may be specific the project being developed.

In some cases, processor nodes may be pre-defined within the processing management application 140. For example, data import processor nodes, compiler nodes, and renderer processor nodes may be examples of commonly-used nodes pre-configured within the processing management application 140. The processing management application 140 can also include application programming interfaces to one or more design applications 160 to allow processor nodes to be pre-configured based on operations performed within those design applications.

In some cases, a user may configure customized processor nodes. For example, the processing management application 140 may provide a user interface that allows a user to define characteristics of a processor node. In some cases, the processing management application 140 may allow users to code new processor nodes, e.g. using Python. A user may also interact with the design application 160 to configure a custom processor node that may be implemented by the processing management application 140.

At 320, the plurality of processor nodes can be linked to define a processing graph. The processing graph can include the plurality of processor nodes with links between specific nodes. The processing graph can be configured as a directed acyclic graph. Thus, data generated by upstream nodes can flow unidirectionally to downstream nodes.

The processing graph includes at least one root node. The upstream-most node of the processing graph will always be a root node, as it is necessary to identify where the data used in the processing graph will come from.

The processing graph can also include one or more downstream nodes linked to the root node(s). The downstream nodes can include dependent processor nodes. Each dependent processor node will be a downstream node linked to at least one upstream processor node. Additionally, each dependent processor node will be linked to an upstream root node through the processing graph.

The processing graph can be configured with a branching tree structure. In some cases, the processing graph may include multiple separate sub-trees. Each processing sub-tree can include at least one processor node, including at least one root node as the most upstream node, and may also include downstream nodes that depend from that most upstream root node.

In some cases, the sub-trees may partially overlap. For example, an upstream portion of the processing graph may be shared between separate sub-trees. The shared upstream portion can include a shared upstream root node.

In some cases, different sub-trees may depend from different root nodes. In some such cases, a downstream portion of the sub-trees may be linked using one or more connector nodes.

The order of the operations shown in method 300 is merely exemplary. For example, the step of activating the processor nodes shown at 350 may occur prior to generating the instance dependency relationship shown at 340 (and may even occur prior to generating operational instances for some or all of the processor nodes). As well, the operations performed in steps 330-350 may be performed repeatedly and may sometimes occur contemporaneously or simultaneously.

At 330, each processor node can generate at least one operational instance. Each operational instance can identify input data (e.g. at least one input data object/file or parameter data) usable by that processor node to perform the node-specific set of operations. Each operational instance refers to a specific instance in which the set of operations defined by a processor node will be performed.

In some cases, method 300 may initially operate so that only the root processor nodes generate at least one operational instance at 330. The dependent processor nodes may only generate operational instances once the processing operations for at least one upstream operational instance have occurred. Accordingly, the dependent processor nodes may perform the operations of step 330 only after the processor nodes (or at least the upstream processor nodes) have been activated and have performed the set of operations in at least one operational node instance.

Each operational instance can perform a variant of the same set of operations (in some cases there is only one variant), however the input data and/or the variant may be adjusted between the different operational instances. Each operational instance can generate output data (i.e. an output data object/file) by performing the node-specific set of operations on the input data identified by that operational instance.

Each processor node can generate operational instances using the node instance generation criteria defined for that processor node at 310. The node instance generation criteria specify how the input data usable by the processor node is identified.

For a root processor node, the node instance generation criteria can identify a node-specific set of input objects/files usable by that processor node (e.g. an external file with data to be imported to the processing graph. Each operational instance is generated from the node-specific set of input objects according to the node instance generation criteria.

For a dependent processor node, the node instance generation criteria can identify how data from the operational instances in the node immediately upstream in the processing graph is to be consumed by that processor node. The node instance generation criteria can specify that the operational instances in the dependent node are generated as a function of the at least one output data object generated by the operational instances in the processor node immediately upstream in the processing graph.

An operational instance in an upstream processor node can generate various types of data objects. This can include both the specific data being output (e.g. a curve, a road, a tree, a spaceship model, a crash simulation) and data associated with that operational instance (e.g. an instance identifier/index; a processing status such as processed or unprocessed; a modification status such as unmodified, potentially modified or dirtied/modified). The node instance generation criteria can use the data generated by the operational instance in the upstream processor node(s) to generate one or more dependent operational instances.

In some cases, the node instance generation criteria may rely solely on the presence of an upstream operational instance. For example, where the node instance generation criteria specify that each tree 242 is decorated, then a dependent operational instance in processor node 205d can be generated for each operational instance in processor node 205c by identifying that the corresponding operational instance has been generated in processor node 205c.

In some cases, the node instance generation criteria may use data fields of upstream operational instances in order to generate dependent operational instances. The node generation criteria may even use parameter settings of that processor node in order to generate operational instances.

As another example, the node instance generation criteria for a processor node may specify that, for each vehicle model generated by the immediately upstream processor node (i.e. for each operational instance in the immediately upstream processor node), a plurality of variants of the same simulation are to be run (i.e. a plurality of dependent operational instances are generated for each operational instance in the immediately upstream processor node). Thus, the dependent processor node can generate its operational instances by merely identifying the existence of the operational instance in the immediately upstream node. In some cases, however, a dependent processor node may nonetheless generate operational instances only once the upstream operational instances have completed processing, since it may be that only once the upstream processing is done completed is the data available for the downstream operational instance to perform its set of operations.

In some cases, the node instance generation criteria may require the informational content of the output data object generated by an upstream operational instance to be evaluated. For example, where the dependent processor node is configured to decorate only trees of a certain type, the node instance generation criteria can evaluate the type of tree generated by each upstream operational instance and generate a dependent operational instance for only those operational instances that generated a tree of the appropriate type.

In some cases, the processing management application 140 may generate some or all of the operational instances dynamically. For example, the processing management application 140 may generate downstream operational instances concurrently while other operational instances are performing processing operations (e.g., an upstream operational instance may be computed, and a downstream operational instance may be generated in response). This may occur, for example, when the processing graph is activated the first time and/or modifications are made in a design application 160.

At 340, instance dependency relationships can be generated for each dependent processor node. Each instance dependency relationship can define, for a particular operational instance in the dependent processor node, the operational instance in the processor node immediately upstream that generates the data usable by that particular operational instance. In other words, the instance dependency relationship for a dependent operational instance specifies which of the operational instances in the node immediately upstream that dependent operational instance depends upon for data in order to perform the node-specific set of operations.

In some cases, two or more downstream operational instances may depend on the same upstream operational instance. That is, the instance dependency relationship for at least two downstream operational instances may identify the same upstream operational instance.

The processing graph may include a series of processor nodes. Each processor node may include a plurality of operational instances. The instance dependency relationships can define a one-to-one relationship between subsequent operational instances within those processor nodes. This may facilitate the perpetuation of changes through the processing graph, while avoiding unnecessary re-computation of operational instances unaffected by upstream changes.

At 350, the plurality of processor nodes in the processing graph can be activated. The processing management application 140 may activate the plurality of processor nodes to perform the corresponding set of node-specific operations.

When the processor nodes are activated, each processor node can perform its corresponding node-specific set of operations when the input data usable by that processor node is available. That is, for each operational instance, the processor node can perform its node-specific set of operations on the input data identified by that operational instance when the input data identified by that operational instance is available.

The instance dependency relationship defined for a downstream operational instance can identify the upstream operational instance from which the input data to the downstream operational instance can be retrieved/identified. The input data for a downstream operational instance may be available following the generation of the at least one upstream output data object by the operational instance in the processor node immediately upstream that is identified by the dependency relationship defined for that downstream operational instance.

Figure 7A:
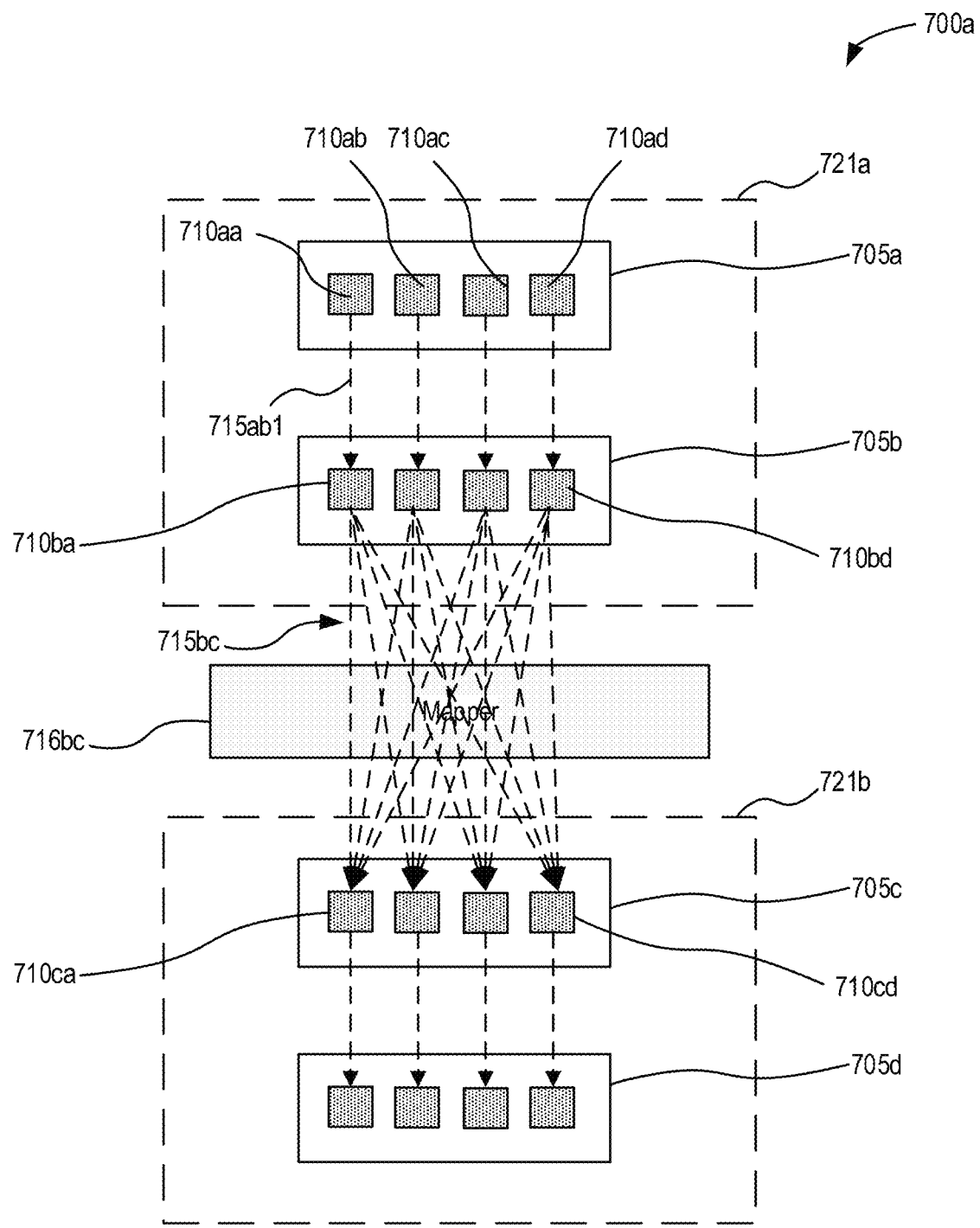
FIG. 7A is a block diagram of another project development graph that may be used with the system of FIG. 1 in accordance with an example embodiment.
Figure 7B:
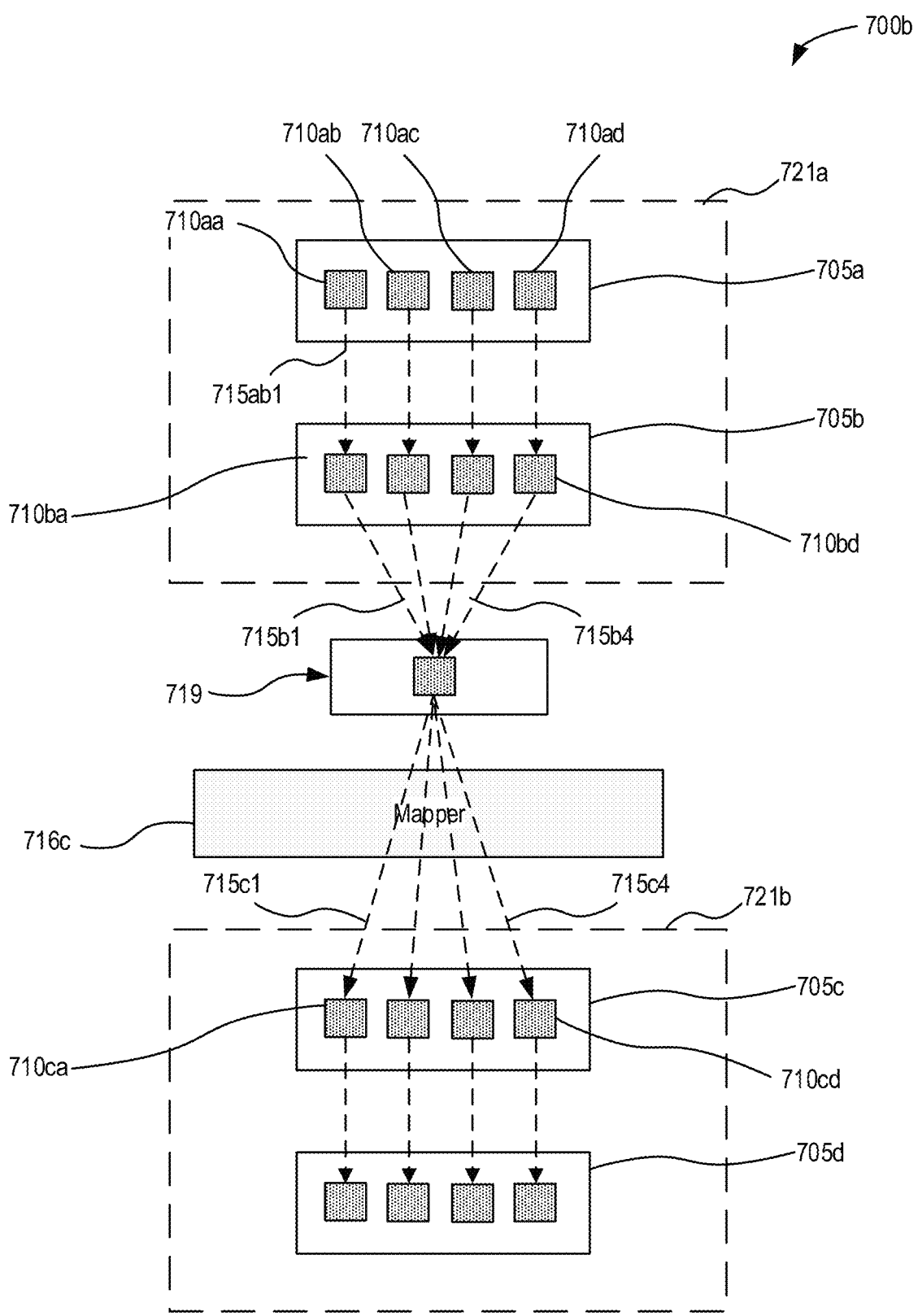
FIG. 7B is a block diagram of another project development graph that may be used with the system of FIG. 1 in accordance with an example embodiment.
Figure 7C:
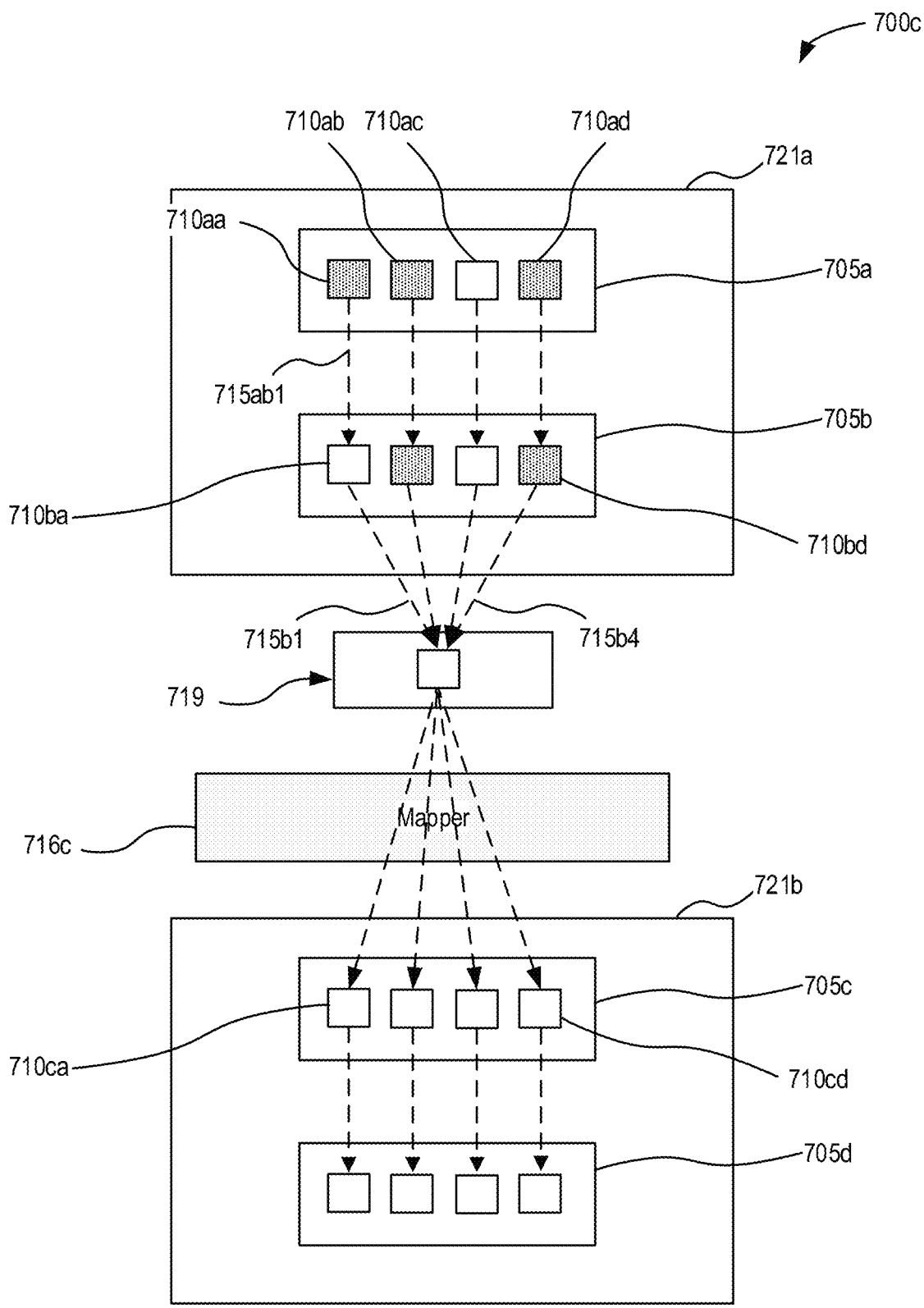
FIG. 7C is a block diagram of the project development graph of FIG. 7B with some operational instances that have not yet been processed in accordance with an example embodiment.

In some cases, the input data for a downstream operational instance may be available immediately following the generation of the at least one upstream output data object by the operational instance in the processor node immediately upstream as identified by the instance dependency relationship. However, there may be cases in which data that has been generated is not immediately available. For example, the availability of the input data for a downstream operational instance may be delayed to ensure that all upstream operational instances upon which that downstream operational instance relies have completed their set of processing operations. Examples of processing graphs in which the availability of input data may be intentionally delayed is shown in FIGS. 7A-7C and described herein below.

Method 300 is an example of process that may be used to generate a multi-component output product, such as a video game environment, a series of video frames, a simulation, and various other electronic projects. Initial components of a plurality of input objects can be defined using a design application 160. The input objects can be imported into a processing graph using a processor node. The processing graph can be defined using the processing management application 140 to include a plurality of processor nodes that perform operations related to the desired output project. Those processor nodes, once activated, can generate output data objects that may form part of the final work product. The multi-component output work product may then be generated by combining the output data objects generated by the plurality of processor nodes.

As mentioned above, steps 300-350 shown in method 300 are merely exemplary. In particular, steps 330-350 may be ordered differently and may occur repeatedly. For example, in some embodiments, method 300 may initially proceed so that only the root processor nodes generate at least one operational instance at 330. The method 300 may then proceed directly to step 350 where the root processor nodes are activated and the set of operations defined by the operational instance generated for those root processor nodes can then be performed. The method 300 may then continue with steps 330 and 340 being performed on a continual, and ongoing, basis in response to the performance of the set of operations for a given operational instance. When an operational instance completes performance of its set of operations, the immediately downstream processor node may perform steps 330 and 340 to generate any downstream operational instances that depend on the operational instance that has just completed its set of operations, and to generate the instance dependency relationships for those downstream operational instances. This process may continue with multiple operational instances being activated contemporaneously and the downstream operational instances and dependency relationships being generated contemporaneously based on the completed processing of multiple upstream operational instances.

In some cases, the operational instances and dependency relationships for a processing graph may be generated entirely without requiring any processor nodes to be activated. For example, where a processing graphs consists entirely of sequences of root nodes and mapper nodes, the operational instances and dependency relationships may be generated without requiring any of the operational instances to perform their corresponding set of operations. Initially, the processing management application 140 may generate root operational instances for each of the root processor nodes. Internal dependencies (if any) between the root operational instances may then be generated (e.g. sequential dependency relationships and/or batch operational instances). Dependency relationships between root operational instances in root processor nodes that are linked by mapper nodes may then be generated by applying the mapping criteria defined by the mapper node. In some cases, these defined dependencies can be output as a static dependency processing graph, e.g. in a JSON file. This processing graph (e.g. the JSON file) may then be provided directly to the computation resources 152, for instance using scheduling application 150 to perform the tasks defined by that processing graph.

Referring back to the example described in relation to FIGS. 2A-2D, the multi-component work product may be a digital environment, such as one that may be used for a video game. A user may interact with a user interface on the design application 160 to draw a line or curve to indicate the intended path of a road. The processor nodes 205 can be arranged into the processing graph 200 in order to generate the environment 250, including the road, trees, decorations etc. The processing management application 140 may then manage the processing operations required to generate environment 250 in response to the user defining the points defining the path for the road.

The plurality of processor nodes in the processing graph can be configured to operate contemporaneously/simultaneously. In some cases, this may allow the processing operations to be performed for downstream operational instances prior to completing the processing associated with all of the operational instances in nodes upstream therefrom. A downstream processor node may perform the corresponding node-specific set of operations on at least one of the downstream operational instances prior to the completion of the node-specific set of operations for each of the upstream operational instances in at least one node upstream therefrom.

Referring now to FIGS. 4A-4D, shown therein is a simplified example of a processing graph 400 and the corresponding environment 430 generated by the processing operations managed by processing graph 400.

Figure 4A:
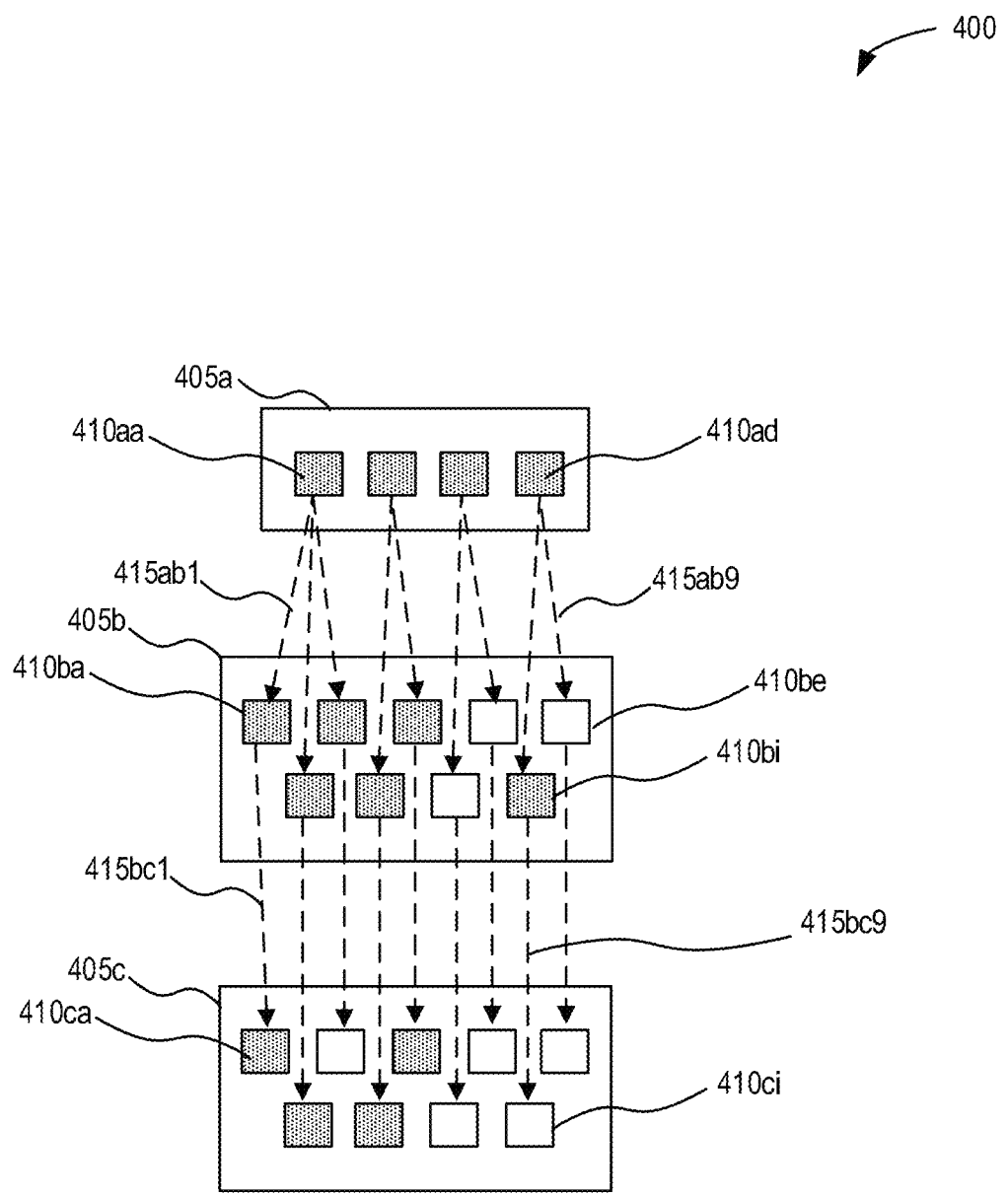
FIG. 4A is a block diagram of another project development graph that may be used with the system of FIG. 1 in accordance with an example embodiment.

As shown in FIG. 4A, processing graph 400 includes a processing section that includes processor nodes 405a-405c. The upstream most processor node 405a is an example of a root processor node. The node instance generation criteria defined by processor node 405a can thus identify input data from an external data location (e.g. a file or file directory) that can be imported to processing graph 400 and/or data defined directly by processor node 405a, such as node parameters and/or hardcoded operations. In this example, the node instance generation criteria for processor node 405a are configured to generate road segments 434a-434d for environmental regions 432a-432d based on curve data from an input file.

Processor nodes 405b and 405c are downstream, dependent nodes. Processor node 405b depends from processor node 405a and processor node 405c depends from processor node 405b (and thus indirectly from processor node 405a). The node instance generation criteria defined by processor node 405b specifies how data associated with the upstream operational instances 410aa-410ad can be used to generate operational instances 410ba-410bi. The node instance generation criteria defined by processor node 405b can also be used to define the dependency relationship between processor node 405b and processor node 405a that is used to generate the instance dependency relationships 415ab1-415ab9.

The node instance generation criteria defined by a downstream processor node may result in multiple operational instances being generated that depend from the same upstream operational instance. For example, the node instance generation criteria defined by processor node 405b result in three separate operational instances 410ba, 410bb, and 410bf being generated, each of which has an instance dependency relationship with operational instance 410aa. In this example, processor node 405b is configured to generate a tree at specified intervals of a road segment.

Similarly, the node instance generation criteria defined by processor node 405c specifies how data associated with the upstream operational instances 410ba-410bi can be used to generate operational instances 410ca-410ci. The node instance generation criteria defined by processor node 405c can also define the dependency relationship between processor node 405c and processor node 405b that is used to generate the instance dependency relationships 415bc1-415bc9. In this example, processor node 405c is configured to decorate each tree generated within the environment 430.

In some cases, the operational instances in downstream processor nodes (such as processor nodes 405b or 405c) may be generated dynamically while the processing graph is operational (i.e. while operational instances are performing processing operations). For example, the operational instances in processor node 405c may be generated based on the informational content generated by the operational instances in processor node 405b (e.g. generating a tree at specified intervals along a road). Accordingly, the processor node 405b may not be able to generate the operational instances 410ba-410bi until the individual upstream operational instances 410aa-410ad have completed their processing operations and generated output data. The processor node 405b may then evaluate the output data from operational instances 410aa-410ad dynamically (i.e. while the processing graph 400 is operational) using the node instance generation criteria. Based on this evaluation, the processor node 405b may define operational instances. The operational instances in processor node 405b may be generated based on an upstream operational instance without requiring all of the upstream operational instances 410aa-410ad to have completed their set of operations.

FIG. 4A illustrates the processing graph 400 in a first, intermediate processing state, in which the operational instances 410 that are filled in (i.e. operational instances 410aa-410ad, 410ba-410bc, 410bf, 410bg, 410bi, 410ca, 410cc, 410cf, and 410cg) have performed the node-specific set of operations, while the operational instances that are unfilled (i.e. operational instances 410bd, 410be, 410bh, 410cb, 410cd, 410ce, 410ch, and 410ci) have not.

As shown in FIG. 4A, some operational instances 410ca, 410cc, 410cf, and 410cg in processor node 405c have performed their node-specific set of operations prior to the completion of the processing operations for operations instances 410bd, 410be, and 410bh in the upstream node 405b. However, for each downstream operational instance 410ca, 410cc, 410cf, and 410cg the upstream operational instance (i.e. 410ba, 410bc, 410bf, and 410bg) identified by the corresponding instance dependency relationships have completed their processing operations. Accordingly, the input data need for operational instances 410ca, 410cc, 410cf, and 410cg (as well as operational instances 410cb and 410ci, which have not yet performed their node-specific set of operations) is available for use by those operational instances.

Figure 4B:
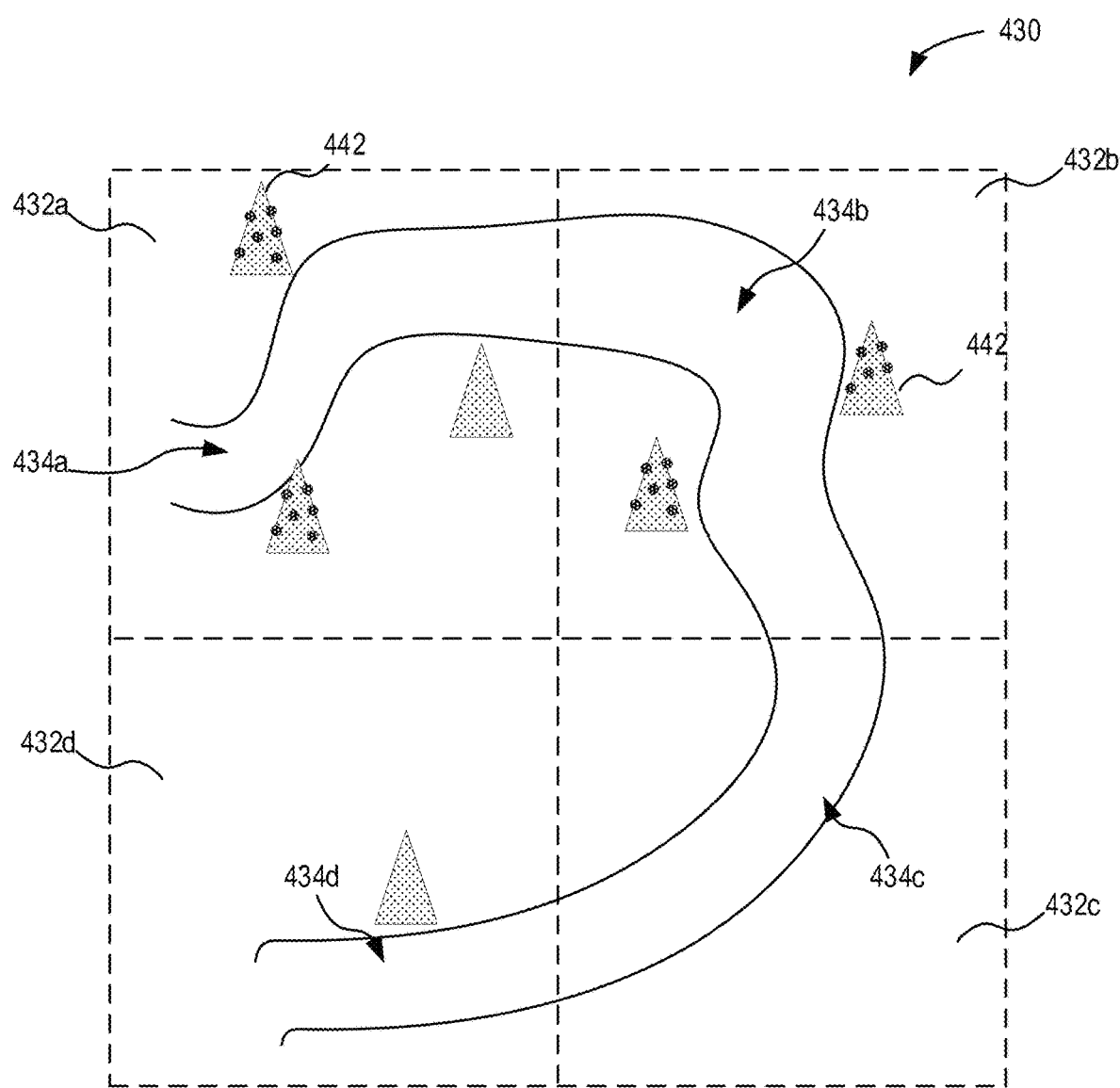
FIG. 4B is a simplified example of an output work product that may be generated from the project development graph of FIG. 4A in accordance with an example embodiment.
Figure 4C:
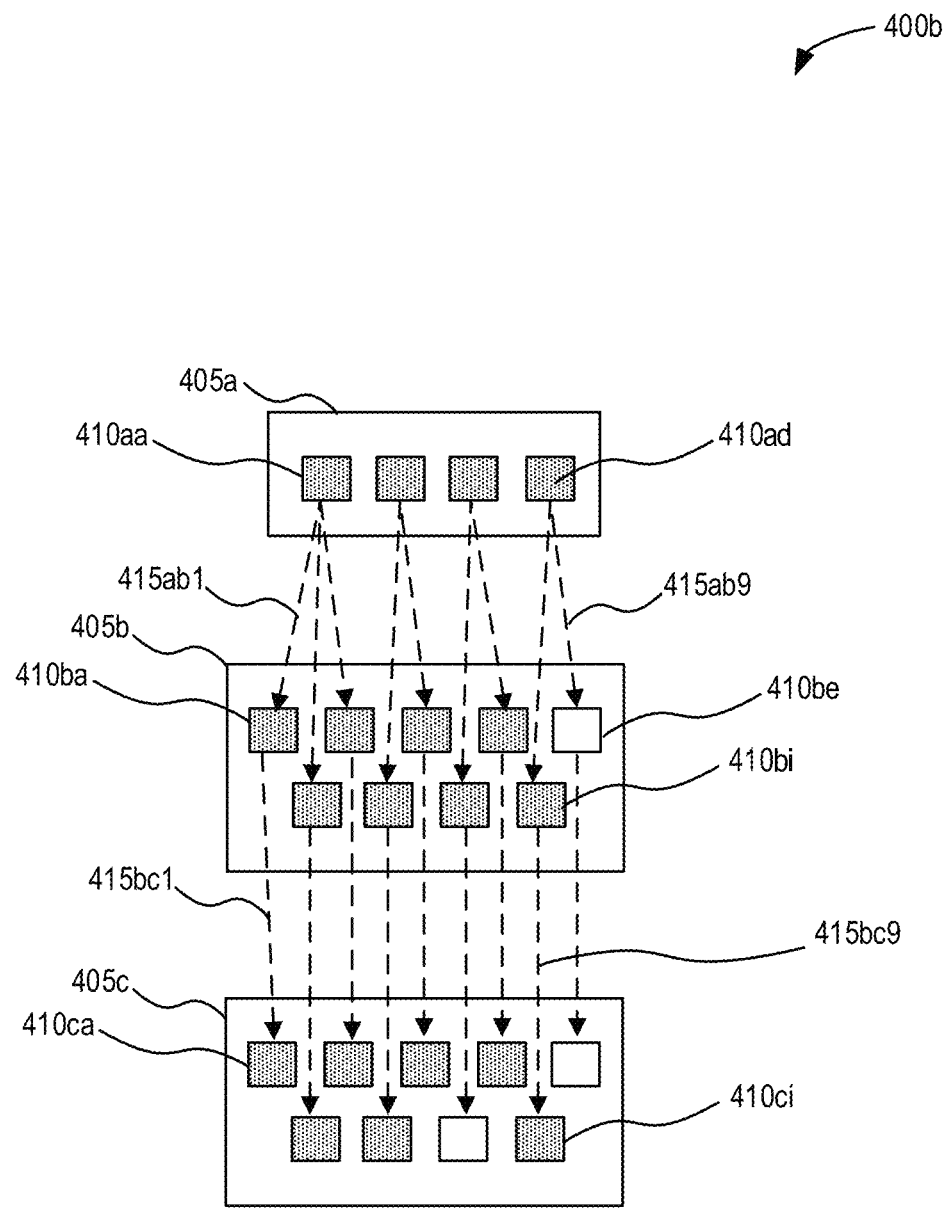
FIG. 4C is a block diagram of an updated version of the project development graph of FIG. 4C in accordance with an example embodiment.

FIG. 4C illustrates a second, subsequent processing state of the processing graph 400B. In processing graph 400B, operational instances 410bd, 410bh, 410cb, 410cd, and 410ci have now completed the performance of the node-specific set of operations.

FIG. 4B illustrates a simplified example of an environment 430 generated based on the intermediate processing state of processing graph 400 shown in FIG. 4A. In this example, processor node 405a defines a set of operations usable to generate road segments 434a-434d for individual environmental regions 432a-432d; processor node 405b defines a set of operations usable to generate trees 442 along the road segments; while processor node 405c defines a set of operations usable to decorate the trees 442 in environment 430.

As shown in FIG. 4B, three trees 442 have been generated in environmental region 432a (corresponding to operational instances 410ba, 410bb, and 410bf), two trees have been generated in environmental region 432b (corresponding to operational instances 410bc, 410bg), and one tree has been generated in environmental region 432d (corresponding to operational instance 410bi). As well, two trees in the environmental region 432a and the trees in environmental region 432b have all been decorated (corresponding to operational instances 410ca, 410cc, 410cf and 410cg), while the tree in environmental region 432d and one tree in environmental region 432a have not.

Figure 4D:
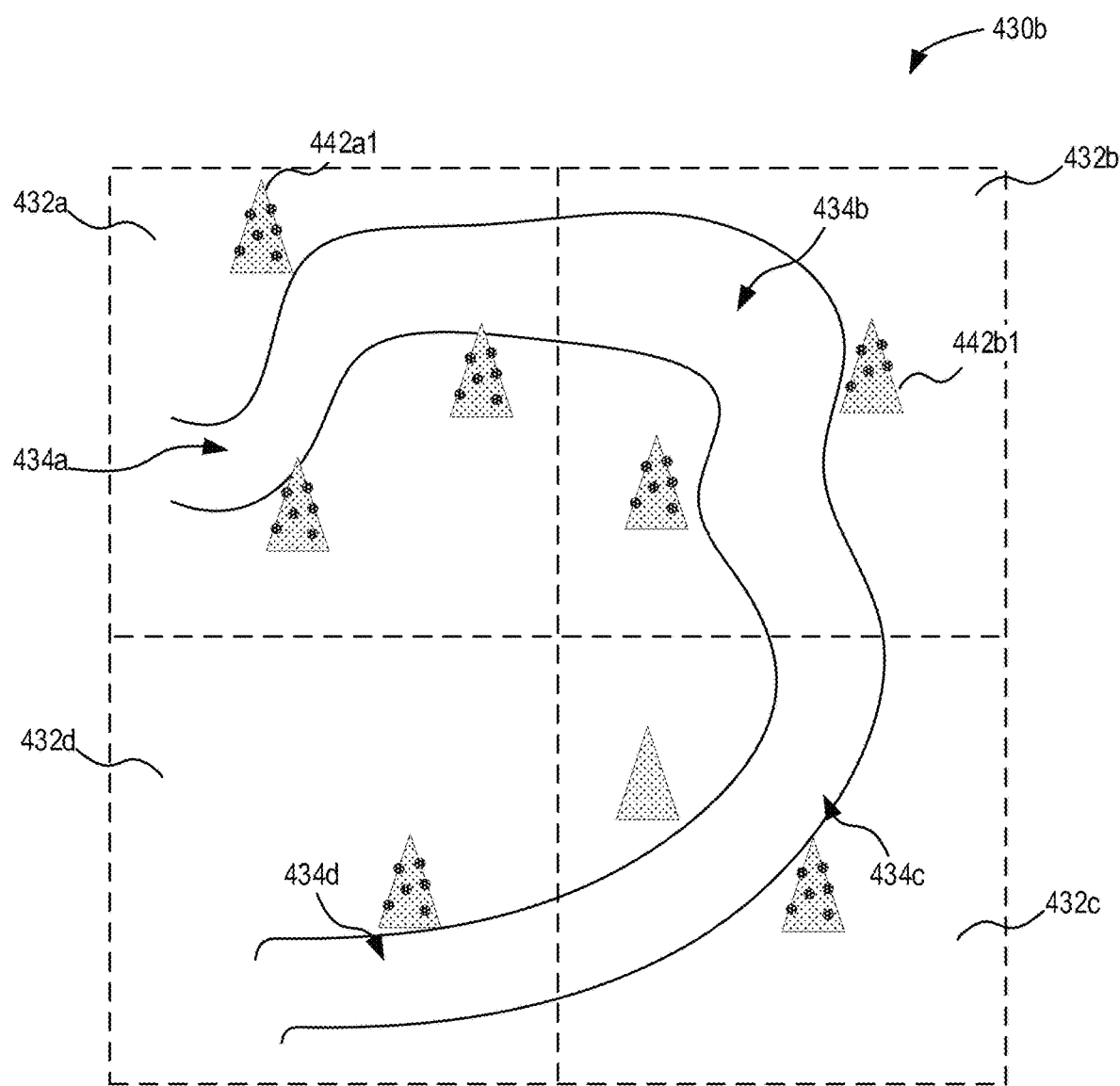
FIG. 4D is a simplified example of an output work product that may be generated from the project development graph of FIG. 4C in accordance with an example embodiment.

FIG. 4D illustrates a simplified example of an environment 430B generated based on the second intermediate processing state of processing graph 400B shown in FIG. 4C. As shown in environment 430B, additional trees have been generated in environmental region 432c. As well, one of the trees in environmental region 432c has been decorated, along with the previously generated trees in regions 432a and 432d. As shown by FIG. 4B, some of the trees in regions 432a and 432b have been decorated before all of the trees for the environment 430 were generated.

FIGS. 4A-4D illustrate a simplified example of how processing operations can be managed on an operational instance basis in embodiments of the systems and methods described herein. The processing management application 140 can manage processing operations arranged in a processing graph so that the order in which processing operations are performed is not restricted to requiring a processor node to complete its operations before a subsequent, downstream, processor node is permitted to operate. Rather, the processing management application 140 can identify the data required by individual operational instances from upstream operational instances (using the node instance generation criteria and dependency relationships) and allow individual operational instances to perform processing operations dependent upon the availability of the appropriate data.

The processing management application 140 may allow operational instances from separate processor nodes, including dependent processor nodes, to perform processing operations simultaneously/in parallel. The processing management application 140 may also allow operational instances from the same processor node to perform processing operations in parallel. This may improve the overall efficiency of the processing required for the electronic project, by reducing or removing bottlenecks that may be caused by requiring all operational instances in upstream processor nodes to complete their processing operations before enabling downstream operational instances to proceed.

As a simplified example, the computation time required to perform the set of processing operations defined by processor node 405b for a single operational instance may be twice the time required to perform the set of processing operations defined by processor node 405c for a single operational instance. By allowing operational instances in dependent processor nodes such as processor node 405c to operate at the same time as operational instances in upstream processor nodes, such as processor node 405b, the overall computation time for the processing graph 400 may be reduced.

In cases where the computation time required to perform the set of processing operations defined by processor node 405b for a single operational instance is the same of the time required to perform the set of processing operations defined by processor node 405c for a single operational instance, the overall computation time may be reduced even further in cases where the operational instances in processor node 405b include sequential internal dependencies. In general, particularly in cases where excess computational resources 152 are available to perform the operations for any processor nodes that can be activated, allowing downstream operational instances to proceed at the same time as, or before, some of the upstream operational instances can reduce overall computation time significantly.

Figure 5A:
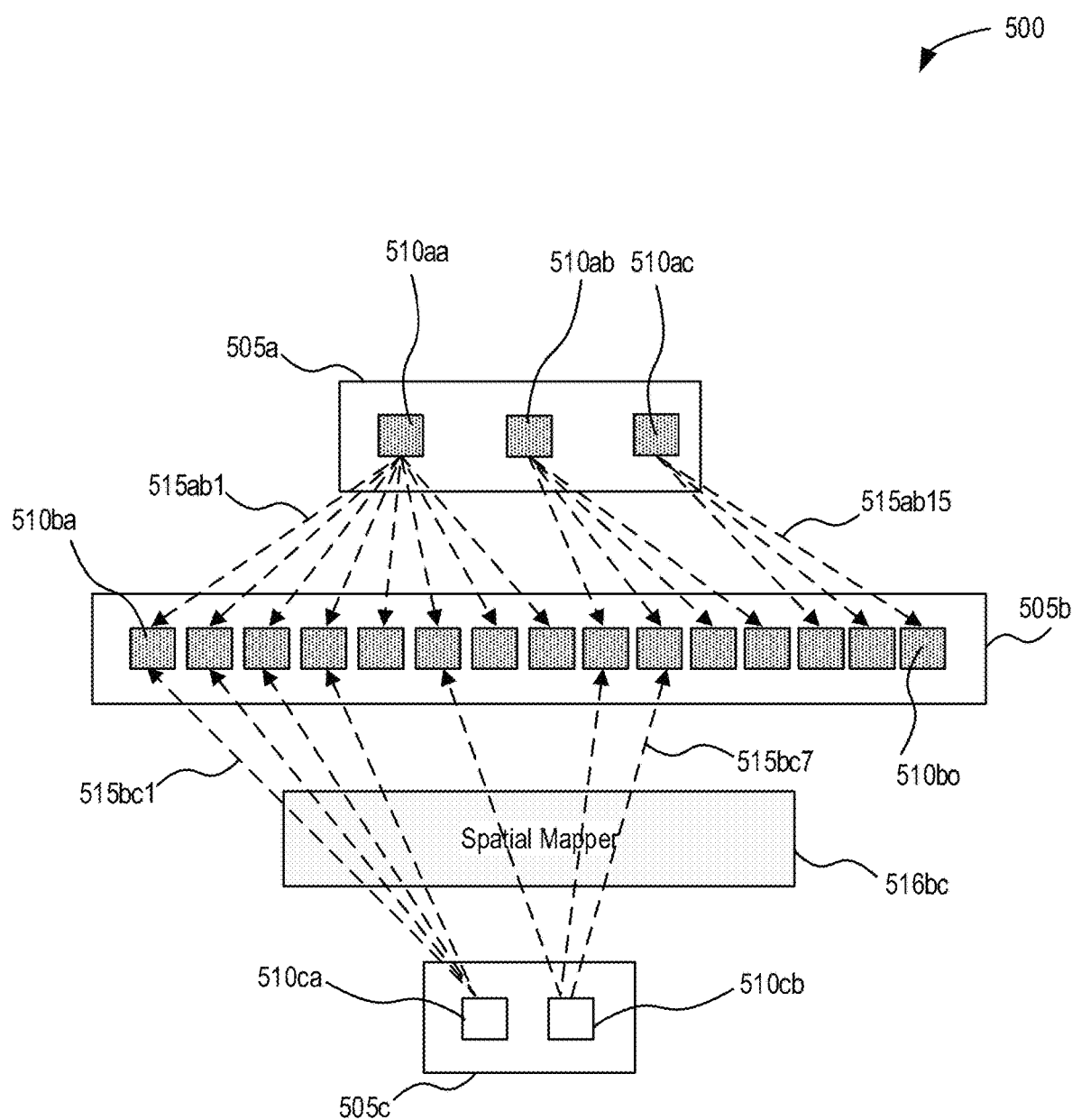
FIG. 5A is a block diagram of another project development graph that may be used with the system of FIG. 1 in accordance with an example embodiment.

Referring now to FIG. 5A, shown therein is an example processing graph 500. Processing graph 500 is an example of a processing graph that includes a connector node in the form of mapping node 516bc. In this example, the mapping node 516bc is a spatial mapping node.

Processing graph 500 includes a plurality of processor nodes 505a-505c. The processor nodes 505a-505c are arranged in a plurality of processing sub-trees. Each processing sub-tree includes a root processor node and any downstream processor nodes that depend on that root processor node.

In the example shown in FIG. 5A, processing graph 500 includes a first processing sub-tree that includes root processor node 505a and dependent processor node 505b. In this example, the node instance generation criteria defined by root processor node 505a import data from an identified external data source to generate operational instances 510aa-510ac. The node instance generation criteria defined by processor node 505b specify how the plurality of operational instances 510ba-510bo are generated using data associated with operational instances 510aa-510ac. The node instance generation criteria defined by processor node 505b also specify how to generate instance dependency relationships 515ab1-515ab15.

The second processing sub-tree in processing graph 500 consists of root processor node 505c. The node instance generation criteria defined by root processor node 505c may also import data from an identified external data source to generate the plurality of operational instances 510ca-510cb. Alternatively, the node instance generation criteria defined by root processor node 505c may use parameter data defined directly in processor node 505c to generate the plurality of operational instances 510ca-510cb.

Connector nodes can be used to manage dependency relationships between two or more processor nodes. Connector nodes may facilitate complex dependency relationships that may require a more substantive evaluation of how the processor nodes interact. Connector nodes can also be used to manage the progression of processing operations between processor nodes.

A mapping node is a specific type of connector node that can be used to map dependency relationships between the operational instances in multiple processor nodes. The mapping node may define instance dependency relationships between separate processing sub-trees.

A mapping node can define a set of mapping criteria. The mapping node may then be linked to a first processor node (e.g. processor node 505b in the first processing sub-tree) and a second processor node (e.g. processor node 505c in the second processing sub-tree). The mapping node can then generate an instance mapping between the operational instances 510ba-510bo in the first processor node 505b and the operational instances 510ca-510cb in the second processor node 505c using the mapping criteria.

The mapping criteria may operate to define dependencies between operational instances in the processor nodes linked by the mapper node without requiring any of those operational instances to have completed their corresponding set of processing operations. The mapping criteria may define dependencies based on parameter data of the operational instances in the linked processor nodes. Accordingly, the mapper node may define dependencies between operational instances in linked processor nodes prior to activating any operational instances (e.g. where the processor nodes linked by the mapper node are both root processor nodes).

The mapping criteria can be defined to implement various types of mapping nodes. For instance, a mapping node may be implemented as a frame range mapper. The mapping criteria can specify how the frame indices of operational instances in the second processor node can be mapped to the frame indices of operational instances in the first processor node. For example, in a processing graph configured to generate an image sequence that includes a moving object, a processor node that defines a set of operations configured to generate motion blur may depend on a range of frames showing the position of the object that include the same frame and a series of preceding frames. This may result in dependency relationships where the operational instances in the second processor node use data from multiple operational instances in the first processor node.

Another example of a mapping node is the spatial mapper 516*bc* shown in FIG. 5A. In projects used to generate virtual environments, the spatial extent of objects generated by a processor node can be used to establish mappings. For example, in a procedurally generated virtual city, a processor node may define a set of operations used decorate buildings with detailed trims. The mapping node may define a volume map that can be mapped to various generated buildings to determine which building(s) should be decorated using the detailed trim.

Figure 5B:
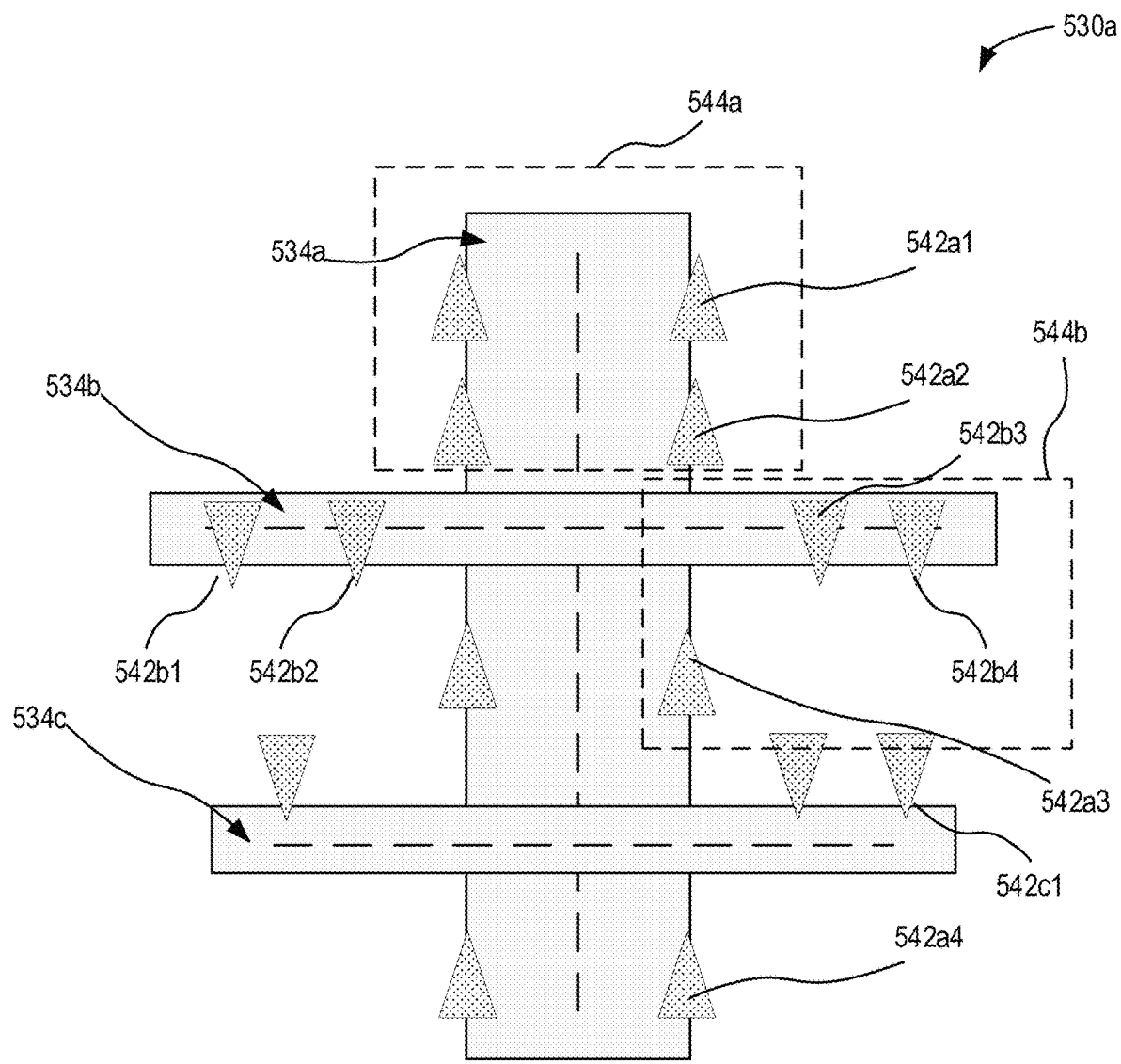
FIGS. 5B-5C are simplified examples of output work products that may be generated from the project development graph of FIG. 5A in accordance with an example embodiment.
Figure 5C:
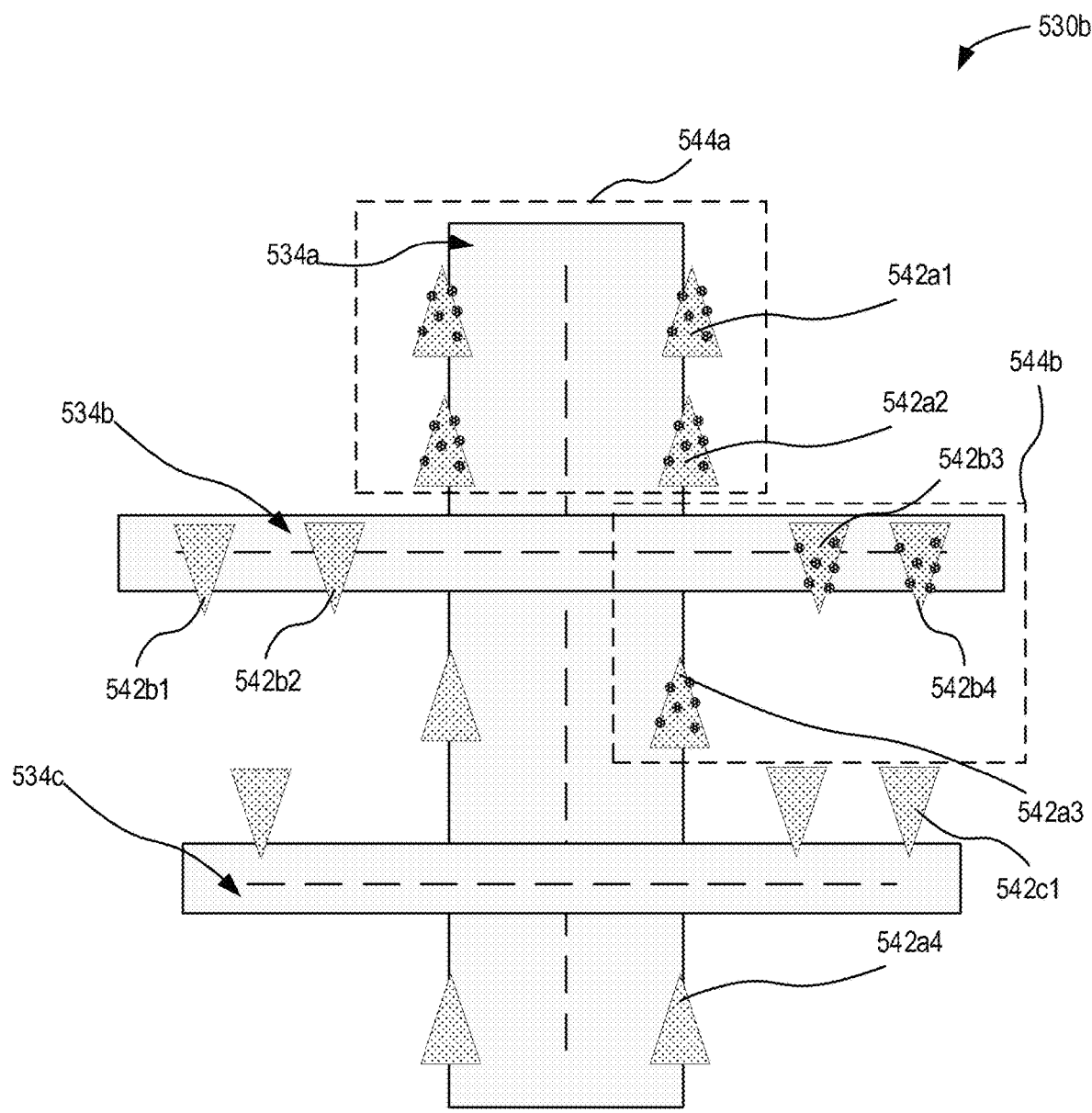

Reference will be made to FIGS. 5B and 5C as well to illustrate how the spatial mapper 516*bc* may operate. FIGS. 5B and 5C illustrate an example of a virtual environment 530 that can be generated using processing graph 500.

The processing graph 500 has been configured to generate a virtual environment 530*b* that includes a series of roads 534 with trees 542 positioned along the roads 534. The trees 542 are decorated only within specified regions 544*a*-544*b* of the environment 530.

In the example illustrated, the root processor node 505*a* can define a set of operations used to generate a plurality of roads 534*a*-534*c*. The root processor node 505*a* may ingest input data defining curves and generate output data defining the roads 534*a*-534*c*.

The dependent processor node 505*b* defines node instance generation criteria that generate operational instances 510*ba*-51*bo* usable to generate trees at specified intervals along the roads 534*a*-534*c*. The node instance generation criteria can also specify that variations in tree generation may occur based on the size of the roads 534*a*-534*c*. For instance, the types of trees 542*a* generated alongside the wider road 534*a* can differ from the types of trees 542*b* and 542*c* generated alongside the narrower roads 534*b* and 534*c*.

The processor node 505*c* can define a set of processing operations usable to decorate trees 542 in environment 530*a*. However, rather than decorating every tree 542 or a specified/random percentage of trees 542, processing graph 500 can be configured so that only trees within user-defined spatial regions 544*a* and 544*b* are decorated.

Processor node 505*c* may be configured as a root processor node. In various cases, the operational instances 510*ca* and 510*cb* defined in 505*c* may be generated using data from a configuration file or data that is inserted into processor node 505*c* using an API to an external program, such as design application 160.

A user may interact with design application 160 to define the spatial regions 544*a* and 544*b* within environment 530*a*. Each time a region is defined within the design application 160, the API in project management application 140 may be invoked to generate a new operational instance in processor node 505*c*. The mapping criteria for spatial mapping node 516*bc* can then specify that operational instances corresponding to the user-defined spatial regions are those that are to be mapped.

The spatial mapping node 516*bc* can then use the data specifying the spatial regions 544*a* and 544*b* from design application 160 to identify the operational instances in processor node 505*b* that correspond to trees 542 within those spatial regions. The spatial mapping node 516*bc* can then define a set of dependency relationships between the operational instances in processor node 505*b* and processor node 505*c* so that the operational instances 510*ca* and 510*cb* generate decorations for all of the trees 542 within those spatial regions 544*a* and 544*b*.

Figure 6A:
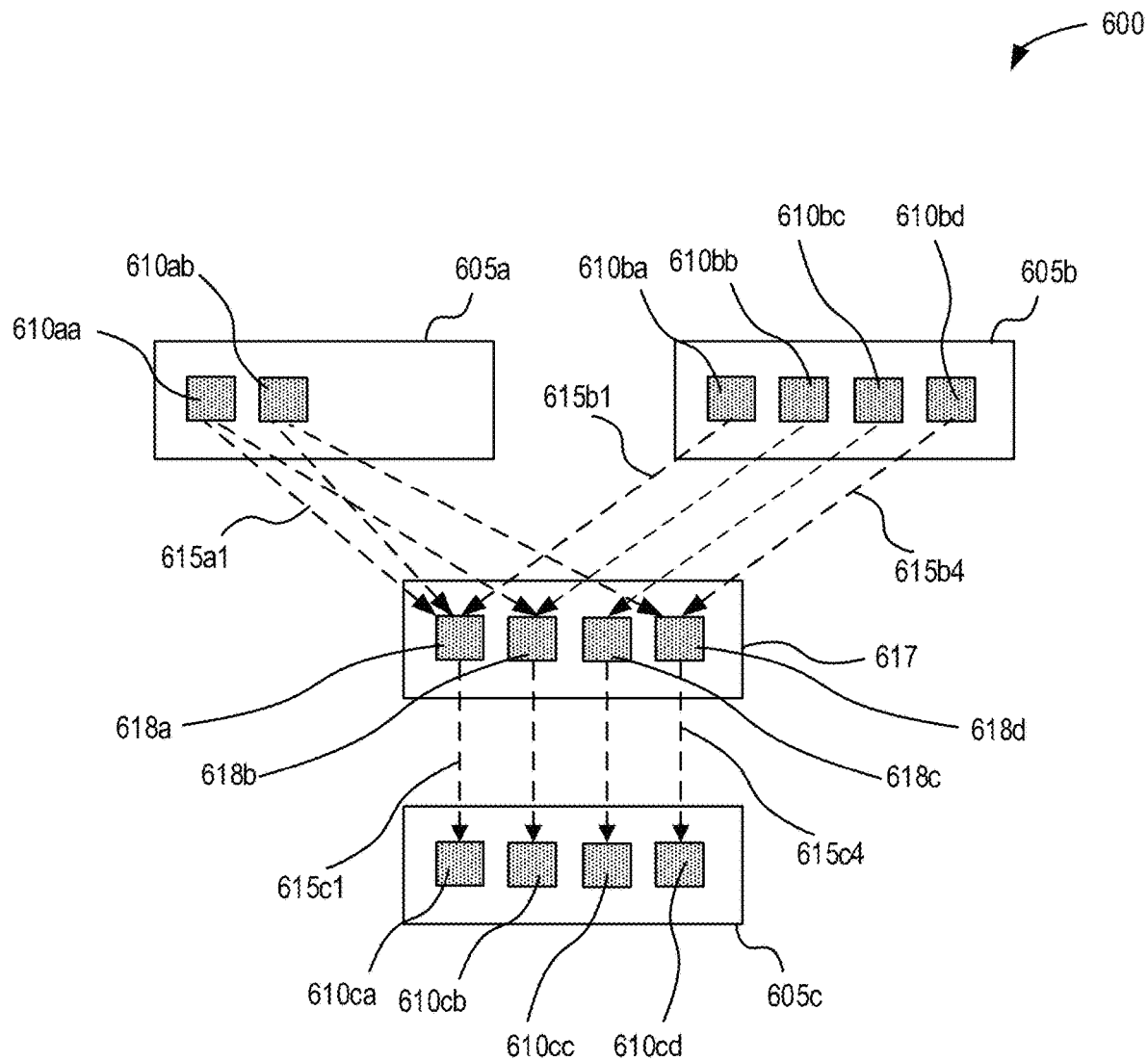
FIG. 6A is a block diagram of another project development graph that may be used with the system of FIG. 1 in accordance with an example embodiment.
Figure 6B:
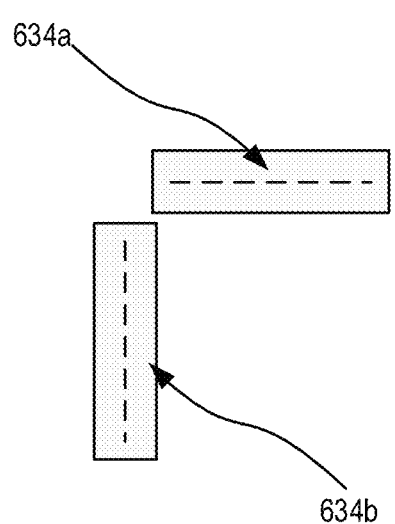
FIGS. 6B-6D are simplified examples of output work products that may be generated from the project development graph of FIG. 6A in accordance with an example embodiment.
Figure 6C:
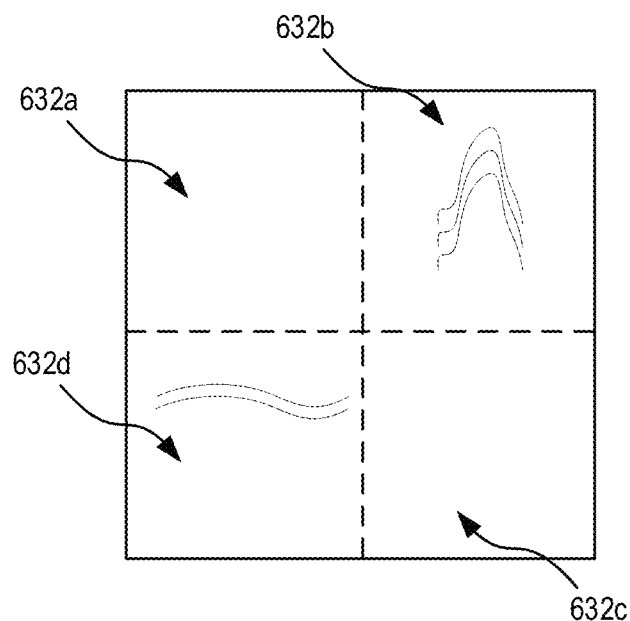
Figure 6D:
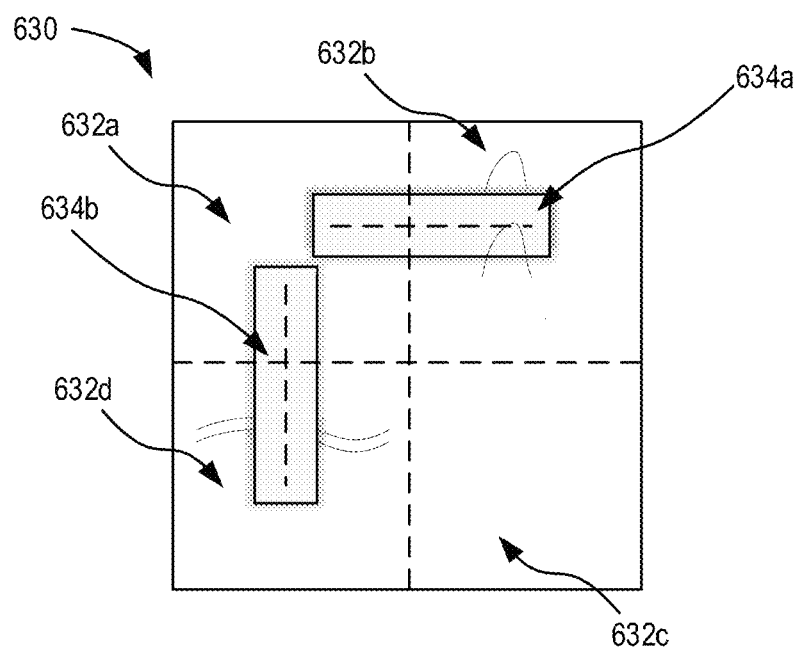

Referring now to FIG. 6A, shown therein is another example of a processing graph 600 that includes a connector node 617. In this example, the connector node 617 is a partition node. The processing graph 600 includes a plurality of processor nodes 605*a*-605*c*. FIGS. 6B-6D illustrate examples of the data output by processor nodes 605*a*-605*c* respectively.

In processing graph 600, both processor nodes 605*a* and 605*b* are root processor nodes. Processor node 605*a* defines a set of operations usable to generate roads 634*a*-634*b* from input data defining a curve while processor node 605*b* defines a set of operations usable to generate an initial terrain for a plurality of environmental regions 632*a*-632*d*.

The processor node 605*a* includes node instance generation criteria that are used to define a plurality of operational instances 610*aa*-610*ab*. In this example, each operational instance 610*aa* and 610*ab* may correspond to a separate curve defined by an input data file. As shown in FIG. 6B, a pair of roads 634*a* and 634*b* can be generated by processor node 605*a*.

The processor node 605*b* includes node instance generation criteria that can also be used to generate a plurality of operational instances 610*ba*-610*bd*. In this example, each operational instance 610*ba*-610*bd* may correspond to input data generated in design application 160 for a given environmental region 632 that defines the initial terrain for that region 632. As shown in FIG. 6C, the terrain may include a mountainous region in environmental region 632*b* while the terrain includes a stream in environmental region 632*d*.

Processor node 605*c* can define a set of operations configured to generate a final, terraformed, environment 630. In order to generate the terraformed environment 630, the processor node 605*c* may use data generated by the operational instances in both processor node 605*a* and processor node 605*b*. However, processing graph 600 can also be configured to identify a relationship between the operational instances in both processor node 605*a* and processor node 605*b* without any direct, dependency relationship between processor nodes 605*a* and 605*b*.

As shown in FIG. 6A, the processing graph 600 can include a connector node 617 that can be configured to relate the operational instances from processor nodes 605*a* and 605*b*. In the example shown, the connector node 617 is a partition node. The partition node can be linked to one or more upstream processing sections immediately upstream therefrom and one or more downstream processing sections immediately downstream therefrom.

The partition node 617 can be defined to include a set of partitioning criteria. The partitioning criteria can be used to define a plurality of partition instances 618*a*-618*d* for partition node 617. The partitioning criteria can be used to group data from upstream operational instances in one or more processing sections into the partition instances 618*a*-618*d*. Each of the operational instances in an upstream processing section may be allocated to one of the partition instances 618a-618d using the partitioning criteria.

In some cases, the partition node may be used to provide a one-to-many relationship between operational instances in a processor node immediately downstream from the partition node and operational instances in a processor node immediately upstream from the partition node. For example, the node instance generation criteria for the processor node 605c immediately downstream of partition node 617 may specify one partition instance 618 in partition node 617 that is used to generate each operational instance in that processor node 605c. However, since the partition instances 618 may group or combine data from multiple upstream operational instances, the partition instance 618 may, in effect, allow the operational instances in processor node 605c to depend on multiple upstream operational instances.

In the example shown in FIG. 6A, the partition node 617 can be used to group data from multiple processing sections, namely a first processing section defined by processor node 605a and a second processing section defined by processor node 605b. The grouped data in the partition instances 618 of partition node 617 can then be used by the downstream processing section, in this case processor node 605c, to perform its set of processing operations.

For example, the partitioning criteria for partition node 617 can be defined to group upstream operational instances from processor nodes 605a and 605b based on their corresponding environmental region. Each partition instance 618a-618d may correspond to one of the environmental regions. The operational instances in processor nodes 605a and 605b may then be allocated to one or more partition instances 618 based on the environmental regions 632a-632d corresponding thereto.

Each of the operational instances 610ba-610bd generates terrain corresponding to one of the environmental regions 632a-632d. Accordingly, each operational instance 610ba-610bd is allocated to a corresponding one of the partition instances 618a-618d.

The operational instances 610aa and 610ab each generate roads that correspond to two environmental regions. The road 634a generated by operational instance 610aa corresponds to environmental regions 632a and 632b. Accordingly, operational instance 610aa is allocated to both partition instances 618a and 618b. The road 634b generated by operational instance 610ab corresponds to environmental regions 632a and 632d. Accordingly, operational instance 610ab is allocated to both partition instances 618a and 618d.

The set of operations defined for processor node 605c can be configured to generate a final terraformed environment 630 using the initial terrain data generated by the operational instances 610ba-610bd and the roads generated by operational instances 610aa-610ab. The partition instances 618a-618d can identify for processor node 605c the data usable to generate each of the final terraformed regions 632a-632d in the environment 630.

As shown in FIG. 6D, the operational instances 610ca-610cd in processor node 605c can modify the original terrain in environmental regions 632a-632d in order to position the roads 634a and 634b within the environment 630.

For instance, the terrain generated in environmental region 632b by operational instance 610bb initially included a mountainous area and the road 634a generated by operational instance 610aa partially overlapped with the mountainous area. Accordingly, using the data from partition instance 618b identifying the initial terrain and the road in environmental region 632b, the operational instance 610cb can generate a modified environmental region 632b in which the mountainous region has been terraformed to reduce the height of the mountains and allow the road 634a to pass therethrough.

Similarly, the terrain generated in environmental region 632d by operational instance 610bd initially included a stream and the road 634b generated by operational instance 610ab intersected a portion of the stream. Accordingly, using the data from partition instance 618d identifying the initial terrain and the road in environmental region 632d, the operational instance 610cd can generate a modified environmental region 632d in which the road 634b passes over a portion of the stream and may include a bridge or culvert to allow the stream to pass by road 634b.

As explained previously, operational instances in the nodes downstream from partition node 617 may also operate contemporaneously with the operational instances 618a-618d in partition node 617, and even nodes upstream from the partition node 617. Similar to the dependency relationships between processor nodes, the operational instances 610ca-610cd can be configured to perform their corresponding set of operations once the partition instance 618 upon which they depend has completed being computed/processed (i.e. once it has received and grouped data from all of the upstream operational instances allocated to that partition instance).

In some cases, operational instances in the nodes downstream from partition node 617 may not be generated until all the data has been allocated to at least one of the operational instances 618a-618d in partition node 617. That is, the operational instances downstream from partition node 617 may be generated only once a partition operational instance 618 has been completed (i.e. all data from upstream processor nodes has been allocated to that operational instance 618). For example, the downstream terraforming operational instances in processor node 605c may only be generated upon completion of the partitioning performed by partition node 617. In some cases, operational instances in processor node 605c may not be generated until after all data has been allocated to all of the partition operational instances 618a-618d in partition node 617.

In some cases, partition nodes may be used to group operational instances from within a single processing section. For example, an upstream processing section may be defined to generate character bodies for a virtual environment or an animated film. Various different types of character bodies can be generated with specified or random characteristics. A subsequent downstream processor node may be configured to generate clothing for each of the character bodies. The type of clothing generated for a character (i.e. the variant of the clothing processing operation set selected) may be dependent on characteristics of the character body, such as gender and/or age category (e.g. child, adult). A partition node can be defined with partitioning criteria to group the character bodies based on gender and age category. The downstream processor node may then use the grouped character bodies to simplify the process of generating clothing for the virtual characters.

In some cases, it may be desirable to ensure that a processor node has completed its processing operations before any operational nodes in downstream processor nodes begin processing. In some cases, the processing graph may be defined so that a set of downstream operational instances are configured perform their sets of operations in a synchronized manner. For instance, this may facilitate sequencing of operations where the output data is to be generated in a combined .zip file. The downstream processor node that defines a set of operations usable to zip data from upstream nodes can be prevented from proceeding until all of the required files are finished being generated.

Referring now to FIGS. 7A-7C, illustrated therein are examples of processing graphs 700a-700c configured so that all of the operational instances 710ba-710bd in processor node 705b complete their processing operations before any of the operational instances 710ca-710cd in processor node 705c perform any processing operations. FIGS. 7B-7C illustrate how a partition node 719 can be used to simplify dependency relationships between the processing sections 721a and 721b.

FIG. 7A illustrates a first example of a processing graph structure 700a that includes a plurality of processor nodes 705a-705d. Each of the processor nodes 705-705d include a plurality of operational instances. Processor nodes 705a and 705b define a first processing section 721a and processor nodes 705c and 705d define a second processing section 721b.

The processing graph 700a is intended to be configured so that all of the operational instances in the first processing section 721a complete their processing operations before any of the operational instances in the second processing section 721b perform any processing operations. Accordingly, one way to provide this functionality would be to define dependency relationships 715bc for the operational instances 710ca-710cd in processor node 705c so that each operational instances 710ca-710cd depends on each and every operational instance 710ba-710bd in processor node 705b. In embodiments described herein, this might be implemented using a mapper node 716bc with mapping criteria that define the dependency relationships 715bc. Accordingly, the operational instances 710ca-710cd require every operational instance 710ba-710bd to complete the set of processing operations defined by processor node 705b before the operational instances 710ca-710cd can perform the set of processing operations defined by processor node 705c. Each of the operational instances 710ca-710cd may use data from only one of the upstream operational instances 710ba-710bd, however they nonetheless rely on each of the upstream operational instances 710ba-710bd for data indicating that it is permissible to perform the node-specific set of operations for processor node 705c.

The processing graph 700a can ensure that the first processing section 721a completes its operations before the second processing section 721b begins any processing operations. However, defining the dependency relationships directly between processor nodes 705b and 705c (e.g. using mapper node 716bc) results in a large number of dependency relationships that must be created and evaluated. For instance, where processor node 705b includes m operational instances and processor node 705c includes n operational instances, the total number of dependency relationships required is m×n (in the example shown, the total number of dependency relationships can also be expressed as $n^2$ since both processor nodes 705b and 705c have the same number of operational instances, but it is not necessary for the processor nodes 705b and 705c to have the same number of operational instances).

FIG. 7B illustrates another example of a processing graph 700b that is configured so that the first processing section 721a completes its operations before the second processing section 721b begins any processing operations. In processing graph 700b, a partition node 719 is also positioned between the first processing section 721a and the second processing section 721b.

The partition node 719 may be configured with only a single partition instance. The partition criteria for the partition node 719 can specify that all upstream operational instances be allocated to the same partition instance.

The partition node 719 can be linked directly to the processor node 705b immediately upstream therefrom and then to processor node 705c downstream therefrom using a mapper node 716c. The partition instance in partition node 719 can thus depend from each of the operational instances 710ba-710bd in processor node 705b.

The processor node 705c can also be configured to depend from the connector node 719 using mapper node 716c. Each operational instance 710ca-710cd may depend from the same partition instance of the partition node 719. This may, in effect, provide the same dependency relationship as defined in processing graph 700a with fewer instance dependency relationships. Rather, the partition node 719 can have m dependency relationships 715b corresponding to the m operational instances 710ba-710bd in processor node 705b and processor node 705c (via mapper node 716c) can haven dependency relationships 715c corresponding to the n operational instances 710ca-710cd in processor node 705c. As a result, the processing graph 700b requires only m+n dependency relationships to ensure that all of the operational instances in processor node 705c depend on all of the operational instances in processor node 705b as compared to the only m×n dependency relationships required when using a mapper node in processing graph 700a.

Referring now to FIG. 7C, shown therein is an example of a processing graph 700c. Processing graph 700c illustrates the processing graph 700b in an intermediate processing state.

In processing graph 700c, operational instances 710aa, 710ab and 710ad in processor node 705a have completed their processing operations while operational instances 710bb and 710bd in processor node 705b have completed their processing operations. However, since not all operational instances in processor node 705b have completed their processing operations, the partition node 719 is also not complete. As a result, the downstream operational instances 710ca-710cd cannot begin processing because they depend on data associated with partition node 719 to indicate that processing operations can begin.

For example, the first processing section 721a may be configured to perform operations required to render frames for a plurality of simulations, such as crash simulations in a variety of environmental conditions. The second processing section 721b may be configured to perform operations required to create and display a montage that includes the rendered video representation of each simulation generated in the first processing section 721a. By requiring each operational instance 710ca-710cd to depend from the partition node 719, which in turn depends from all of the operational instances 710ba-710bd, the processing graph 700c can ensure that all simulations are generated prior to the montage being rendered. This may ensure that the individual videos within the montage are generated and displayed in a synchronized manner.

In some cases, as shown in FIGS. 7a-7c, the processor node 705c immediately downstream from the partition node 719 can be a root processor node. The node instance generation criteria defined by processor node 705c can identify input data usable to perform the node-specific set of operations (e.g. data files or node parameter data). The mapper node 716c may thus allow the dependency relationships between partition node 719 and processor node 705c to be generated prior to the partition instance in partition node 719 being complete, as the mapping criteria can use the parameter data from partition node 719 and processor node 705c to generate the dependency relationships.

In some cases, the input data used by the operational instances in processor node 705c may correspond to data generated by operational instances 710ba-710bd. The processor node 705c may depend on the partition node 719 merely to identify data indicating that the set of operations defined by processor node 705c should proceed.

Figure 7D:
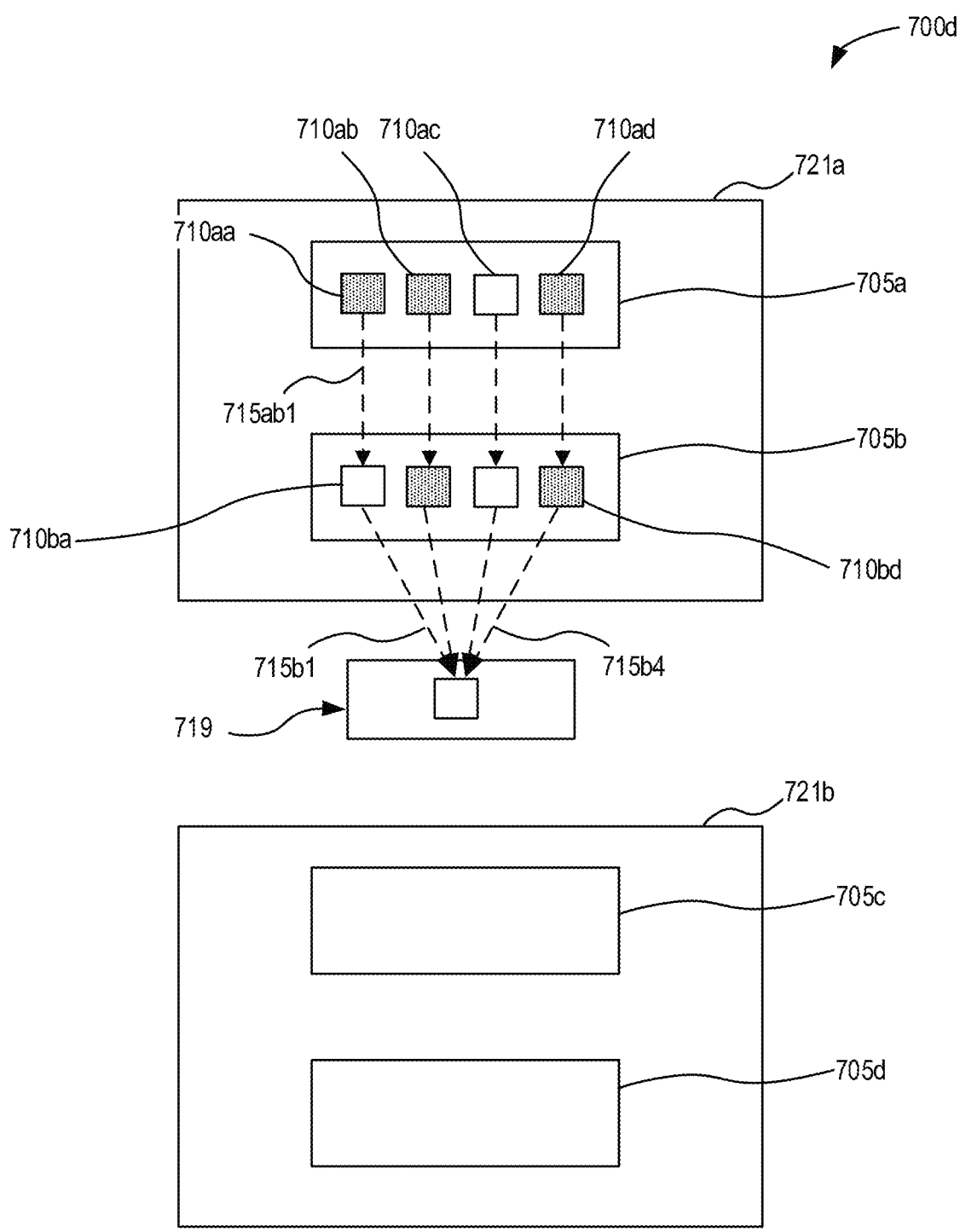
FIG. 7D is a block diagram of another project development graph that may be used with the system of FIG. 1 with some operational instances that have not yet been processed in accordance with an example embodiment.
Figure 7E:
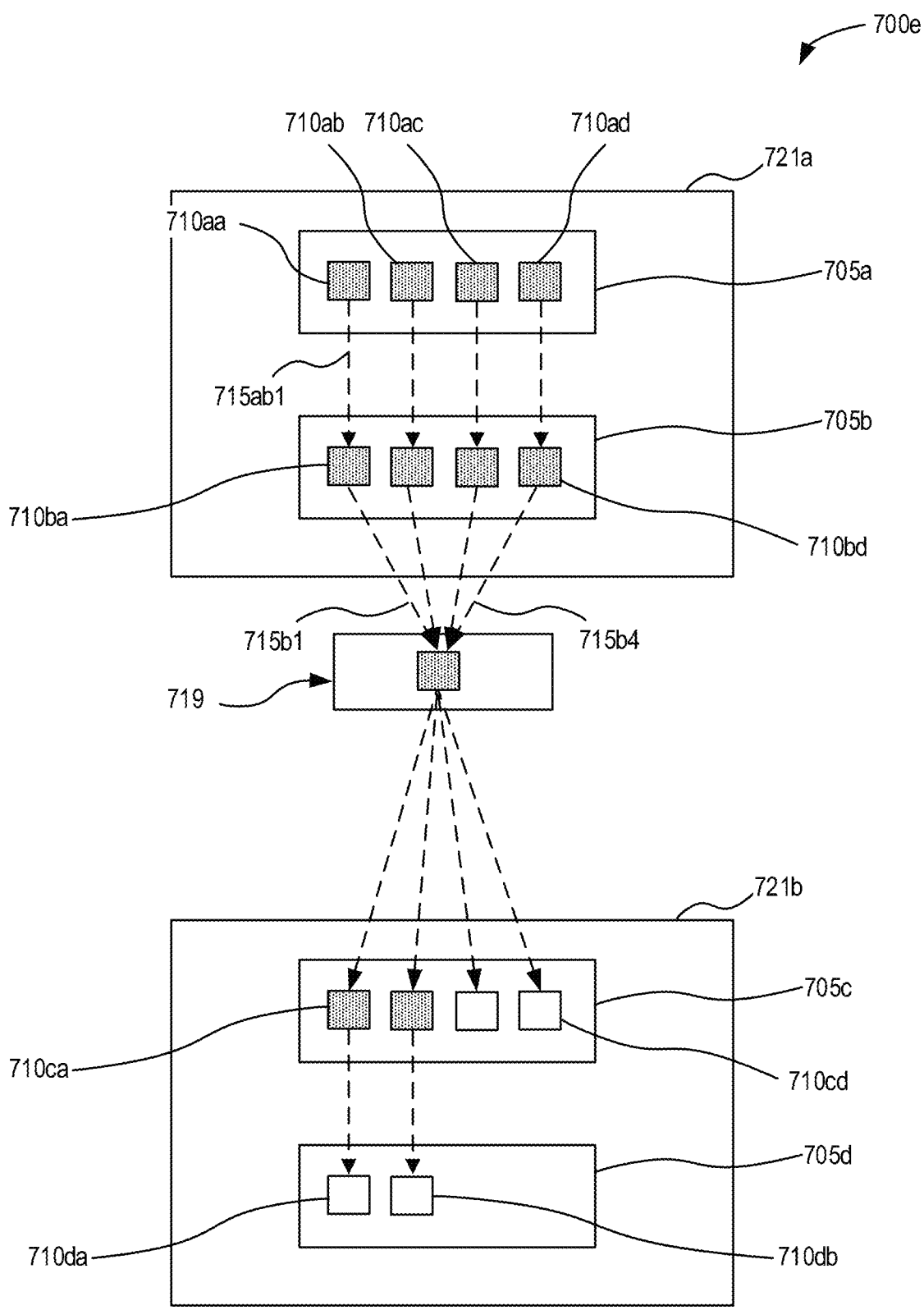
FIG. 7E is a block diagram of the project development graph of FIG. 7D with additional operational instances that have been processed in accordance with an example embodiment.

FIGS. 7D-7E illustrate example processing graphs 700d and 700e similar to processing graphs 700a-700c, with the notable omission of the mapper node 716c. Processing graph 700d illustrates a first intermediate state of the processing graph. As shown in FIG. 7D, the operational instances in processor node 705c may not be generated prior to the completion of the partition instance in partition node 719. Accordingly, there are not yet any operational instances in processor node 705c or the subsequent downstream node 705d.

Processing graph 700e illustrates a second intermediate state of the processing graph, in which partition node 719 has completed its partitioning operations. As shown in processing graph 700e, the operational instances 710ca-710cd in processor node 705c have been generated based on data from partition node 719 (i.e. the grouped data from operational instances 710ba-710bd). Operational instances 710da and 710db have been generated based on data from operational instances 710ca and 710cb. However, since operational instances 710cc and 710cd have not yet completed their set of processing operations, the downstream operational instances 710dc and 710dd have not yet been generated.

Figure 8:
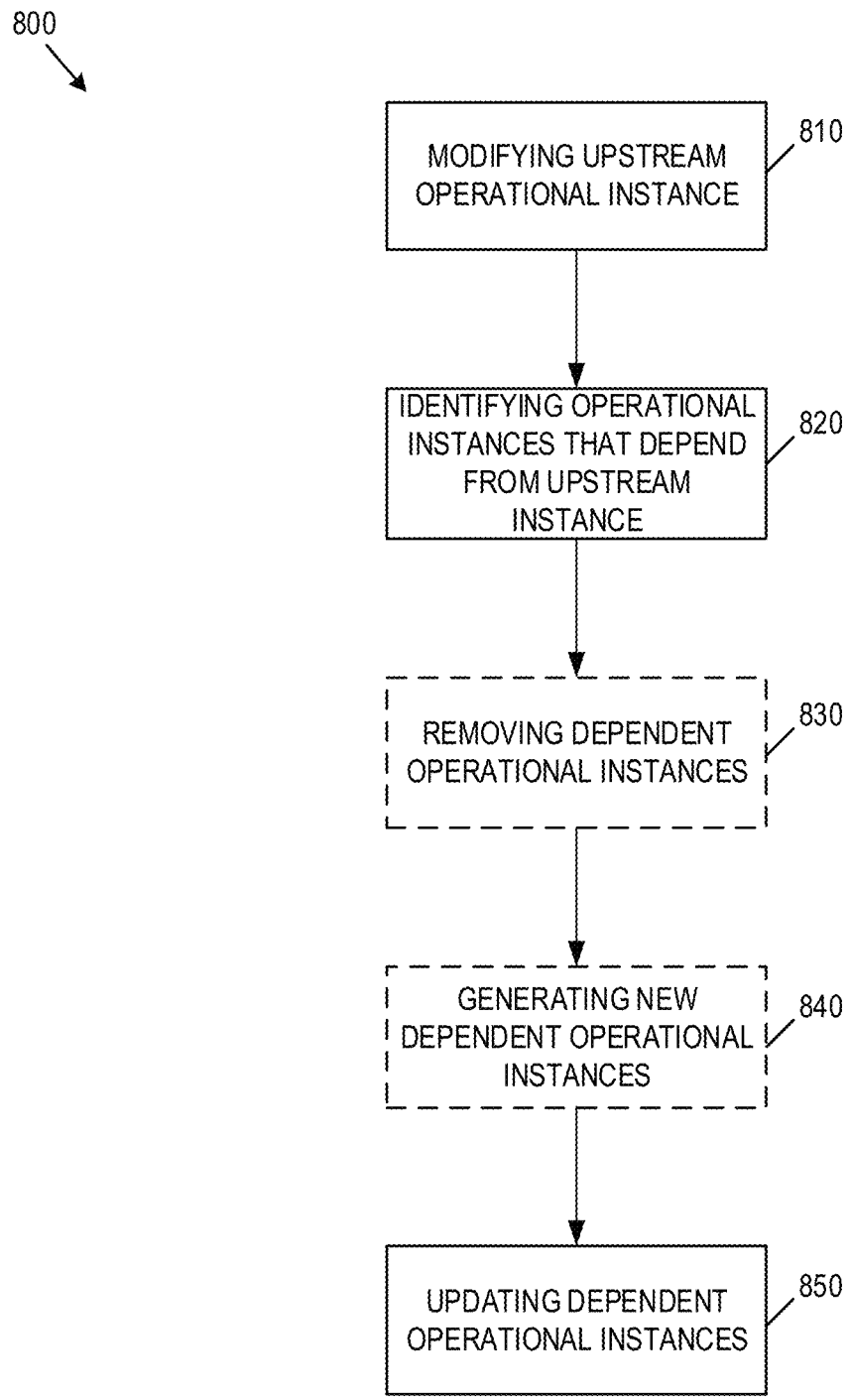
FIG. 8 is a flowchart illustrating a method of updating a project development graph in accordance with an example embodiment.

Referring now to FIG. 8, shown therein is a flowchart illustrating a method or process 800 of updating a project development graph in accordance with an embodiment. Method 800 may be carried out by various components of system 100, such as the processing management application 140 on computing device 105.

Method 800 illustrates an example process for updating operational instances within a processing graph in response to changes to one or more operational instances. This may ensure that only those operational instance affected by the change are re-computed.

At 810, at least one upstream operational instance can be modified. The upstream operational instance can correspond to an upstream processor node positioned in a processing graph, such as processing graphs 200, 400, 500, 600, and 700 described herein above.

A user may interact with design application 160 to modify data that is used by an upstream operational instance. For example, a user may interact with design application 160 to modify a curve that is used by an upstream operational instance to generate a road, or modify the features of a spaceship model that is being used in a simulation.

In response to the modification of the upstream operational instance, the processing management application 140 can update operational instances downstream from the node within which the modified operational instance is contained. The processing management application 140 can use the instance dependency relationships defined in the processing graph in order to update the operational instances in the processing graph.

At 820, dependent operational instances that depend from the at least one modified operational instance can be identified using the instance dependency relationships. The processing management application 140 may identify all of the dependent operational instances that depend from the at least one modified operational instance in the set of dependent processor nodes that are linked to the modified processor node and downstream therefrom.

In some cases, there may be a plurality of dependent processor nodes downstream from the modified operational instance. The processing management application 140 may identify all of the dependent operational instances in each of the dependent processor nodes that depend from the modified operational instance.

The processing management application 140 may identify the dependent operational instances that depend from the modified operational instance (directly or indirectly) as potentially modified. In some cases, the processing management application 140 may generate an attribute or flag indicating that the identified dependent operational instances are potentially modified. For example. Each operational instance that has been modified, or potentially modified, can include a state flag indicating its modified or potentially modified status, along with other attributes of the work item such as its name, id etc.

When a user is considering a modification to one or more aspects of the project, the dependency relationships can identify the downstream operational instances that may potentially be affected by the change. This may provide the user with additional information to consider and evaluate whether the potential time and computational cost is appropriate for the change being considered.

As mentioned above, in some cases the processing management application 140 may identify all of the dependent operational instances that depend from a particular operational instance in response to a user selecting that operational instance. The processing management application 140 may then visually identify all the operational instances that are related to and/or depend from the selected operational instance, for example by highlighting those operational instances and/or highlighting the dependency relationships to the selected operational instance. This may allow a user to visually assess the potential impact of modifying that operational instance.

Optionally, at 830, the processing management application 140 may remove the dependent operational instances identified at 820. In some cases, all of the dependent operational instances identified at 820 may be removed from the processing graph. In some embodiments, the dependent operational instances identified at 820 may be removed without any evaluation of whether the modification to the upstream operational instance affects the downstream processing operations.

The processing management application 140 may then generate dependent operational instances downstream from the modified operational instance at 840 using the node instance generation criteria of the dependent processor nodes and the modified data corresponding to the modified operational instance.

In some cases, at 830, the processing management application 140 may only remove the dependent operational instances identified at 820 that are within the same processing section. That is, in some cases the processing management application 140 may not propagate the removal of dependent operational instances beyond a connector node.

In some cases, the processing management application 140 may not automatically remove all of the operational instances that depend from the modified upstream operational instance. The processing management application 140 may identify those dependent operational instances as potentially modified. The processing management application 140 may then evaluate those dependent operational instances using the node instance generation criteria and dependency relationships to determine whether they should be removed.

In some cases, the processing management application 140 may determine that one or more dependent operational instances need not be removed. The processing management application 140 may then evaluate that dependent operational instance to determine whether the input data used by that dependent operational instance has been modified.

Upon determining that the input data identified by a dependent operational instance has been modified, the processing management application 140 may identify that dependent operational instance as modified or dirtied. The processing management application 140 may then re-compute the corresponding set of operations when the processing graph is activated.

In some cases, the processing management application 140 may determine that one of the potentially modified dependent operational instances has not been modified. For example, the processing management application 140 may determine that the input data identified by one of the dependent operational instances remains the same following the modification to the upstream operational instance. The processing management application 140 may then remove the potentially modified marker/attribute from that dependent operational instance without requiring re-computation by that operational instance.

For example, a processing graph may include an upstream processor node that generates a road using input data defining a curve. A first dependent processor node can generate trees at specified intervals along the road, while a second dependent processor node can decorate the trees. Initially, the input data may define a single curve usable to generate a road of sufficient length such that four trees are positioned along the road. Accordingly, the upstream processor node may include a single operational instance and each of the dependent processor nodes can include four operational instances.

A user may interact with the design application 160 to modify the curve. Accordingly, the operational instance in the upstream processor node is modified. All of the operational instances in the first and second dependent processor nodes can be identified as potentially modified.

In some embodiments, all of the potentially modified operational instances may be removed and then re-generated by processing management application 140. In other cases, however, the processing management application 140 may evaluate the node instance generation criteria and input data used by each of the potentially modified dependent operational instances to determine whether any should be removed or re-computed. The processing management application 140 may also determine whether any of the potentially modified dependent operational instances should remain unchanged and marked clean/unmodified (or have the potentially modified marking removed).

For instance, the user may shorten the end of the curve so that the road generated is of sufficient length for only three trees. The processing management application 140 may then determine that the first three operational instances in the first dependent processor node are unchanged and do not need to be re-computed. The processing management application 140 can then automatically determine that the operational instances downstream from those unmodified operational instances are also un-modified. The processing management application 140 can also determine that the fourth operational instance in the first dependent processor node no longer satisfies the node generation criteria and should be removed. The operational instance dependent therefrom can also be deleted accordingly.

In another example, a user may access the design application 160 to modify the direction of the curve. As a result, the road generated by the upstream processor node may travel in a different direction. The processing management application 140 may then determine that the all of the operational instances in the first dependent processor node are modified since the location at which the trees are to be positioned has changed, but that none should be removed since they all still satisfy the node instance generation criteria. The processing management application 140 can then determine that the operational instances in the second dependent processor are also modified (the location of the decorations has changed), but that none should be removed since they all still satisfy the node instance generation criteria. The processing management application 140 may then proceed to 850 to update the dependent operational instances, by having the dependent operational instances re-perform the node-specific set of operations.

At 840, the processing management application 140 can generate new dependent operational instances. The processing management application 140 can generate new operational instances in one or more dependent processor nodes using the corresponding node instance generation criteria and data from the modified operational instance.

For example, a user may interact with design application 160 to extend the length of the curve. As a result, the road generated by the upstream operational instance may be longer and may be sufficient to support more than four trees. The processing management application 140 may then generate one or more additional operational instances in the first dependent processor node based on the additional length of the road. Additional node instances can also be generated at the second dependent processor node based on the additional operational instances added to the first dependent processor node.

At 850, the processing management application 140 can update the dependent operational instances. The processing management application 140 can cause any new dependent operational instances to perform the corresponding node-specific set of operations when the corresponding input data is available. The processing management application 140 can also update dependent operational instances by re-computing the set of operations for modified dependent operational instances.

Updating the dependent operational instances can include determining by the processing management application 140 whether the dependent operational instances are actually modified, rather than simply potentially modified. For example, the processing management application 140 may compare the input data originally used by a potentially modified operational instance with the input data that is now to be consumed by that potentially modified operational instance. If the input data upon which the operational instance relies has changed, that operational instance can be determined as being modified. For those operational instances determined to be modified, the processing management application 140 can re-perform the node-specific set of operations for those operational instances.

In some cases, updating the dependent operational instances may involve, for one or more operational instances, determining that there was no modification to those dependent operational instance. This may occur, for example, where the input data to the operational instance is determined to be unchanged. In such cases, the processing management application 140 may then remove any markers identifying that operational instance as potentially modified.

In some cases, the processing management application 140 may be configured to update dependent operational instances in processing graphs that include connector nodes. The process of updating the processing graph may be varied to account for these connector nodes. For instance, the above-described method 800 may be implemented for each processing section with slight modifications or variations to account for the connectors.

An example of a process for perpetuating modifications through a partition node is described with reference back to FIG. 6A. The partition node may separate two processing sections. One of the operational instances in a first processing section may be modified. For instance, operational instance 610ab in processing graph 600 may be modified. The processing management application 140 may then remove any downstream operational instances within that first processing section that depend from the modified first section operational instance (although there are no such operational instances in processing graph 600 since the first processing section contains only processor node 605a).

The processing management application 140 may then mark each of the partition instances corresponding to the modified operational instance as potentially modified. In the example of processing graph 600, partition instances 618a and 618d can be marked as potentially modified as they depend from operational instance 610ab.

In some cases, the process of updating a processing graph that includes a partition node may vary based on node modification perpetuation setting. In some cases, the processing management application 140 may automatically define the partition node modification perpetuation setting for a given partition node (e.g. a default perpetuation setting). In some cases, a user may interact with the processing management application 140 to define the node modification perpetuation setting. For instance, a user may select a particular node modification perpetuation setting from among a plurality of perpetuation configuration options.

In some cases, the node modification perpetuation setting can be defined so that the operational instances downstream from the partition node (e.g. operational instances 610ca-610cd) are updated by removing the operational instances that depend from the marked partition instance. In this example, operational instances 610ca and 610cd would be removed, as partition instances 618a and 618d were marked as potentially modified.

Alternatively, the node modification perpetuation setting can be defined so that the operational instances downstream from the partition node (e.g. operational instances 610ca-610cd) are updated by marking the operational instances that depend from the marked partition instance as potentially modified. In this example, operational instances 610ca and 610cd would be marked as potentially modified. Operational instances 610ca and 610cd may not be removed until partition instances 618a and 618d are updated, and then only if operational instances 610ca and 610cd no longer satisfy the node instance generation criteria based on the updated partition instances 618a and 618d.

The processing management application 140 can be configured to determine whether any of the partition instances 618a-618d has been modified. The processing management application 140 may determine whether the data allocated to any of the individual partition nodes has changed as a result of the modified upstream operational instance.

In some cases, the processing management application 140 may update the operational instances downstream from the partition node 617 only in response to determining that a partition instance has been modified. In such cases, the processing management application 140 may not perpetuate any updates until it has determined that one of the partition instances has been modified (i.e. no downstream operational instances that depend on the partition node will be removed or marked potentially modified until the partition instance is updated). This may allow the upstream processing section to be updated, and re-computed, multiple times without requiring evaluation and/or re-computation of the set of processing operations downstream from the partition instance.

This may also reduce the perpetuation of modifications to downstream operational instances, even where one or more partition instances are modified. For example, if the modification to the operational instance 610ab did not affect operational instance 618a, but did affect operational instance 618d (e.g. the curve defining road 634b was shortened so that road 634b ends at the border between regions 632a and 632d), then only those operational instances downstream from operational instance 618d would be marked as potentially modified and/or removed.

In some cases, there may also be other partition nodes affected by changes to the upstream operational instance. For example, the curve defining road 634b may be altered so that road 634b extends between regions 632d and 632c and not in region 632a. As a result, partition instances 618a, 618c and 618d can all be identified by processing management application as potentially modified.

Referring now to FIGS. 9A-9D, shown therein is an example of a process for updating a processing graph 900 that includes a pair of connector nodes in mapper node 916bc and 916cd.

The processing graph 900 includes a plurality of processor nodes 905a-905e. Each processor node includes a corresponding plurality of operational instances.

The plurality of processor nodes 905a-905e can be arranged into a plurality of processing sub-trees. A first processing sub-tree includes root processor node 905a and dependent processor node 905b. A second processing sub-tree includes the root processor node 905c. A third processing sub-tree includes the root processor node 905e and dependent processor node 905d.

A first mapper node 916bc is linked to processor node 905b and to processor node 905c. A second mapper node 916cd is linked to processor node 905c and to processor node 905d. Each of the mapper nodes 916bc and 916cd define a corresponding set of mapping criteria.

The processing management application 140 can generate an instance mapping between the operational instances 910ba-910be in processor node 905b of the first processing sub-tree and the operational instances 910ca-910cf in processor node 905c of the second processing sub-tree using the mapping criteria defined by mapper node 916bc. Similarly, the processing management application 140 can generate an instance mapping between the operational instances 910ca-910cf in processor node 905c of the second processing sub-tree and the operational instances 910da-910dd in processor node 905d of the third processing sub-tree using the mapping criteria defined by mapper node 916cd.

Figure 9A:
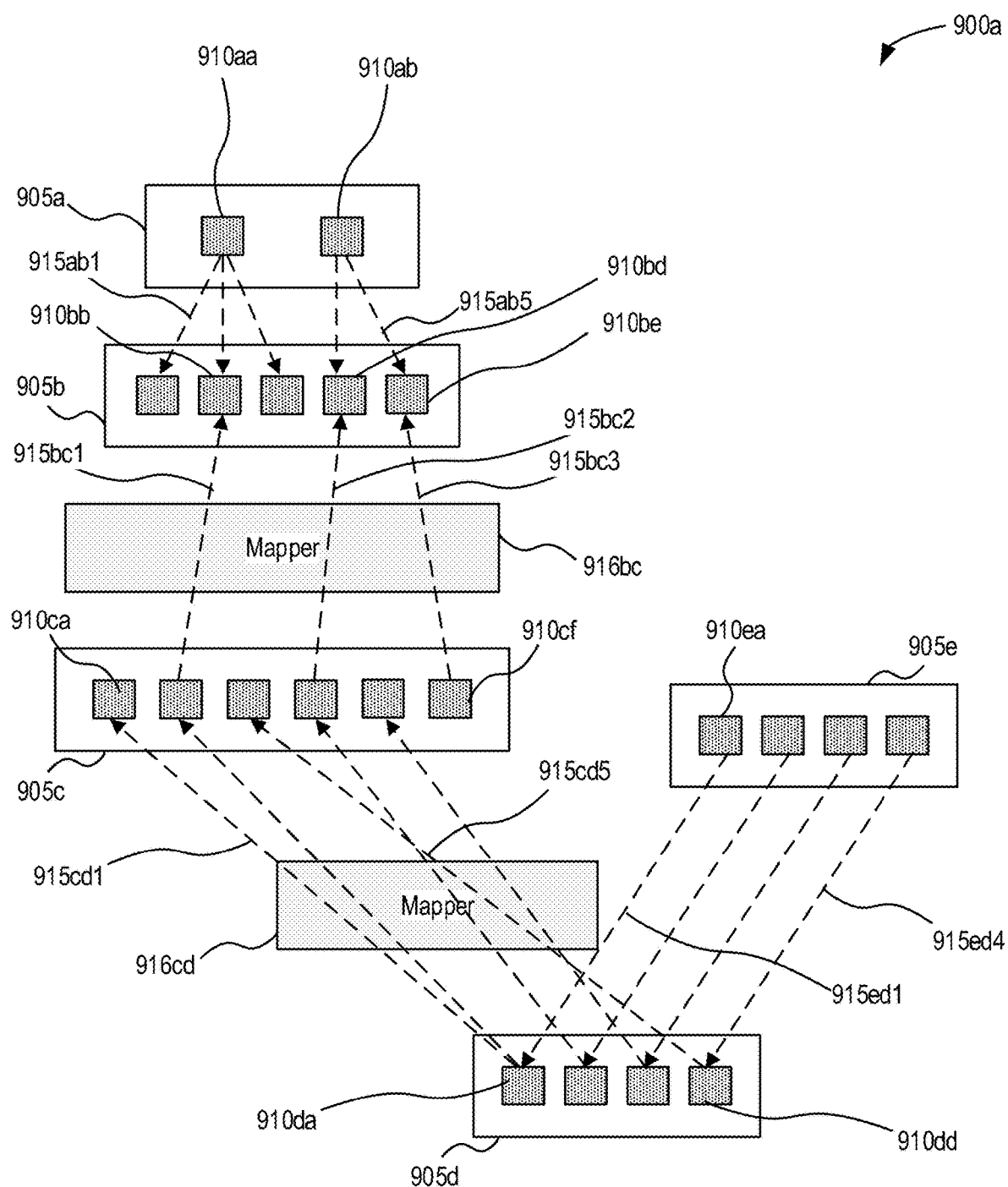
FIGS. 9A-9D are block diagrams illustrating a project development graph undergoing an update process in accordance with an example embodiment.
Figure 9B:
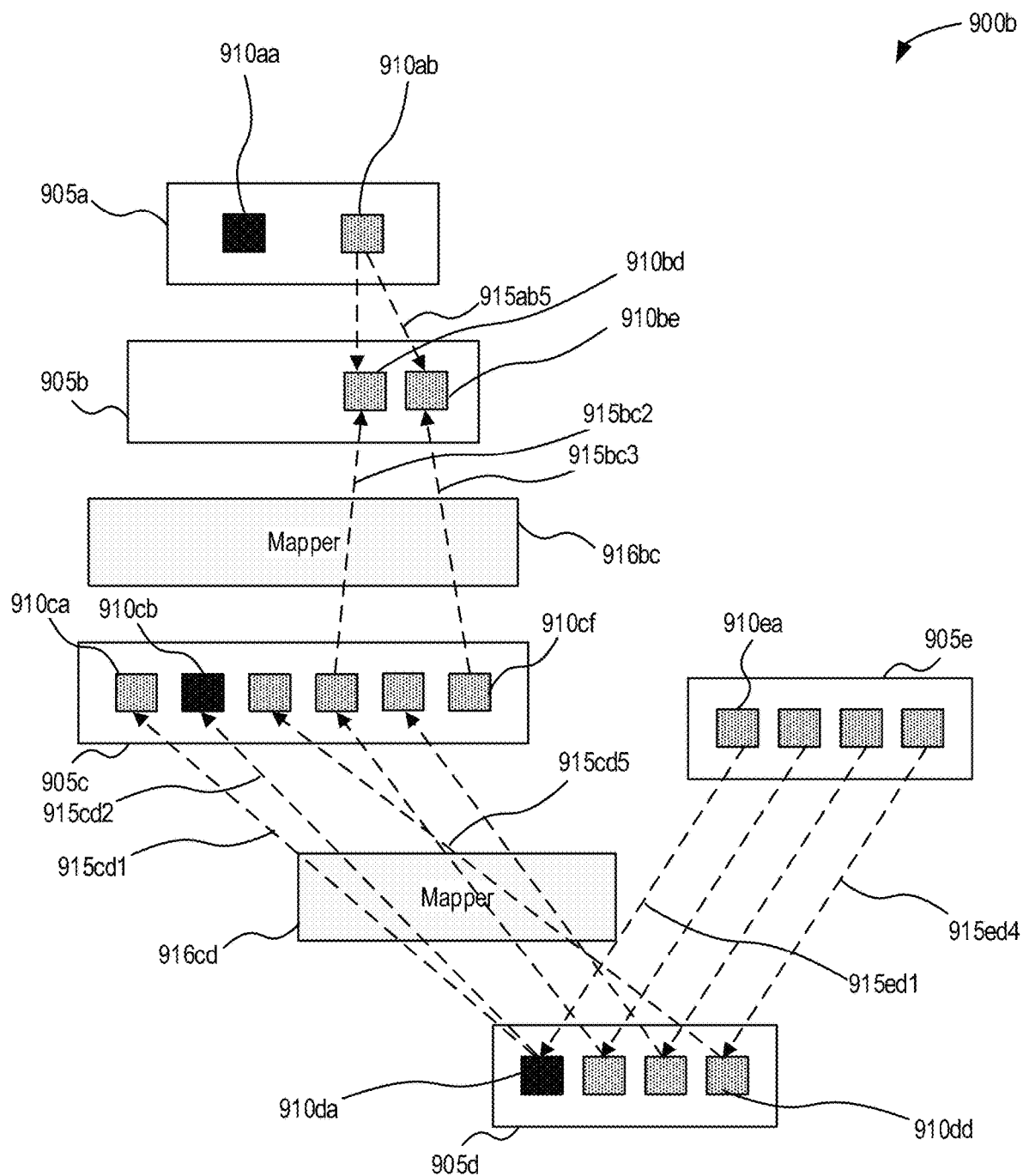
Figure 9C:
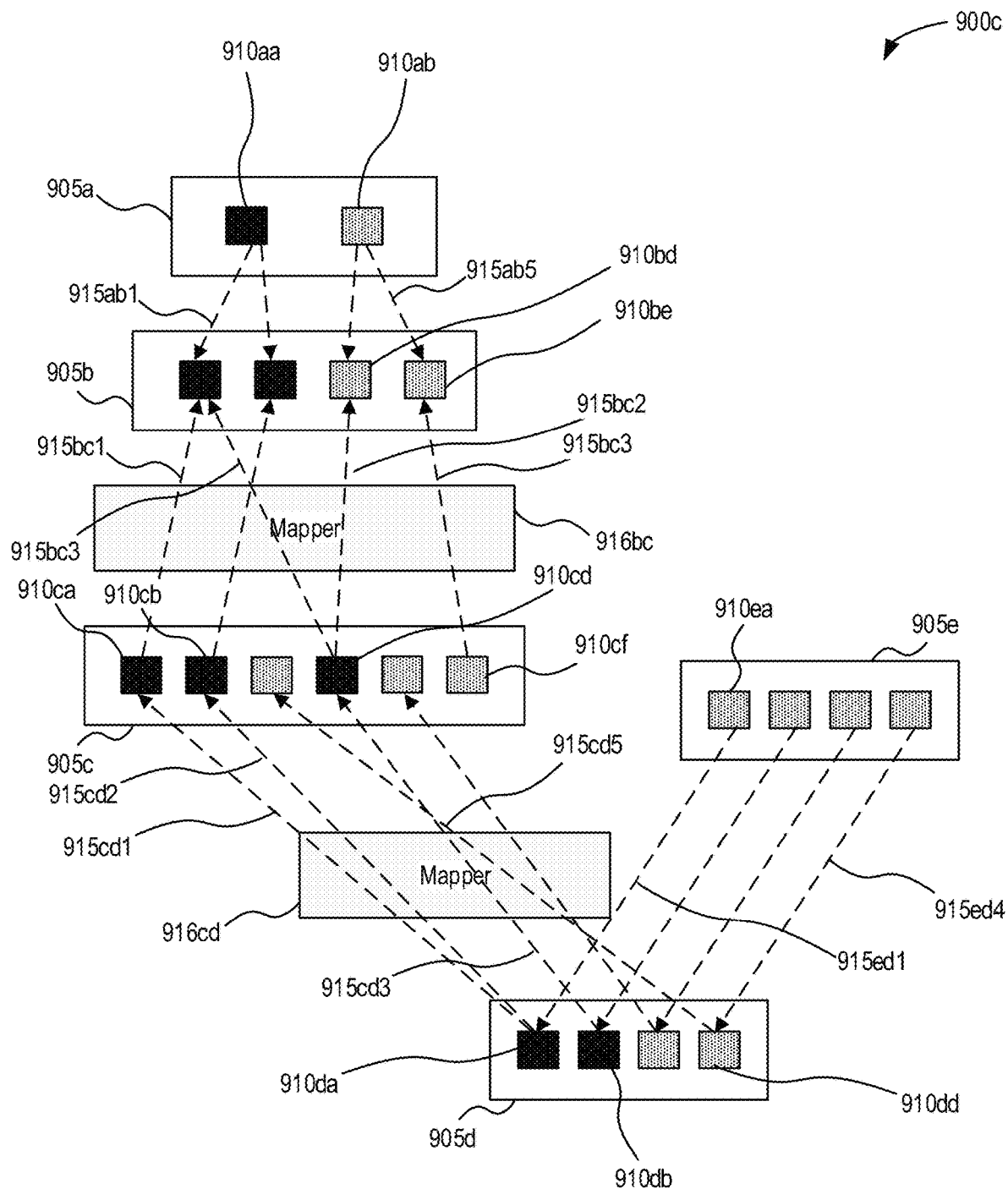
Figure 9D:
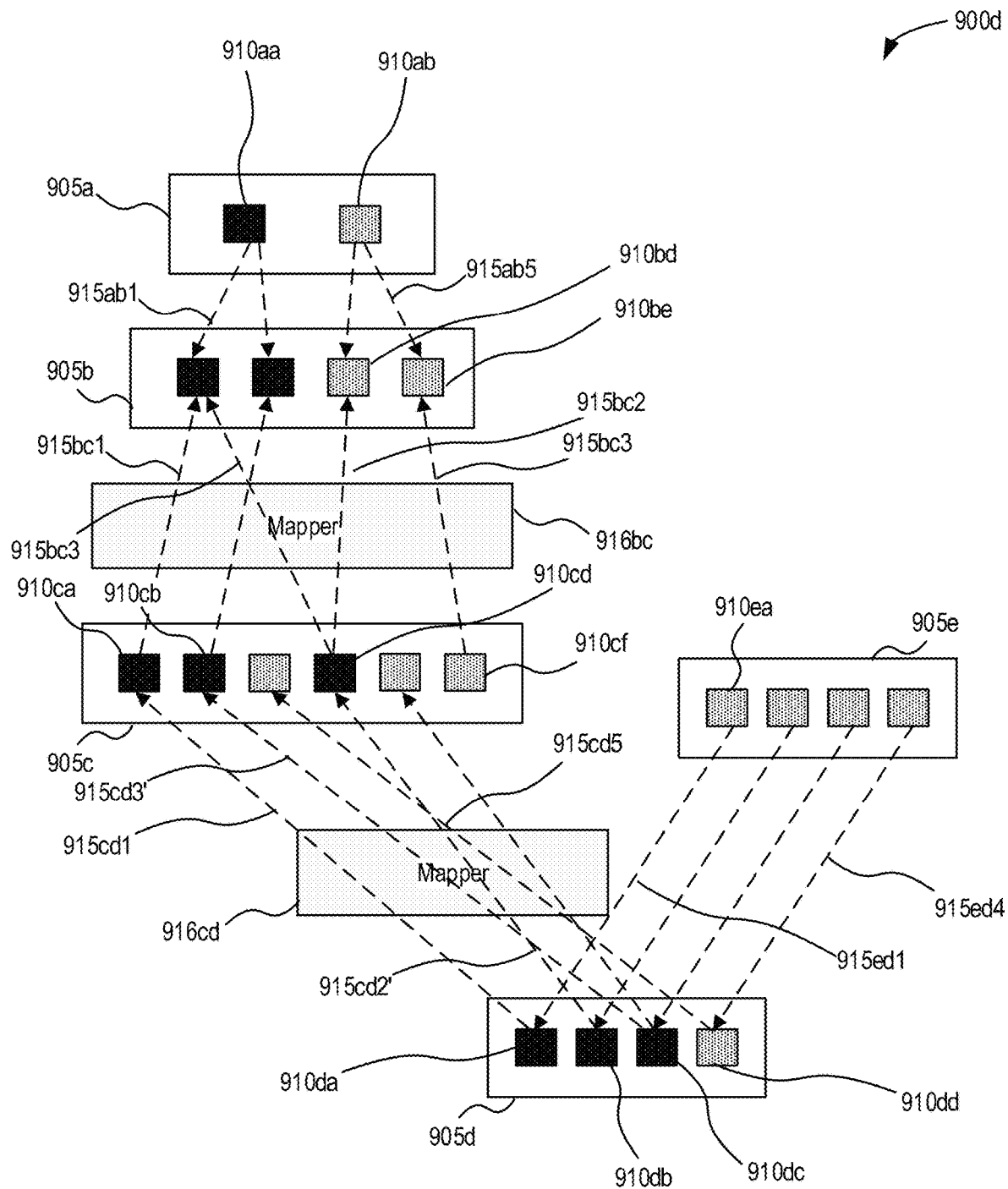

FIG. 9A illustrates an initial processing state 900a of the processing graph. FIGS. 9B-9D illustrate intermediate updating states 900b-900d of the same processing graph following a modification to operational instance 910aa in processor node 905a.

In processing graph 900b, operational instance 910aa in the upstream processor node 905a of the first processing sub-tree was modified. The processing management application 140 has also removed downstream operational instances in the first processing sub-tree that depended from operational instance 910aa. In this case, operational instances 910ba-910bc in processor node 905b were removed from the processing graph.

The processing management application 140 can then use the instance mapping defined by mapper node 916bc to identify operational instances in the second processing sub-tree that correspond to the modified operational instance 910aa. Each of these identified operational instances can be marked as potentially modified. The processing management application 140 can also perpetuate the potentially modified marking to additional downstream operational instances.

In embodiments where the downstream operational instances within a processing section are removed (as in the example being described here), operational instances across a mapper node can be marked as potentially modified rather than removed. In other embodiments, the downstream operational instances within a processing section may also be marked as potentially modified rather than removed, as explained herein above.

In this example, the operational instance 910cb in processor node 905c can be identified as corresponding to the modified operational instance 910aa as a result of the instance mapping to the operational instance 910bb that was removed, as described above. Similarly, the processing management application 140 can identify the operational instance 910da in the third processing sub-tree as potentially modified using the mapping instance defined by mapper 916cd.

The processing management application 140 can also mark the processor nodes immediately downstream from a mapper node across which a modification has been perpetuated as requiring mapping. In this case, processor nodes 905c and 905d can be identified as requiring mapping. This can identify to the processing management application 140 that the instance mapping defined by the mapper nodes 916bc and 916cd respectively may require updating. The instance mappings can then be update the next time those processor nodes 905c and 905d are activated.

In some cases, a user may activate the processor node 905c or 905d directly by requesting processing for those nodes. The user may also specify that processor node 905c or 905d be updated to re-generate the operational instances in those processor nodes 905c/905d without requiring the processing operations defined by those operational instances to be completed.

Alternatively, the user may specify that the entire processing graph be updated. As a result, the processing management application 140 may then update the operational instances, dependency relationships, and instance mapping for the processing graph.

FIG. 9C illustrates an updated processing graph 900c in which the operational instances in the first and second processing sub-trees, and the instance mapping defined by mapper node 916bc, have been updated. This may occur in response to a request to activate processor node 905c (either directly, or as a result of activating the entire processing graph).

The processing management application 140 can re-generate operational instances in the first processing sub-tree to correspond to the modified operational instance. In processing graph 900c, new operational instances 910ba and 910bb have been generated dependent upon the modified operational instance 910aa.

In processing graph 900c, the processing management application 140 has updated the instance mapping of mapper node 916bc based on the new operational instances 910ba and 910bb and the mapping criteria. The updated instance mapping results in operational instances 910ca and 910cd being dependent on new operational instance 910ba and operational instance 910cb being dependent on new operational instance 910bb.

Using the updated instance mapping, the processing management application 140 can identify any additional operational instances that are potentially modified based on the new dependency relationships identified by the instance mapping. These additional operational instances may also be marked potentially modified. Accordingly, the processing management application 140 has now also marked operational instances 910ca and 910cd as potentially modified. Additionally, the potential modification markers can be further perpetuated through the previously established instance mappings of mapper node 916cd to indicate that operational instance 910db is also potentially modified.

FIG. 9D illustrates an updated processing graph 900d in which the operational instances in the third processing sub-tree, and the instance mapping defined by mapper node 916cd, have also been updated.

The processing management application 140 can evaluate the instance mapping generated by mapper node 916cd using the mapping criteria defined by mapper node 916cd. Based on the modifications to the operational instances 910cb, the instance mapping for mapper node 916cd were updated to remove the dependency relationship 915cd2 and add new dependency relationships 915cd3'. As a result, the instance mapping no longer specifies a dependency relationship between operational instances 901da and 910cb, while a new dependency relationship between operational instances 910dc and 910cb is generated.

The processing management application 140 can then identify any operational instances in processor node 905d that are potentially modified using the updated instance mapping. These identified operational instances can be marked as potentially modified. Accordingly, operational instance 910dc is marked as potentially modified.

The processing management application 140 can be configured to re-compute only the sub-tree operational instances marked as potentially modified in response to a subsequent request to activate the plurality of nodes. Accordingly, in response to a request to activate processing graph 900d, the processing management application 140 may re-compute only operational instances 910aa, 910ba, 910bb, 910ca, 910cb, 910cd, and 910da-910dc. Although modifications were made to instances of each of the processor nodes 905a-905d, almost half of those operational instances in those processor nodes do not need to be re-computed. This may substantially reduce the computational overhead when modifications are made to upstream components of a multi-component electronic project. Additionally, if any of the operational instances marked as potentially modified are not, in fact, modified as a result of the re-computation, any operational instances downstream therefrom that were marked potentially modified may then be returned to an unmodified state by processing management application 140.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

We claim:

1. A method of performing a plurality of processing operations, the method comprising:
   a) defining a plurality of processor nodes including at least one root processor node and a plurality of dependent processor nodes, wherein
      i) each processor node defines a node-specific set of operations performable by that processor node, and
      ii) each processor node defines node instance generation criteria for that processor node,
   b) linking the plurality of processor nodes to define a processing graph that includes the plurality of processor nodes, wherein
      i) the processing graph is defined as a directed acyclic graph in which data flows unidirectionally from upstream nodes to downstream nodes,
      ii) each dependent processor node is a downstream node linked to at least one upstream processor node, and
      iii) the at least one upstream processor node linked to each dependent processor node includes one of the root processor nodes;
   c) for each processor node, generating at least one operational instance using the node instance generation criteria for that processor node, wherein
      i) each operational instance identifies input data usable by that processor node to perform the node-specific set of operations,
      ii) each operational instance is operable to generate at least one output data object by performing the node-specific set of operations using the input data identified by that operational instance,
      iii) for each root processor node, the node instance generation criteria identify a node-specific set of input data usable by that processor node, and the at least one operational instance is generated from the node-specific set of input data, and
      iv) for each dependent processor node, the node instance generation criteria define the operational instances as a function of the at least one output data object defined by the operational instances in the node immediately upstream in the processing graph;
   d) automatically generating, for each operational instance in each dependent processor node, instance dependency relationships, wherein each instance dependency relationship defines, for a particular operational instance in that dependent processor node, the operational instance in the node immediately upstream that defines the at least one output data object usable by that particular operational instance; and
   e) activating the plurality of nodes, wherein
      i) for each operational instance associated with each processor node, the processor node is operable to perform the node-specific set of operations using the input data identified by that operational instance when the input data identified by that operational instance is available, and
      ii) for each downstream operational instance, the input data identified by that operational instance is available following the generation of the at least one upstream output data object by the operational instance in the processor node immediately upstream that is identified by the dependency relationship.

2. The method of claim 1, wherein:
   a) the processing graph is defined to include a first upstream processor node and a first downstream processor node, where the first downstream processor node is immediately downstream of the first upstream processor node;
   b) the operational instances for the first upstream processor node are generated to include a plurality of upstream operational instances;
   c) the operational instances for the first downstream processor node are generated to include a plurality of downstream operational instances; and
   d) the instance dependency relationships for the first downstream node identify, for each downstream operational instance, one of the upstream operational instances in the plurality of upstream operational instances.

3. The method of claim 2, wherein for at least two of the downstream operational instances, the instance dependency relationship corresponding to each of the at least two downstream operational instances identifies the same upstream operational instance.

4. The method of claim 2, wherein:
   a) the first downstream processor node performs the corresponding node-specific set of operations on at least one of the downstream operational instances prior to the first upstream node completing the node-specific set of operations for each of the upstream operational instances.

5. The method of claim 2, wherein:
   a) the input data identified by each downstream operational instance is available immediately upon generation of the at least one upstream output data object by the corresponding upstream operational instance in the first upstream processor node.

6. The method of claim 1, wherein for at least one dependent processor node, generating the at least one operational instance comprising dynamically generating the at least one operational instance as the output data objects are generated by the operational instances in the processor node immediately upstream.

7. The method of claim 6, further comprising:
   a) modifying at least one operational instance in a particular upstream nodes; and
   b) updating the operational instances in the set of dependent processor nodes downstream from the particular upstream node using the instance dependency relationships.

8. The method of claim 7, wherein the updating the operational instances in the set of dependent processor nodes comprises:
   a) identifying the dependent operational instances in the in the set of dependent processor nodes that depend from the at least one modified operational instance using the instance dependency relationships for each of the dependent processor nodes downstream;
   b) removing the dependent operational instances; and
   c) generating new dependent operational instances in the set of dependent processor nodes using the node generation criteria and the at least one modified operational instance.

9. The method of claim 8, wherein the set of dependent processor nodes comprises a plurality of processor nodes.

10. The method of claim 7, wherein at least one of the operational instances in the set of dependent processor nodes is unchanged when updating the operational instances in the set of dependent processor nodes.

11. The method of claim 1, wherein the processing graph is defined to include a plurality of processing sub-trees, wherein each processing sub-tree includes at least one processor node, the at least one processor node including a single root processor node and any downstream nodes dependent on the single root processor node.

12. The method of claim 11, wherein
a) the plurality of processing sub-trees includes a first processing sub-tree that includes at least a first sub-tree processor node having a plurality of first sub-tree operational instances and a second processing sub-tree that includes at least a second sub-tree processor node having a plurality of second sub-tree operational instances; and
b) the method further comprises:
  i) defining a mapping node that includes a set of mapping criteria;
  ii) linking the mapping node to the first sub-tree processor node and to the second sub-tree processor node; and
  iii) automatically generating an instance mapping between the first sub-tree operational instances and the second sub-tree operational instances using the mapping criteria.

13. The method of claim 12, further comprising:
a) modifying one of the first sub-tree operational instances in a particular first sub-tree processor node;
b) removing any downstream first sub-tree operational instances that depend from the modified first sub-tree operational instance in the particular first sub-tree processor node;
c) identifying at least one second sub-tree operational instance corresponding to the modified first sub-tree operational instance using the instance mapping;
d) marking each of the identified at least one second sub-tree operational instances, and any operational instances downstream of the identified at least one second sub-tree operational instances, as potentially modified; and
e) in response to a request to activate a sub-tree processor node that is in the second processing sub-tree or is downstream from the second processing sub-tree:
  i) re-generating the first sub-tree operational instances corresponding to the modified at least one first sub-tree operational instance;
  ii) re-generating the instance mapping using the mapping criteria;
  iii) updating a status of the second sub-tree operational instances using the re-generated instance mapping to identify any additional sub-tree processor nodes in the second processing sub-tree and downstream from the second processing sub-tree that are potentially modified; and
  iv) marking the identified additional sub-tree processor nodes as potentially modified.

14. The method of claim 13, further comprising:
a) re-computing only the sub-tree operational instances marked as potentially modified in response to a subsequent request to activate the plurality of nodes.

15. The method of claim 1, wherein the processing graph is defined to include a first processing section that includes at least a first section processor node having a plurality of first section operational instances and a second processing section that includes at least a second section processor node having a plurality of second section operational instances and the method further comprises:
a) defining a partition node that includes a set of partitioning criteria, the partitioning criteria defining a plurality of partition instances for the partition node;
b) linking the partition node to the first section processor node and to the second section processor node, wherein the partition node is immediately downstream from the first section processor node and immediately upstream from the second section processor node; and
c) allocating each first section operational instances to one of the partitions using the partitioning criteria.

16. The method of claim 15, further comprising:
a) modifying one of the first section operational instances in a particular first section processor node;
b) removing any downstream first section operational instances that depend from the modified first section operational instance in the particular first section processor node; and
c) marking each partition instance corresponding to the modified first section operational instances as potentially modified.

17. The method of claim 16, further comprising:
a) defining a partition node modification perpetuation setting; and
b) updating the second section operational instances downstream from each marked partition instance by one of:
  i) removing the second section operational instances downstream from the marked partition instance; and
  ii) marking the second section operational instances downstream from the marked partition instance as potentially modified;
wherein the updating of the second section operational instances is controlled by the partition node modification setting.

18. The method of claim 17, further comprising:
a) determining that a particular marked partition instance has been modified; and
b) only updating the second section operational instances downstream from the particular marked partition instance in response to determining that the particular marked partition instance has been modified.

19. A method of generating a multi-component output work product, the method comprising:
a) defining initial components of a plurality of input objects;
b) defining a plurality of processor nodes including at least one root processor node and a plurality of dependent processor nodes, wherein
  i) each processor node defines a node-specific set of operations performable by that processor node, and
  ii) each processor node defines node instance generation criteria for that processor node,
c) linking the plurality of processor nodes to define a processing graph that includes the plurality of processor nodes, wherein
  i) the processing graph is defined as a directed acyclic graph in which data flows unidirectionally from upstream nodes to downstream nodes,
  ii) each dependent processor node is a downstream node linked to at least one upstream processor node, and
  iii) the at least one upstream processor node linked to each dependent processor node includes one of the root processor nodes;

d) for each processor node, generating at least one operational instance using the node instance generation criteria for that processor node, wherein
  i) each operational instance identifies input data usable by that processor node to perform the node-specific set of operations,
  ii) each operational instance is operable to generate at least one output data object by performing the node-specific set of operations using the input data identified by that operational instance;
  iii) for each root processor node, the node instance generation criteria identify a node-specific set of input data usable by that processor node, and the at least one operational instance is generated from the node-specific set of input data, wherein for at least one root processor node the node-specific set of input data usable by that root processor node includes at least some of the initial components of the input objects; and
  iv) for each dependent processor node, the node instance generation criteria define the operational instances as a function of the at least one output data object defined by the operational instances in the node immediately upstream in the processing graph;
e) automatically generating, for each operational instance in each dependent processor node, instance dependency relationships, wherein each instance dependency relationship defines, for a particular operational instance in that dependent processor node, the operational instance in the node immediately upstream that defines the at least one output data object usable by that particular operational instance;
f) activating the plurality of nodes, wherein
  i) for each operational instance associated with each processor node, the processor node is operable to perform the node-specific set of operations using the input data identified by that operational instance when the input data identified by that operational instance is available, and
  ii) for each downstream operational instance, the input data identified by that operational instance is available following the generation of the at least one upstream output data object by the operational instance in the processor node immediately upstream that is identified by the dependency relationship; and
g) generating the multi-component output work product by combining at least some of the output data objects generated by the plurality of processor nodes.

20. A non-transitory computer-readable medium comprising computer executable instructions stored thereon, the instructions executable by at least one processor to configure the at least one processor to perform a method of performing a plurality of processing operations, the method comprising:
a) defining a plurality of processor nodes including at least one root processor node and a plurality of dependent processor nodes, wherein
  i) each processor node defines a node-specific set of operations performable by that processor node, and
  ii) each processor node defines node instance generation criteria for that processor node,
b) linking the plurality of processor nodes to define a processing graph that includes the plurality of processor nodes, wherein
  i) the processing graph is defined as a directed acyclic graph in which data flows unidirectionally from upstream nodes to downstream nodes,
  ii) each dependent processor node is a downstream node linked to at least one upstream processor node, and
  iii) the at least one upstream processor node linked to each dependent processor node includes one of the root processor nodes;
c) for each processor node, generating at least one operational instance using the node instance generation criteria for that processor node, wherein
  i) each operational instance identifies input data usable by that processor node to perform the node-specific set of operations,
  ii) each operational instance is operable to generate at least one output data object by performing the node-specific set of operations using the input data identified by that operational instance;
  iii) for each root processor node, the node instance generation criteria identify a node-specific set of input data usable by that processor node, and the at least one operational instance is generated from the node-specific set of input data; and
  iv) for each dependent processor node, the node instance generation criteria define the operational instances as a function of the at least one output data object defined by the operational instances in the node immediately upstream in the processing graph;
d) automatically generating, for each operational instance in each dependent processor node, instance dependency relationships, wherein each instance dependency relationship defines, for a particular operational instance in that dependent processor node, the operational instance in the node immediately upstream that defines the at least one output data object usable by that particular operational instance; and
e) activating the plurality of nodes, wherein
  i) for each operational instance associated with each processor node, the processor node is operable to perform the node-specific set of operations using the input data identified by that operational instance when the input data identified by that operational instance is available, and
  ii) for each downstream operational instance, the input data identified by that operational instance is available following the generation of the at least one upstream output data object by the operational instance in the processor node immediately upstream that is identified by the dependency relationship.

21. The computer-readable medium of claim 20, wherein the method further comprises:
a) the processing graph is defined to include a first upstream processor node and a first downstream processor node, where the first downstream processor node is immediately downstream of the first upstream processor node;
b) the operational instances for the first upstream processor node are generated to include a plurality of upstream operational instances;
c) the operational instances for the first downstream processor node are generated to include a plurality of downstream operational instances; and
d) the instance dependency relationships for the first downstream node identify, for each downstream operational instance, one of the upstream operational instances in the plurality of upstream operational instances.

22. The computer-readable medium of claim 21, wherein for at least two of the downstream operational instances, the instance dependency relationship corresponding to each of the at least two downstream operational instances identifies the same upstream operational instance.

23. The computer-readable medium of claim 21, wherein:
   a) the first downstream processor node performs the corresponding node-specific set of operations on at least one of the downstream operational instances prior to the first upstream node completing the node-specific set of operations for each of the upstream operational instances.

24. The computer-readable medium of claim 21, wherein:
   a) the input data identified by each downstream operational instance is available immediately upon generation of the at least one upstream output data object by the corresponding upstream operational instance in the first upstream processor node.

25. The computer-readable medium of claim 20, wherein for at least one dependent processor node, generating the at least one operational instance comprising dynamically generating the at least one operational instance as the output data objects are generated by the operational instances in the processor node immediately upstream.

26. The computer-readable medium of claim 20, further comprising:
   a) modifying at least one operational instance in a particular upstream nodes; and
   b) updating the operational instances in the set of dependent processor nodes downstream from the particular upstream node using the instance dependency relationships.

27. The computer-readable medium of claim 26, wherein the updating the operational instances in the set of dependent processor nodes comprises:
   a) identifying the dependent operational instances in the in the set of dependent processor nodes that depend from the at least one modified operational instance using the instance dependency relationships for each of the dependent processor nodes downstream;
   b) removing the dependent operational instances; and
   c) generating new dependent operational instances in the set of dependent processor nodes using the node generation criteria and the at least one modified operational instance.

28. The computer-readable medium of claim 27, wherein the set of dependent processor nodes comprises a plurality of processor nodes.

29. The computer-readable medium of claim 26, wherein at least one of the operational instances in the set of dependent processor nodes is unchanged when updating the operational instances in the set of dependent processor nodes.

30. The computer-readable medium of claim 20, wherein the processing graph is defined to include a plurality of processing sub-trees, wherein each processing sub-tree includes at least one processor node, the at least one processor node including a single root processor node and any downstream nodes dependent on the single root processor node.

31. The computer-readable medium of claim 30, wherein
   a) the plurality of processing sub-trees includes a first processing sub-tree that includes at least a first sub-tree processor node having a plurality of first sub-tree operational instances and a second processing sub-tree that includes at least a second sub-tree processor node having a plurality of second sub-tree operational instances; and
   b) the method further comprises:
      i) defining a mapping node that includes a set of mapping criteria;
      ii) linking the mapping node to the first sub-tree processor node and to the second sub-tree processor node; and
      iii) automatically generating an instance mapping between the first sub-tree operational instances and the second sub-tree operational instances using the mapping criteria.

32. The computer-readable medium of claim 31, wherein the method further comprises:
   a) modifying one of the first sub-tree operational instances in a particular first sub-tree processor node;
   b) removing any downstream first sub-tree operational instances that depend from the modified first sub-tree operational instance in the particular first sub-tree processor node;
   c) identifying at least one second sub-tree operational instance corresponding to the modified first sub-tree operational instance using the instance mapping;
   d) marking each of the identified at least one second sub-tree operational instances, and any operational instances downstream of the identified at least one second sub-tree operational instances, as potentially modified; and
   e) in response to a request to activate a sub-tree processor node that is in the second processing sub-tree or is downstream from the second processing sub-tree:
      i) re-generating the first sub-tree operational instances corresponding to the modified at least one first sub-tree operational instance;
      ii) re-generating the instance mapping using the mapping criteria;
      iii) updating a status of the second sub-tree operational instances using the re-generated instance mapping to identify any additional sub-tree processor nodes in the second processing sub-tree and downstream from the second processing sub-tree that are potentially modified; and
      iv) marking the identified additional sub-tree processor nodes as potentially modified.

33. The computer-readable medium of claim 32, wherein the method further comprises:
   a) re-computing only the sub-tree operational instances marked as potentially modified in response to a subsequent request to activate the plurality of nodes.

34. The computer-readable medium of claim 20, wherein the processing graph is defined to include a first processing section that includes at least a first section processor node having a plurality of first section operational instances and a second processing section that includes at least a second section processor node having a plurality of second section operational instances and the method further comprises:
   a) defining a partition node that includes a set of partitioning criteria, the partitioning criteria defining a plurality of partition instances for the partition node;
   b) linking the partition node to the first section processor node and to the second section processor node, wherein the partition node is immediately downstream from the first section processor node and immediately upstream from the second section processor node; and
   c) allocating each first section operational instances to one of the partitions using the partitioning criteria.

35. The computer-readable medium of claim 34, wherein the method further comprises:
   a) modifying one of the first section operational instances in a particular first section processor node;

b) removing any downstream first section operational instances that depend from the modified first section operational instance in the particular first section processor node; and c) marking each partition instance corresponding to the modified first section operational instances as potentially modified.

36. The computer-readable medium of claim 35, wherein the method further comprises:

a) defining a partition node modification perpetuation setting; and b) updating the second section operational instances downstream from each marked partition instance by one of:

i) removing the second section operational instances downstream from the marked partition instance; and ii) marking the second section operational instances downstream from the marked partition instance as potentially modified;

wherein the updating of the second section operational instances is controlled by the partition node modification setting.

37. The computer-readable medium of claim 36, wherein the method further comprises:

a) determining that a particular marked partition instance has been modified; and only updating the second section operational instances downstream from the particular marked partition instance in response to determining that the particular marked partition instance has been modified.

* * * * *

UNITED STATES PATENT AND TRADEMARK OFFICE
CERTIFICATE OF CORRECTION

PATENT NO. : 10,853,079 B2  
APPLICATION NO. : 16/575774  
DATED : December 1, 2020  
INVENTOR(S) : Ken Xu and Taylor James Petrick Page 1 of 1

It is certified that error appears in the above-identified patent and that said Letters Patent is hereby corrected as shown below:

In the Claims

In Claim 8, Column 50, Lines 56-57, "operational instances in the in the set of dependent" should read -- operational instances in the set of dependent --

In Claim 27, Column 55, Lines 34-35, "operational instances in the in the set of dependent" should read -- operational instances in the set of dependent --

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*